United States Patent [19]
Zangeneh et al.

[11] Patent Number: 5,685,696
[45] Date of Patent: Nov. 11, 1997

[54] CENTRIFUGAL OR MIXED FLOW TURBOMACHINES

[75] Inventors: Mehrdad Zangeneh, London, United Kingdom; Hideomi Harada; Akira Goto, both of Kanagawa-ken, Japan

[73] Assignees: Ebara Corporation, Tokyo; Ebara Research Co., Ltd., Fujisawa, both of Japan; University College London, London, United Kingdom

[21] Appl. No.: 379,473

[22] PCT Filed: Jun. 10, 1994

[86] PCT No.: PCT/GB94/01254

§ 371 Date: Feb. 1, 1995

§ 102(e) Date: Feb. 1, 1995

[87] PCT Pub. No.: WO95/34744

PCT Pub. Date: Dec. 21, 1995

[51] Int. Cl.$^6$ ..................................................... F04D 29/38
[52] U.S. Cl. ........................................ 416/186 R; 416/223 B
[58] Field of Search ................................. 416/185, 186 R, 416/188, 223 B

[56] References Cited

U.S. PATENT DOCUMENTS

| | | |
|---|---|---|
| 3,028,140 | 4/1962 | Lage . |
| 4,465,433 | 8/1984 | Bischoff . |
| 5,112,195 | 5/1992 | Cox . |
| 5,458,457 | 10/1995 | Goto et al. . |

FOREIGN PATENT DOCUMENTS

| | | |
|---|---|---|
| 342035 | 12/1959 | Switzerland . |
| 1144445 | 3/1969 | United Kingdom . |
| 2164098 | 3/1986 | United Kingdom . |
| 2224083 | 4/1990 | United Kingdom . |
| 93/07392 | 4/1993 | WIPO . |

OTHER PUBLICATIONS

Smith et al., "Sweep and Dihedral Effects in Axial-Flow Turbomachinery", *Journal of Basic Engineering*, vol. 85, No. 3, Sep. 1963, pp. 401–416.

Zhongi et al., "An Experimental Investigation Into the Reasons of Reducing Secondary Flow Losses by Using Leaned Blades in Rectangular Turbine Cascades with Incidence Angle", *ASME Paper 88-GT-4*, pp. 1–7 (presented Jun. 1988).

Biesinger et al., "Reduction in Secondary Flows and Losses in a Turbine Cascade by Upstream Boundary Layer Blowing", *ASME Paper 93-GT-114*, pp. 1–16 (presented May 1993).

Zangeney, "A Compressible Three-Dimensional Design Method for Radial and Mixed Flow Turbomachinery Blades", *International Journal of Numerical Methods of Fluids*, vol. 13, pp. 599–624, 1991.

Borges, "A Three-Dimensional Inverse Method for Turbomachinery: Part I-Theory", *ASME, Journal of Turbomachinery*, vol. 112, pp. 346–354, Jul. 1990.

Yang et al., "Aerodynamic Design of Turbomachinery Blading in Three-Dimensional Flow: An Application to Radial Inflow Turbines", *ASME Paper 92-GT-74*, pp. 1–13 (presented Jun. 1992).

Dang, "A Fully Three-Dimensional Inverse Method for Turbomachinery Blading in Transonic Flows", *ASME, Journal of Turbomachinery*, vol. 115, pp. 354–361, Apr. 1993.

Dawes, "Development of a 3D Navier Stokes Solver for Application to all Types of Turbomachinery", *ASME Paper 88-GT-70*, pp. 1–11 (presented Jun. 1988).

(List continued on next page.)

*Primary Examiner*—John T. Kwon
*Attorney, Agent, or Firm*—Wenderoth, Lind & Ponack

[57] ABSTRACT

An impeller in a turbomachine has blades designed such that a reduced static pressure difference ΔCp between a hub and a shroud on a suction surface of a blade has a tendency to remarkably decrease in the vicinity of an impeller exit as it approaches the impeller exit from an inlet.

36 Claims, 55 Drawing Sheets

OTHER PUBLICATIONS

Stepanoff, "Centrifugal and Axial Flow Pumps", John Wiley & Sons, Inc. New York, 1957, pp. 94–105.

Dicmas, "Vertical Turbine, Mixed Flow, and Propeller Pumps", MacGraw–Hill, New York, pp. 305–311, 1962.

Borges, "A Proposed Through–Flow Inverse Method for the Design of Mixed–Flow Pumps", *International Journal of Numerical Methods in Fluids*, vol. 17, Dec. 1993, pp. 1097–1114.

Zangeneh et al., "A Fully Compressible Three Dimensional Inverse Design Method Applicable to Radial and Mixed Flow Turbomachines", *ASME Paper 90–GT–198*, pp. 1–9 (presented Jun. 1990).

Zangeneh, "Three Dimensional Design of a High Speed Radial–Inflow Turbine by a Novel Design Method", *ASME Paper 90–GT–235*, pp. 1–8 (presented Jun. 1990).

Zangeney, "Inviscid–Viscous Interaction Method for 3D Inverse Design of Centrifugal Impellers", *ASME Paper 93–GT–103*, pp. 1–10 (presented May 1993).

Goto et al., "Internal Flow Fields in a Mixed–Flow Impeller Designed by Three–Dimensional Inverse Method", The Lecture of the 30th General Meeting in the Association of Turbomachinery, May 1994.

⇨ : main flow
↗ : secondary flow on pressure surface
↗ : secondary flow on suction surface ⇨ : main flow

CENTRIFUGAL OR MIXED FLOW TURBOMACHINES

BACKGROUND OF THE INVENTION

The present invention relates to a turbomachine including a centrifugal pump or a mixed flow pump for pumping liquid, a blower or a compressor for compression of gas, and more particularly to a turbomachine having an impeller which has a fluid dynamically improved blade profile for suppressing a meridional component of secondary flow.

Conventionally, in flow passages of an impeller in a centrifugal or a mixed flow turbomachine, main flows flowing along flow passages are affected by secondary flow generated by movement of low energy fluid in boundary layers on wall surfaces due to static pressure gradients in the flow passages. This phenomenon leads to the formation of streamwise vortices or flow having non-uniform velocity in the flow passage, which in turn results in a substantial fluid energy loss not only in the impeller but also in the diffuser or guide vanes downstream of the impeller.

The secondary flow is defined as flow which has a velocity component perpendicular to the main flow. The total energy loss caused by the secondary flows is referred to as the secondary flow loss. The low energy fluid accumulated at a certain region in the flow passage may cause flow separation on a large scale, thus producing a positively sloped characteristic curve and hence preventing the stable operation of the turbomachine.

There are two known approaches for suppressing the secondary flows in a turbomachine, one of which is to make the impeller have a specific flow passage geometry, the other of which is to supply energy from the outside. As an example of the former approach using a specific flow passage geometry, there is a known method in which blades of the impeller in an axial turbomachine are leaned towards the circumferential direction thereof or the direction of the suction or discharge side (L. H. Smith and H. Yeh, "Sweep and Dihedral Effects in Axial Flow Turbomachinery", Trans ASME, Journal of Basic Engineering, Vol. 85, No. 3, 1963, pp. 401–416), a method in which a radial rotor has a blade curvature in the spanwise direction with a convex blade pressure surface and/or a concave blade suction surface (GB2224083A), or a method in which blades in a turbine cascade are leaned or curved toward a circumferential direction thereof (W. Zhongqi, et al., "An Experimental Investigation into the Reasons of Reducing Secondary Flow Losses by Using Leaned Blades in Rectangular Turbine Cascades with Incidence Angle", ASME Paper 88-GT-4). These methods are known to have a favorable influence upon the secondary flows in the cascade if applied appropriately.

However, since the influence of the profile of a blade camber line or a blade cross-section upon the secondary flow has not been essentially known, the effect of blade lean or spanwise blade curvature is utilized under a certain limitation without changing the blade camber line or the blade cross-section substantially. Further, Japanese laid-open Patent Publication No. 63-10281 discloses a structure in which a projecting portion is provided at the corner of a hub surface and a blade surface in a turbomachine to reduce the secondary flow loss. Since such flow passage profile is a specific blade profile having a nonaxisymmetric hub surface, it is difficult to manufacture the impeller.

In all cases of the above prior arrangements, a method of achieving the effect universally has not been sufficiently studied.

Therefore, universal methods of suppressing the secondary flows under different design conditions and for the different types of turbomachines have not been established. Under these circumstances, there are many cases that the above effect is reduced, or to make matters worse, undesirable effects are obtained. As a result, as of now, there is no standard design criterion for reducing secondary flow by using specific flow passage geometry. Thus the three-dimensional geometry of the impeller has been designed by trial and error to find the optimum profile of the impeller for suppressing secondary flow.

As an example of the latter approach, in which energy is supplied from the outside for suppressing secondary flow, in order to avoid instability of a turbomachine, there has been proposed a method in which secondary flow in a turbine cascade is controlled by blowing fluid into an inlet of the cascade (T. E. Biesinger and D. G. Gregory-Smith, "Reduction in Secondary Flows and Losses in a Turbine Cascade by Upstream Boundary Layer Blowing" ASME Paper 93-GT-114), or a method in which secondary flow in an impeller is controlled by blowing a jet into an inlet of the impeller (PCT/JP92/01280). However, the proposed methods are disadvantageous in that an energy source for blowing fluid or a jet and incidental devices thereof are required. Further, the methods are also disadvantageous in that regular energy consumption is required to suppress secondary flows.

The present invention relates to the former approach, that is the method using a specific flow passage profile. It is apparent from the secondary flow theory that the secondary flow in the impeller results from the action of Corioli's force caused by the rotation of the impeller and the effects of the streamline curvature. The secondary flow in the impeller is divided broadly into two categories, one of which is blade-to-blade secondary flow generated along a shroud surface or a hub surface, the other of which is the meridional component of secondary flow generated along the pressure surface or the suction surface of a blade.

It is known that the blade-to-blade secondary flow can be minimized by making the blade profile to be backswept. Regarding the other type of secondary flow, that is, the meridional component of secondary flow, it is difficult to weaken or eliminate it easily. If the meridional component of secondary flow is to be weakened or eliminated, it is necessary to optimize the three-dimensional geometry of the flow passage very carefully.

The purpose of the present invention is to suppress the meridional component of secondary flow in a centrifugal or a mixed flow turbomachine.

As an example of a typical impeller in the turbomachine to which the present invention is applied, the three-dimensional geometry of a closed type impeller is schematically shown in FIGS. 1(A) and 1(B) wherein a greater part of a shroud surface is removed (in FIG. 1(A)). FIG. 1(A) is a perspective view partly in section, and FIG. 1(B) is a cross-sectional view taken along a line A–A' which is a meridional cross-sectional view. In FIGS. 1(A) and 1(B), a hub surface 2 extends radially outwardly from a rotating shaft 1 so that it has a curved surface. A plurality of blades 3 are provided on the hub surface 2 so that they extend radially outward from the rotating shaft 1 and are disposed at equal intervals in the circumferential direction. Outer edges 3a of the blades 3 are covered with a shroud surface 4 as shown in FIG. 1(B). A flow passage is defined by two blades 3 in confrontation with each other, the hub surface 2 and the shroud surface 4 so that fluid flows from an impeller inlet 6a toward an impeller exit 6b. When the impeller 6 is rotated about an axis of the rotating shaft 1 at an angular velocity ω, fluid flowing into the flow passage from the impeller inlet 6a is delivered toward the impeller exit 6b of the impeller 6. In this case, the surface facing the rotational direction is the pressure surface 3b, and the opposite side of the pressure surface 3b is the suction surface 3c. In the case of an open type impeller, there is no independent part for forming the shroud surface 4, but a casing (not shown in the drawing) for enclosing the impeller 6 serves as the shroud surface 4. Therefore, there is no basic fluid dynamic difference between the open type impeller and the closed type impeller in terms of the generation and the suppression of the meridional component of secondary flows, thus only the closed type impeller will be described below.

The impeller 6 having a plurality of blades 3 is incorporated as a main component, and the rotating shaft 1 is coupled to a driving source, thereby jointly constituting a turbomachine. Fluid is introduced into the impeller inlet 6a through a suction pipe, pumped by the impeller 6 and discharged from the impeller exit 6b, and then delivered through a discharge pipe to the outside of the turbomachine.

The unsolved serious problem in connection with the impeller of a turbomachine is the suppression of the meridional component of secondary flow. The mechanism of a generation of meridional component of secondary flow, whose suppression is the purpose of this invention, is explained as follows:

As shown in FIG. 1(B), with regard to the relative flow, the reduced static pressure distribution, defined as $p^*=p-0.5\rho u^2$, is formed by the action of a centrifugal force $W^2/R$ due to streamline curvature of the main flow and the action of Corioli's force $2\omega W_\theta$ due to the rotation of the impeller, where W is the relative velocity of flow, R is the radius of streamline curvature, ω is the angular velocity of the impeller, $W_\theta$ is the component in the circumferential direction of W relative to the rotating shaft 1, $p^*$ is reduced static pressure, p is static pressure, ρ is density of fluid, u is peripheral velocity at a certain radius r from the rotating shaft 1. The reduced static pressure $p^*$ has such a distribution in which the pressure is high at the hub side and low at the shroud side, so that the pressure gradient balances the centrifugal force $W^2/R$ and the Corioli's force $2\omega W$, directed toward the hub side.

In the boundary layer along the blade surface, since the relative velocity W is reduced by the influence of the wall surface, the centrifugal force $W^2/R$ and the Corioli's force $2\omega W$, acting on the fluid in the boundary layer become small. As a result, they cannot balance the reduced static pressure gradient of the main flow, and low energy fluid in the boundary layer flows towards an area of low reduced static pressure $p^*$, thus generating the meridional component of secondary flow. That is, as shown in broken lines on the pressure surface 3b and in solid lines on the suction surface 3c in FIG. 1(A), fluid moves along the blade surface from the hub side towards the shroud side on the pressure surface 3b and the suction surface 3c forming meridional a component of secondary flow.

The meridional component of secondary flow is generated on both the suction surface 3c and the pressure surface 3b. In general, since the boundary layer on the suction surface 3c is thicker than that on the pressure surface 3b, the secondary flow on the suction surface 3c has a greater influence on performance characteristics of the turbomachine. The purpose of the present invention is to suppress the meridional component of secondary flow on the suction surface of the blade.

When low energy fluid in the boundary layer moves from the hub side to the shroud side, fluid flow is formed from the shroud side to the hub side at around the midpoint location to compensate for the low energy fluid flow rate. As a result, as shown schematically in FIG. 2(B) which is a cross-sectional view taken along a line B–B' in FIG. 2(A), a pair of vortices which have different swirl directions are formed in the flow passage between two blades as the flow moves towards the exit. These vortices are referred to as secondary vortices. Low energy fluid in the flow passage is accumulated due to these vortices at a certain location of the impeller towards the exit where the reduced static pressure $p^*$ is lowest, and this low energy fluid is mixed with fluid which flows steadily in the flow passage, resulting in generation of a great flow loss.

Furthermore, when non-uniform flow generated by insufficient mixing of a low relative velocity (high loss) fluid and a high relative velocity (high loss) fluid is discharged to the downstream flow passage of the blades, a great flow loss is generated when both fluids are mixed.

Such a non-uniform flow leaving the impeller makes the velocity triangle unfavorable at the inlet of the diffuser and causes flow separation on diffuser vanes or a reverse flow within a vaneless diffuser, resulting in a substantial decrease of the overall performance of the turbomachine.

Furthermore, in the area of high loss fluid accumulated at a certain location in the flow passage, a large scale reverse flow is liable to occur, thus producing a positively sloped characteristics curve. As a result, surging, vibration, noise and the like are generated, and the turbomachine cannot be stably operated.

Therefore, in order to improve the performance of centrifugal or mixed flow turbomachine and realize stable operation of a turbomachine, it is necessary to design the three-dimensional geometry of the flow passage to suppress the secondary flow as much as possible. Thereby the formation of secondary vortices, the resulting non-uniform flow, and large scale flow separation or the like will be prevented.

SUMMARY OF THE INVENTION

It is therefore an object of the present invention to overcome the drawbacks of increase of loss and unstable operation of a turbomachine caused by insufficient suppression of a meridional component of secondary flow in the impeller, and to provide the following four design aspects which can reduce the above loss and improve stability of operation of the turbomachine.

(1) According to the first aspect of the present invention, there is provided a centrifugal or mixed flow turbomachine having an impeller, characterized in that said impeller is designed so that the reduced static pressure difference ΔCp or the relative Mach number difference ΔM between the hub and the shroud on the suction surface of a blade shows a remarkable decreasing tendency between the location of non-dimensional meridional distance 0 (impeller inlet) and the location of non-dimensional meridional distance 1.0 (impeller exit) as said non-dimensional meridional distance increases. Also, between the impeller inlet and the impeller exit, the reduced static pressure difference ΔCp (or Mach number difference ΔM) becomes nearly 0 or changes sign from positive to negative as it approaches the impeller exit.

By designing the distribution of the reduced static pressure difference ΔCp in the above manner, the meridional component of secondary flow is remarkably suppressed at a location where the reduced static pressure difference ΔCp or relative Mach number difference ΔM shows a remarkably decreasing tendency. As a result, the meridional component of secondary flow over the entire impeller can be effectively suppressed. In this case, if the degree of the remarkably decreasing tendency of the reduced static pressure difference ΔCp and the location where it is generated are optimum, the suppression of the meridional component of secondary flow is maximized.

The degree of the remarkably decreasing tendency is optimum when it is arranged such that the difference between a minimum value of the reduced static pressure difference ΔCp (or the relative Mach number difference ΔM) and the value of reduced static pressure difference ΔCp (or relative Mach number difference ΔM) at the location, corresponding to a non-dimensional meridional distance obtained by subtracting non-dimensional meridional distance 0.4 from a non-dimensional meridional distance representing said minimum value, is not less than 0.20 (or 0.15 for relative Much number). The location, where the remarkably decreasing tendency emerges, is optimum when it is placed at a non-dimensional meridional distance of not less than m=0.4. Here, non-dimensional meridional distance is defined on the meridional plane of the impeller as shown in FIG. 1(B). At the shroud, the non-dimensional meridional distance m is defined as $m=l_S/l_{T,S}$, which represents the ratio of meridional distance $l_S$, measured from the blade inlet 6a along the shroud, to the meridional distance $l_{T,S}$, between the impeller inlet 6a and the impeller exit 6b measured along the shroud. Similarly, at the hub, the non-dimensional meridional distance m is defined as $m=l_H/l_{T,H}$, which represents the ratio of meridional distance $l_H$, measured from the blade inlet 6a along the hub, to the meridional distance $l_{T,H}$, between the impeller inlet 6a and the impeller exit 6b measured along the hub. Thus, m=0 corresponds to the impeller inlet 6a, and m=1.0 to the impeller exit 6b.

The meridional component of secondary flow is suppressed when a nearly zero value of ΔCp (or ΔM) or the change of sign from positive to negative of ΔCp (or ΔM) occurs at a location of not less than m=0.6. The suppression of the meridional component of secondary flow is maximized when it occurs at a location in a range of non-dimensional meridional distance m=0.65–0.9.

Incidentally, the reduced static pressure difference ΔCp is used with respect to incompressible fluid as in a liquid pump, while the relative Mach number difference ΔM is used with respect to compressible fluid as in a compressor. The influence thereof on generation of secondary flow is fluid dynamically equivalent and therefore the following description is made with reference to only the reduced static pressure difference ΔCp.

(2) According to the second aspect of the present invention, there is provided a centrifugal or mixed flow turbomachine having an impeller, characterized by the distribution of the meridional derivative of $r\bar{V}_\theta$, i.e. $\partial(r\bar{V}_\theta)/\partial m$ along the meridional distance.

Here, r is the radial co-ordinate of a cylindrical polar coordinate system as shown in FIG. 1(B), $\bar{V}_\theta$ the tangentially averaged value of the circumferential velocity component $V_\theta$ of the absolute velocity V of the fluid. Impellers are designed so that the maximum value of $\partial(r\bar{V}_\theta)/\partial m$ at the shroud appears at the fore part of the blade, and the maximum value of $\partial(r\bar{V}_\theta)/\partial m$ at the hub appears at the aft part of the blade.

Also, impellers are designed so that $\partial(r\bar{V}_\theta)/\partial m$ is larger at the shroud than that at the hub at the location in the vicinity of non-dimensional meridional distance 0 (impeller inlet side), and the said meridional derivative of $r\bar{V}_\theta$, i.e. $\partial(r\bar{V}_\theta)/\partial m$ is smaller at the shroud than that at the hub at the location in the vicinity of non-dimensional meridional distance 1.0 (impeller exit), and the distribution of said meridional derivative of $r\bar{V}_\theta$ at the hub crosses over that at the shroud between the said location of non-dimensional meridional distance 0 (impeller inlet) and the said location of non-dimensional meridional distance 1.0 (impeller exit).

By designing the impeller so as to realize the above distribution of $\partial(r\bar{V}_\theta)/\partial m$, blade loading can be large at the shroud and small at the hub at the impeller inlet side, and blade loading can be small at the shroud and large at the hub at the impeller exit side. Consequently, the above is reflected on the first aspect of the present invention, as a relatively large reduced static pressure difference ΔCp is realized at the impeller inlet and a relatively small reduced static pressure difference ΔCp is realized at the impeller exit. As a result, a remarkable decrease of the reduced static pressure difference ΔCp can be realized, thus suppressing the meridional component of secondary flow effectively.

In this case, if the location of the said crossing of the distributions of meridional derivative of $r\bar{V}_\theta$ between the shroud and the hub is optimum, the suppression of the meridional component of secondary flow is maximized. The favorable location is not less than non-dimensional meridional distance m=0.5, and the optimum location is in the range of non-dimensional meridional distance m=0.55–0.85. The location, where $\partial(r\bar{V}_\theta)/\partial m$ at the shroud has a maximum value in the fore part of the impeller, is preferable when it is in the range of non-dimensional meridional distance m=0–0.3, and the location, where $\partial(r\bar{V}_\theta)/\partial m$ at the hub has a maximum value in the aft part of the impeller, is preferable when it is in the range of non-dimensional meridional distance m=0.6–1.0.

(3) According to the third aspect of the present invention, the blade is leaned towards a circumferential direction in the whole or a part of the impeller between the inlet and the exit so that the blade at the hub precedes the blade at the shroud in the direction of impeller rotation, and also the blade lean angle γ, does not remain constant and is designed to have a decreasing tendency towards the impeller exit. Here, the blade lean angle γ is defined as an angle between the shroud surface and the blade center line on the cross-section of the flow passage, and FIG. 11(C)(2) shows the blade lean angle γ on the cross-section at the impeller exit viewed from E–E' of FIG. 10. In addition to this, on a plan view of the impeller, viewed from the inlet side of the impeller, the value of the blade exit angle $\alpha_{TE}$ (FIG. 11(C)(2), defined as an angle between the blade camber line at the exit and the tangential direction, decreases from that at the hub $\alpha_{TE,H}$ to that at the shroud $\alpha_{TE,S}$, and also the blade angle $\alpha_H$ (FIG. 11(C)(2), defined as an angle between the blade camber line and the tangential direction, at the hub on the plan view of the impeller is designed to have the maximum or the local maximum value at the exit side of the impeller.

Namely, the blade geometry on the hub is modified so as to reduce the degree of backsweep in the latter part of the impeller and increase the blade angle $\alpha_H$ at the hub relative to the blade angle $\alpha_S$ at the shroud towards the impeller exit, thus designing the flow passage of the impeller such that the hub side precedes the shroud side relative to the direction of the impeller revolution.

By designing the blades having blade lean in the circumferential direction in this way, the reduced static pressure p* at the shroud side increases, whereby the pressure coefficient Cp decreases thereat. On the other hand, the reduced static pressure p* at the hub side decreases, whereby the pressure coefficient Cp increases thereat. The above is reflected on the first aspect of the present invention, and a decreasing tendency of the reduced static pressure difference ΔCp which emerges between the impeller inlet and impeller exit as it approaches the impeller exit is emphasized.

In this case, the effects of secondary flow suppression is maximized when the geometry of the blade lean in the circumferential direction is appropriate. Namely, in the plan view of the impeller viewed from the inlet side of the impeller, the location of the reflection point, where the blade profile at the hub has maximum blade angle $\alpha_H$ is not less than the radius ratio of $r^* = (r-r_{1H})/(r_{2H}-r_{1H}) = 0.6$ or not less than the non-dimensional meridional distance of m=0.7. The degree of blade backsweep towards the impeller exit is higher at the shroud than at the hub (FIGS. 11(C)(1) and 11(C)(2)), and the following relation is satisfied: $\{(d(r\theta)/dr\}_S > \{d(r\theta)/dr\}_H$. Here, r and $\theta$ are the radial and angular co-ordinates of a cylindrical polar co-ordinate system respectively. The angular co-ordinate $\theta$ is defined as positive when it is measured in the counter-rotating direction of the impeller. A blade lean ratio S is defined by $S = (\theta_{TE,S} - \theta_{TE,H})/(\theta_{TE,M} - \theta_{LE,M})$ as a parameter which shows overall degree of the blade lean, and the optimum blade lean ratio is not less than S=0.14. Here, $\theta_{TE,S}$ represents the angular co-ordinate of the impeller exit at the shroud, $\theta_{TE,H}$ that of the impeller exit at the hub, $\theta_{TE,M}$ that of the impeller exit at a midspan location, i.e. the middle point between the shroud and the hub, $\theta_{LE,M}$ that of the impeller inlet at the said midspan location (FIG. 11(C)(2)).

When the secondary flows to be suppressed are strong, and only the third aspect of the present invention is used, in order to create a sufficiently decreasing tendency of the reduced static pressure difference ΔCp between the shroud and the hub to suppress the meridional component of secondary flow, the degree of blade lean in the circumferential direction is intensified to such an extent which may lead to difficulties in manufacturing. In such case, the third aspect of the present invention has an effect of suppressing the meridional component of secondary flow effectively in cooperation with the second aspect without leading to difficulties in manufacturing.

(4) According to the fourth aspect of the present invention, there is provided a centrifugal or mixed flow turbomachine having an impeller, characterized in that said impeller is designed so that blade angle distribution measured from the circumferential direction is arranged such that blade angle difference $\beta_H - \beta_S$, between blade angle $\beta_H$ at the hub and blade angle $\beta_S$ at the shroud, shows a remarkably increasing tendency from the location of non-dimensional meridional distance 0 (impeller inlet) to the location of non-dimensional meridional distance 1.0 (impeller exit) as said non-dimensional meridional distance increases.

Here, the blade angle is defined on a blade-to-blade stream surface, viewed normal to the curved hub surface or on the shroud surface, and measured from the tangential direction. Namely, the blade angle $\beta_H$ represents the angle between the blade camber line at the hub and the tangential direction at radius r, and the blade angle $\beta_S$ the angle between the blade camber line at the shroud and the tangential direction at radius r (FIGS. 12(B) and 12(C)).

By designing the distribution of the blade angle difference $\beta_H - \beta_S$ as in the above manner, the blade angle $\beta_H$ becomes larger at the hub as it approaches the impeller exit, and the blade loading can be larger at the hub towards the impeller exit. On the other hand, the blade angle $\beta_S$ becomes smaller at the shroud as it approaches the impeller exit, and the blade loading can be smaller at the shroud towards the impeller exit. Consequently, the above is reflected in the first aspect of the present invention, and a relatively small reduced static pressure difference ΔCp is realized at the impeller exit. That is, a remarkable decrease of the reduced static pressure difference ΔCp between the impeller inlet and the impeller exit enables the meridional component of secondary flow to be suppressed effectively.

In this case, if the maximum or the local maximum value of the blade angle difference $\beta_H - \beta_S$ and the location where its maximum or a local maximum value emerges are optimum, the effects of the suppression of the meridional component of secondary flow is maximized. The maximum value or the local maximum value of not less than 20 degrees is optimum, and the difference between the maximum or the local maximum blade angle difference and the mean blade angle difference, averaged in the range of the meridional distance m=0–0.2, is preferably not less than 10 degrees. The location where the maximum value emerges is favorable at the location not less than the non-dimensional meridional distance of m=0.5 and is optimum in the range of non-dimensional meridional distance m=0.7–1.0.

There is a case where the distribution of blade angle difference $\beta_H - \beta_S$ shows a decreasing tendency in a part of the non-dimensional distance between m=0–1.0 followed by a remarkably increasing tendency as the non-dimensional meridional distance increases. However, the effects of such remarkable increase of the blade angle difference on the suppression of secondary flow are basically the same.

BRIEF DESCRIPTION OF THE DRAWINGS

FIGS. 1 and 2 are views for explaining a background art;

FIG. 1(A) is a perspective view partly in section, and FIG. 1(B) is a meridional cross-sectional view taken along a line A–A' of FIG. 1(A);

FIG. 2(A) is a perspective view partly in section, and FIG. 2(B) is a cross-sectional view taken along a line B–B' of FIG. 2(A);

FIG. 12(A) is a perspective view of an impeller, FIG. 12(B) is a view of a blade-to-blade stream surface along a hub taken from direction F of FIG. 12(A), and FIG. 12(C) is a view of a blade-to-blade stream surface along a shroud taken from direction G of FIG. 12(A);

FIGS. 15 through 26 show those for impellers of a centrifugal pump with a low specific speed, FIGS. 15, 18, 21 and 24 showing pressure coefficient Cp curves (solid lines represent curves at the hub and broken lines represent curves at the shroud), FIGS. 16, 19, 22 and 25 showing blade loading $\partial(r\overline{V}_\theta)/\partial m$ curves (solid lines represent curves at the hub and broken lines represent curves at the shroud), FIGS. 17, 20, 23 and 26 showing secondary flow vector diagrams, FIGS. 15 through 17 showing the case designed by a conventional design method, FIGS. 18 through 20 showing the case designed by using only blade lean in a circumferential direction according to the present invention, FIGS. 21 through 23 showing the case designed by a combination of blade lean and blade loading $\partial(r\overline{V}_\theta)/\partial m$ according to the present invention, and FIGS. 24 through 26 showing the case designed by using only blade loading $\partial(r\overline{V}_\theta)/\partial m$ according to the present invention;

FIGS. 54 through 56 show the case designed by using only blade lean in a circumferential direction according to the present invention, FIGS. 57 through 59 showing the case designed by a combination of blade lean and blade loading $\partial(r\overline{V}_\theta)/\partial m$ according to the present invention, and FIGS. 60 through 62 showing the case designed by using only blade loading $\partial(r\overline{V}_\theta)/\partial m$ according to the present invention;

FIGS. 63 through 74 are graphs showing the relationship between meridional distance and blade angle, comparing the case designed by the conventional design method and the case designed by using only blade lean in a circumferential direction according to the present invention, or a combination of blade lean in a circumferential direction and blade loading $\partial(r\overline{V}_\theta)/\partial m$ according to the present invention, or only blade loading $\partial(r\overline{V}_\theta)/\partial m$ according to the present invention;

FIGS. 63 through 65 are for impellers of a centrifugal pump with a low specific speed, FIG. 63 showing blade angle $\beta_H$ curves at the hub, FIG. 64 showing blade angle $\beta_S$ curves at the shroud, and FIG. 65 showing blade angle difference $\beta_H-\beta_S$ curves;

FIGS. 66 through 68 are those for impellers of a mixed flow pump with a medium specific speed, FIG. 66 showing blade angle $\beta_H$ curves at the hub, FIG. 67 showing blade angle $\beta_S$ curves at the shroud, and FIG. 68 showing blade angle difference $\beta_H-\beta_S$ curves;

FIGS. 69 through 71 are those for impellers of a centrifugal compressor, FIG. 69 showing blade angle $\beta_H$ curves at the hub, FIG. 70 showing blade angle $\beta_S$ curves at the shroud, and FIG. 71 showing blade angle difference $\beta_H-\beta_S$ curves;

FIGS. 72 through 74 are those for impellers of a mixed flow compressor, FIG. 72 showing blade angle $\beta_H$ curves at the hub, FIG. 73 showing blade angle $\beta_S$ curves at the shroud, and FIG. 74 showing blade angle difference $\beta_H-\beta_S$ curves;

DETAILED DESCRIPTION OF PREFERRED EMBODIMENTS

An embodiment according to the first aspect of the present invention will be described below.

The influence of viscosity can be neglected for main flow of the relative flow in the flow passages of an impeller, therefore the following formula is approximately satisfied in incompressible flow as in a liquid pump.

$$P_{Trel}=p^*+0.5\rho W^2=\text{constant}$$

where $P_{Trel}$ is relative stagnation pressure upstream of the impeller.

Next, as non-dimensional quantity of reduced static pressure $p^*$ on the blade surface, pressure coefficient Cp is defined by the following equation:

$$Cp=(P_{Trel}-p^*)/(0.5\rho U^2)=(W/U)^2$$

where U represents the peripheral speed at the impeller exit.

Figure 3:
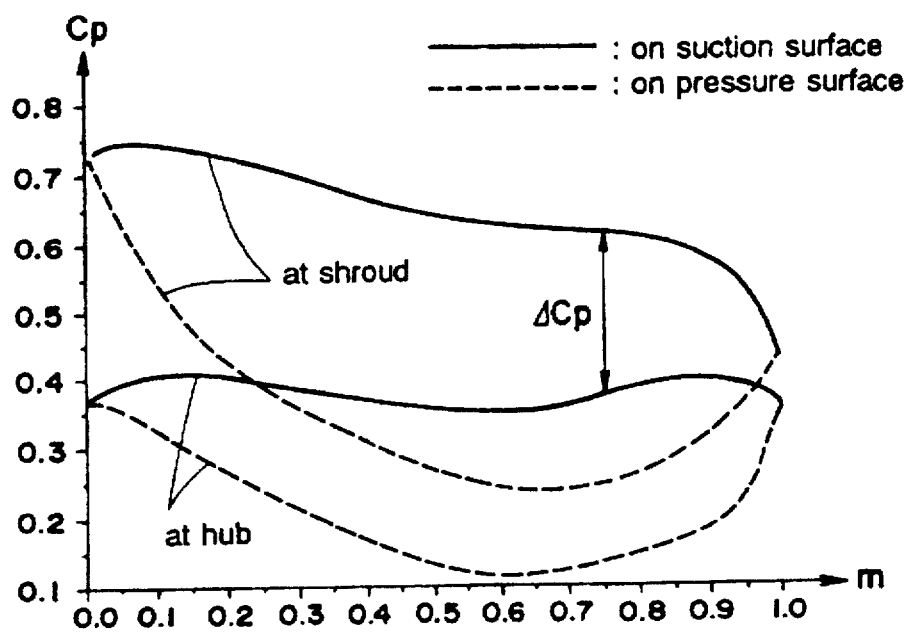
FIGS. 3 through 6 are graphs showing a relationship between a non-dimensional meridional distance m and a pressure coefficient Cp.

FIG. 3 shows the relationship between the non-dimensional meridional distance m and the pressure coefficient Cp, at the hub and the shroud of the blade. As is apparent from the above equation, the pressure coefficient Cp is large at the shroud where reduced static pressure $p^*$ is low, and is small at the hub where reduced static pressure $p^*$ is high. As mentioned above, since the meridional component of secondary flow on the blade suction surface is directed to the shroud side having low reduced static pressure $p^*$ from the hub side having high reduced static pressure $p^*$, suppression of the meridional component of secondary flow can be expected by reducing pressure difference $\Delta Cp$ therebetween. Incidentally, in case of incompressible fluid, the pressure coefficient Cp is equal to $(W/U)^2$, where W is relative velocity. In compressible fluid as in a compressor, the physical variable being related to the behavior of secondary flow is relative Mach number. In order to simplify the description, only the distribution of the pressure coefficient Cp will be described below. The influence of distribution of the pressure coefficient Cp in incompressible flow upon the meridional component of secondary flow is equivalent to that of the relative Mach number M in compressible flow.

Figure 4:
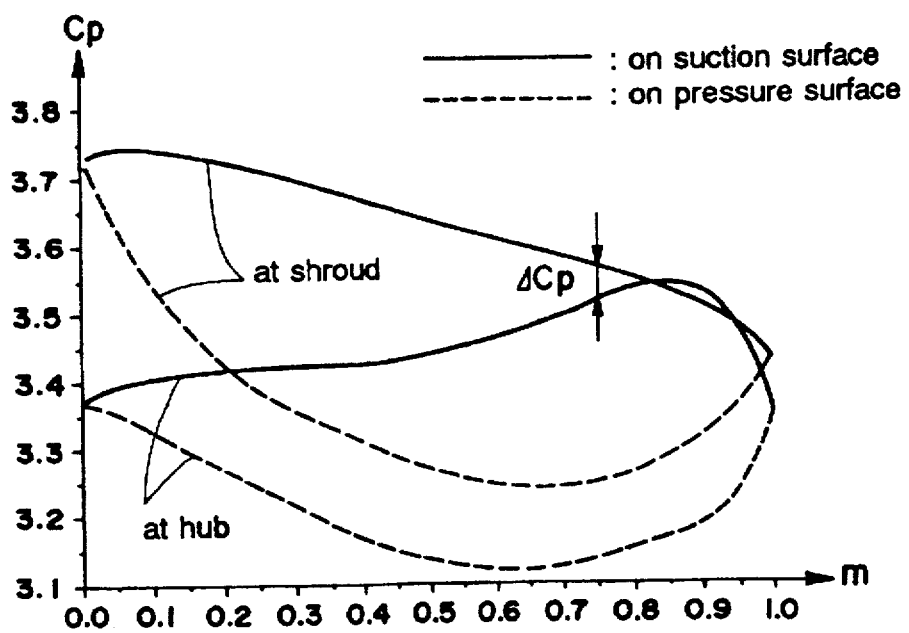
Figure 5:
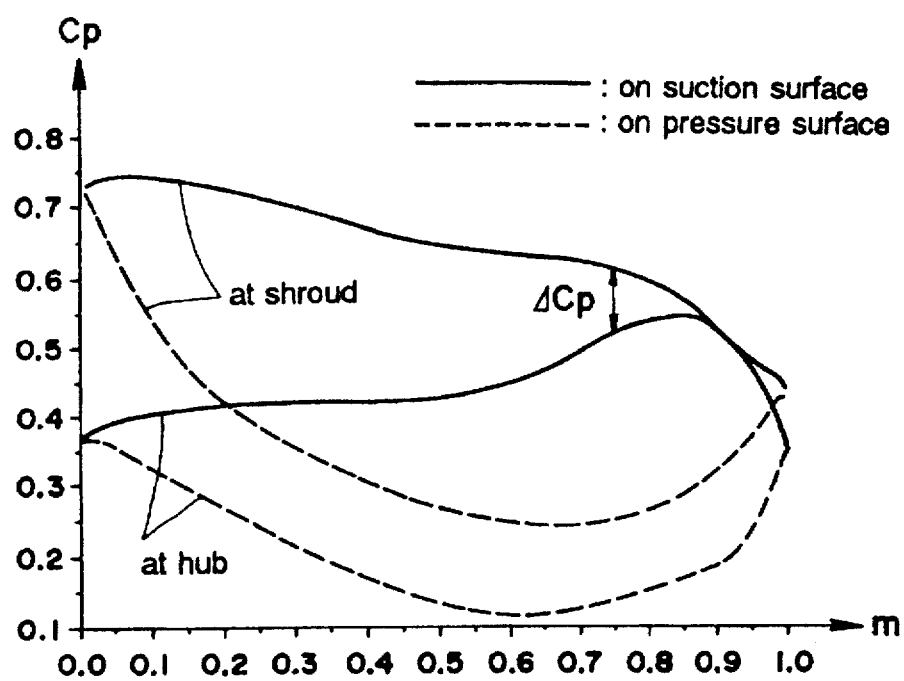

Since the boundary layers on the blade surfaces which develop along the wall of the flow passage in the impeller increase their in thickness cumulatively from the impeller inlet toward the impeller exit, the present invention proposes the structure for suppressing the meridional component of secondary flow on the suction surface of the blade, considering distribution of the pressure coefficient Cp in the latter half of the impeller. That is, the blade profile is designed so as to have the pressure distribution as shown in FIG. 4 in order that the pressure difference $\Delta Cp$ between the hub side and the shroud side on the suction surface shows a remarkably decreasing tendency toward the impeller exit. The pressure distribution on the blade in which the pressure difference $\Delta Cp$ decreases remarkably toward the impeller exit is achieved by the following:

(a) increasing blade loading at the hub side as shown in FIG. 5, i.e. the pressure difference between the pressure surface and the suction surface of the blade at the hub side is remarkably increased towards the impeller exit.

Figure 6:
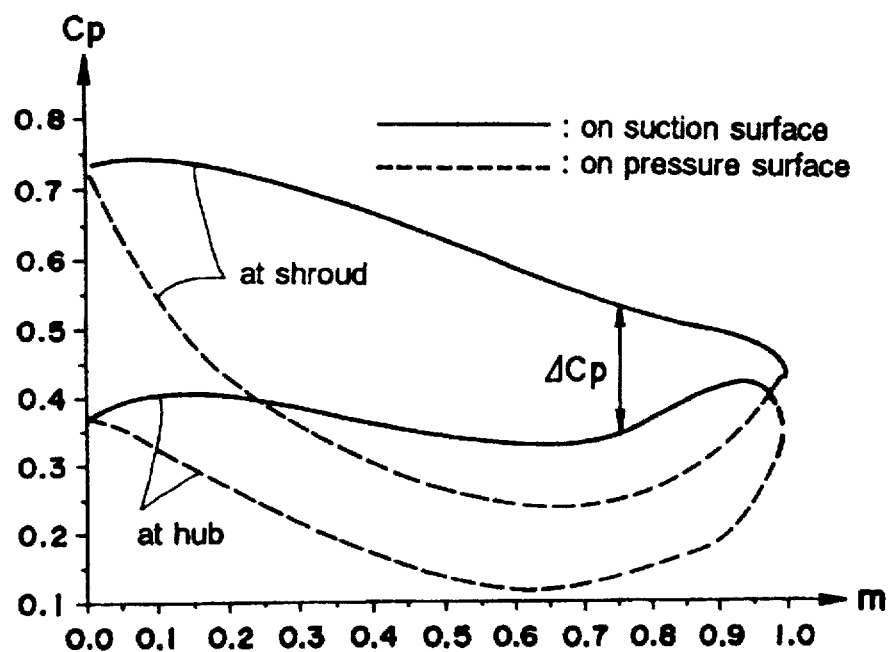

(b) decreasing blade loading remarkably at the shroud side towards the impeller exit as shown in FIG. 6.

(c) combining above described (a) and (b).

In any case, it is essential to have the pressure distribution on blades such that the pressure difference $\Delta Cp$ decreases remarkably towards the impeller exit on the suction surface of the blade as shown in FIG. 4.

According to a number of verification data, the degree of the above mentioned remarkably decreasing tendency is optimum when it is arranged such that the difference between a minimum value of reduced static pressure difference $\Delta Cp$ (or relative Mach number difference $\Delta M$) and a value of reduced static pressure difference $\Delta Cp$ (or relative Mach number difference $\Delta M$) at the location, corresponding to non-dimensional meridional distance obtained by subtracting non-dimensional meridional distance 0.4 from that representing the minimum value, is not less than 0.2 (0.15 in the case of relative Mach number difference $\Delta M$). Also the verification data show that the optimum location where the remarkably decreasing tendency emerges is in the range of non-dimensional meridional distance m=0.4–1.0.

In a centrifugal impeller or a mixed flow impeller having a low specific speed, the width of the impeller exit is narrow and the pressure difference between the hub surface and the shroud surface is small. Therefore the pressure difference $\Delta Cp$ is usually small at the impeller exit as in FIG. 4, i.e. at the location of the non-dimensional meridional distance m=1.0. On the other hand, at the impeller inlet, the pressure coefficient Cp is larger at the shroud than that at the hub. Accordingly, the pressure difference $\Delta Cp$ on the suction surface of the blade in the centrifugal impeller has a tendency to decrease towards the impeller exit in a manner similar to that in FIG. 4. However, in order to suppress secondary flow in such impellers, it is necessary that the pressure difference $\Delta Cp$ becomes almost zero, or the pressure difference $\Delta Cp$ becomes negative, that is, the decreasing tendency of the pressure difference $\Delta Cp$ is enhanced so that the pressure coefficient Cp at the hub becomes larger than that at the shroud. According to a number of verification data, the location where $\Delta Cp$ becomes nearly zero or changes its sign from positive to negative is favorable when it is located not less than a non-dimensional meridional distance of m=0.6, and is optimum when the location is in the range of non-dimensional meridional distance m=0.65–0.9. In the conventional design, since such specific consideration is not made, the meridional component of secondary flow cannot be suppressed effectively.

Next, an embodiment according to the second aspect of the present invention will be described below.

In order to realize the above distribution of the reduced static pressure $p^*$, the present invention proposes a structure in which the blade profile is determined based on the meridional derivative in the direction of non-dimensional meridional distance m of the circumferentially averaged angular momentum $r\overline{V}_\theta$ of fluid given by operation of the impeller.

Figure 12A:
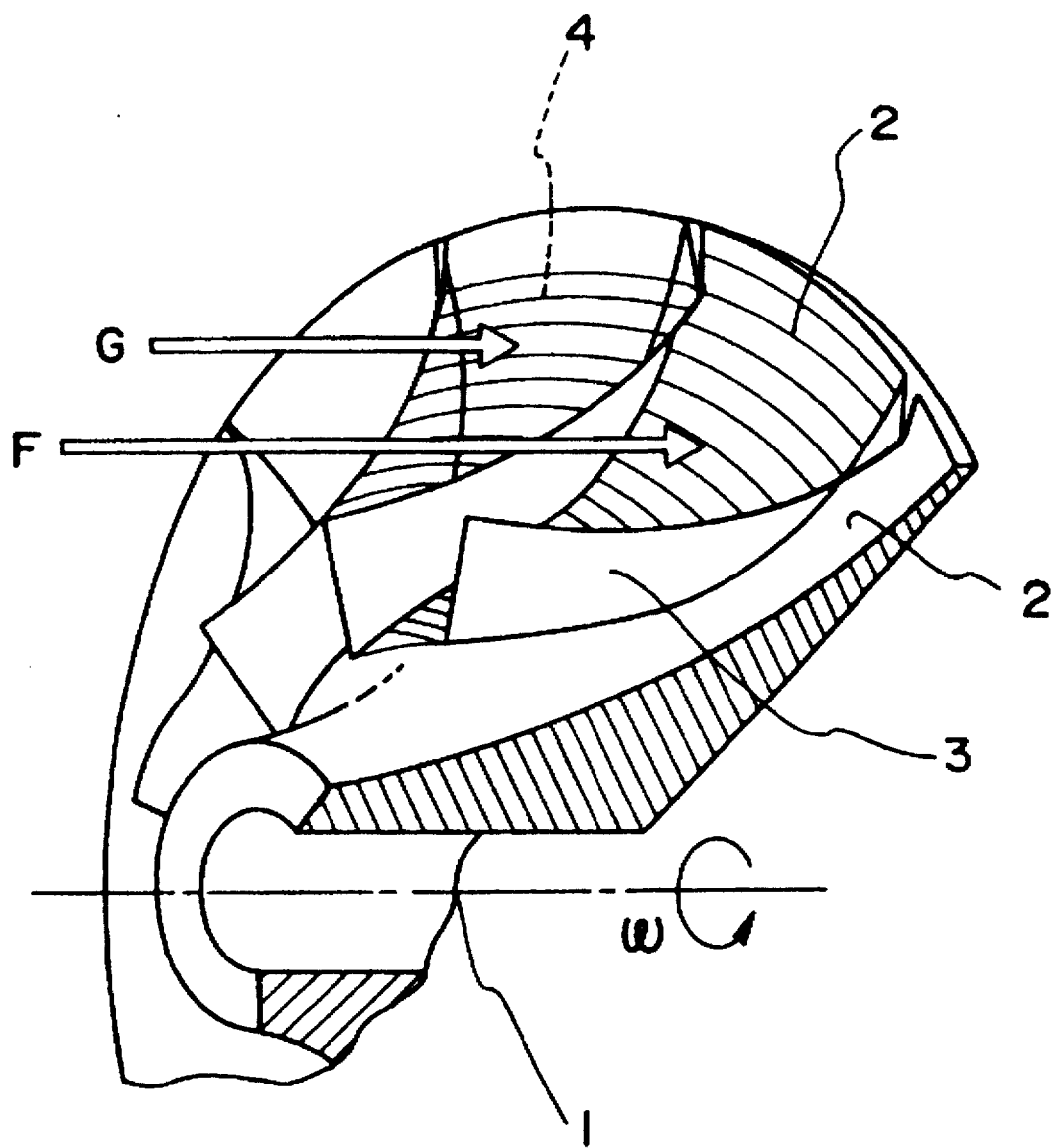
FIGS. 12(A), 12(B) and 12(C) are views for explaining blade angle defined on blade-to-blade stream surfaces.
Figure 12B:
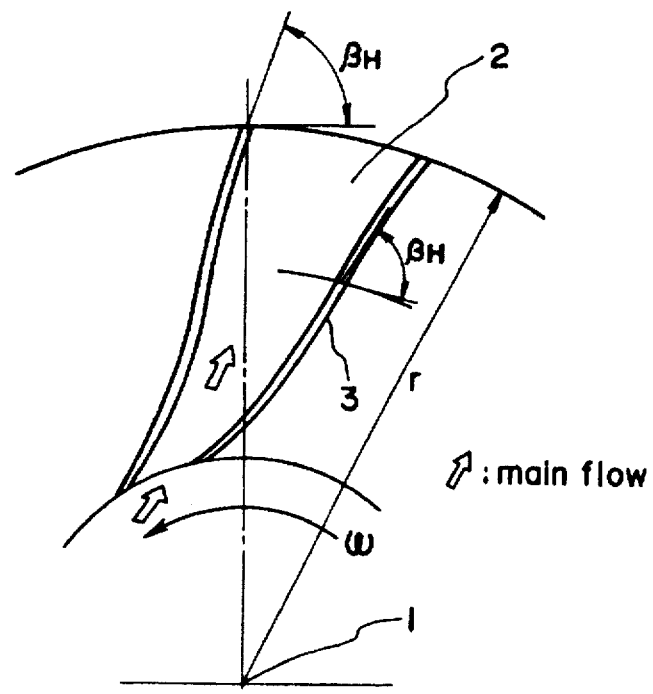
Figure 12C:
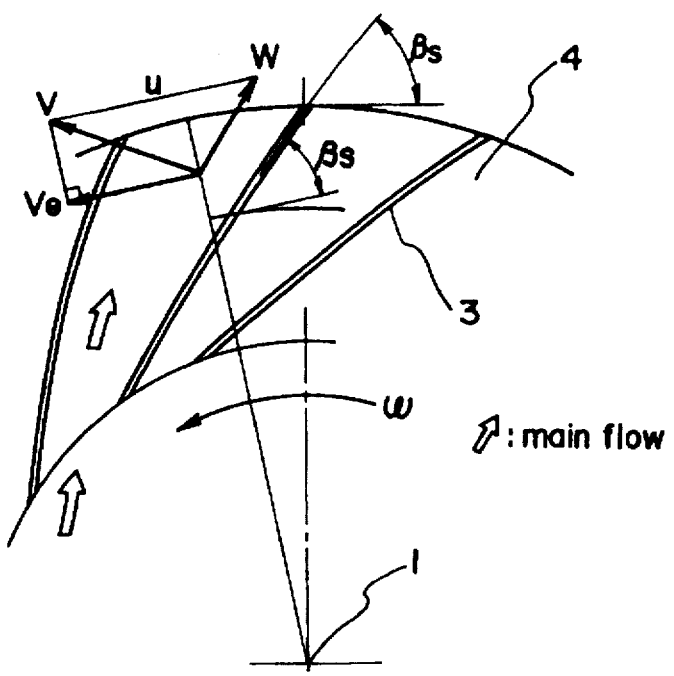

In general, blade loading of the impeller in a turbomachine, i.e. the pressure difference $p^*(+)-p^*(-)$ between the pressure surface and the suction surface is expressed by the following equation.

$$p^*(+)/\rho-p^*(-)/\rho=2\pi(W_{b1}\nabla r\overline{V}_\theta)/B$$

where $W_{b1}$ is relative velocity at the blade surface location, B is the number of blades, $\nabla$ is a differential multiplier which gives a primary derivative in space co-ordinates, and $V_\theta$ represents the tangentially averaged value of circumferential velocity component $V_\theta$ of the absolute velocity V as shown for example in the blade-to-blade plane at the hub in FIGS. 12(C)(1) and 12(C)(2).

From the above equation, it is acknowledged that the pressure difference between the pressure surface and the suction surface is closely related to the meridional derivative of $r\overline{V}_\theta$ (angular momentum) which is a product of radius r in the flow passage and the tangentially averaged value of circumferential velocity component $V_\theta$ of the absolute velocity at the radius.

Figure 7A:
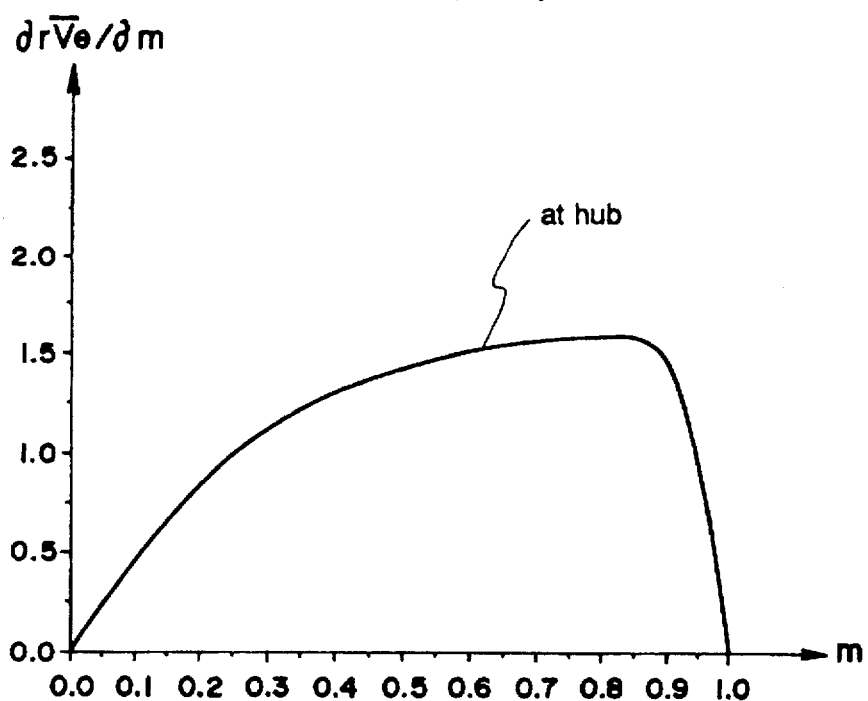
FIGS. 7(A), 7(B) and 8 are graphs showing a relationship between the non-dimensional meridional distance m and $\partial(r\overline{V}_\theta)/\partial m$, $\partial(r\overline{V}_\theta)/\partial m$ being a meridional derivative of $r\overline{V}_\theta$ (angular momentum) which is product of radius r in a flow passage and tangentially averaged value of a circumferential velocity component $V_\theta$ of absolute velocity V at the radius r.
Figure 7B:
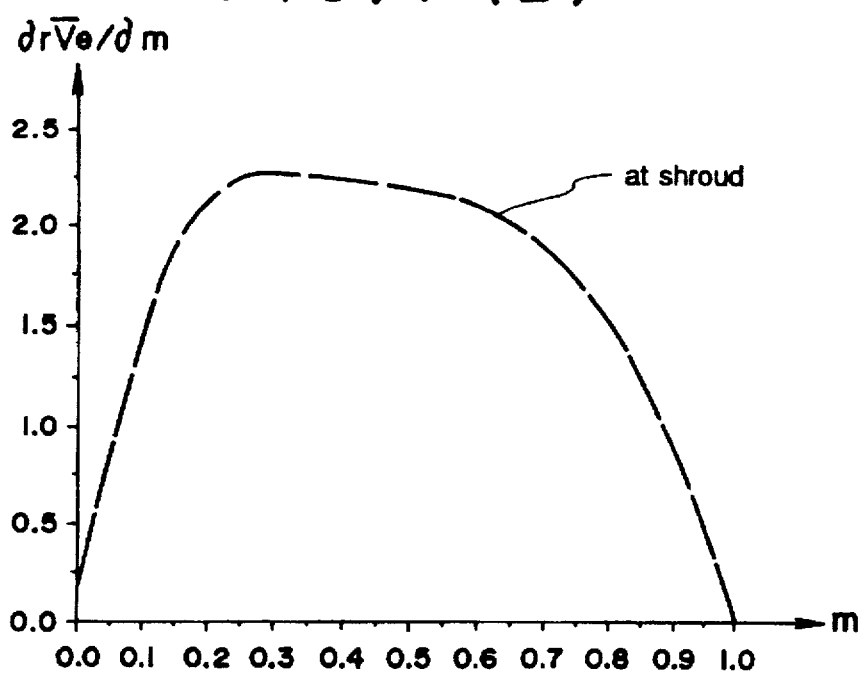
Figure 8:
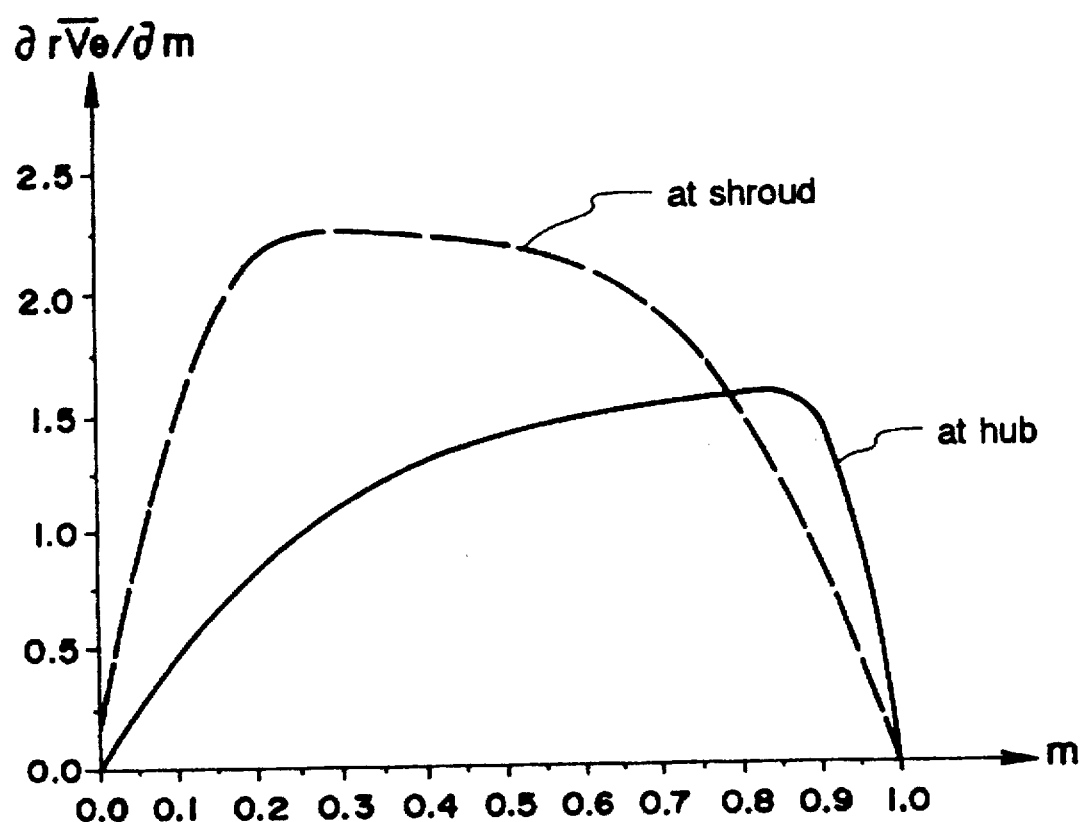

Therefore, as shown in FIGS. 5 and 6, in order to increase or decrease the pressure coefficient Cp, the meridional derivative of $r\overline{V}_\theta$ should be set to a proper value. In the present invention, the meridional derivative of $r\overline{V}_\theta$ is given as follows:

The distribution of $\partial(r\overline{V}_\theta)/\partial m$ at the hub is given such that $\partial(r\overline{V}_\theta)/\partial m$ has a small value near the impeller inlet and a maximum value near the impeller exit as shown in FIG. 7(A), whereby the blade loading $p^*(+)-p^*(-)$ on the hub surface is increased in the aft part of the impeller and is reduced in the fore part of the blade. Next, $\partial(r\overline{V}_\theta)/\partial m$ distribution on the shroud surface is given such that $\partial(r\overline{V}_\theta)/\partial m$ has a maximum value near the impeller inlet and a low value near the impeller exit as shown in FIG. 7(B), whereby the blade loading $p^*(+)-p^*(-)$ on the shroud surface is increased in the fore part of the impeller and decreased in the aft part of the blade. In FIG. 8, by combining $\partial(r\overline{V}_\theta)/\partial m$ distributions on the hub surface and the shroud surface, the meridional derivative of $r\overline{V}_\theta$ in the direction of the meridional distance can be higher at the shroud than that at the hub near the impeller inlet, and it can be higher at the hub than that at the shroud near the impeller exit. In this case, the distribution of $\partial(r\overline{V}_\theta/\partial m)$ at the hub crosses over that at the shroud at the location between the non-dimensional meridional distance of m=0-1.0. By using this type of $\partial(r\overline{V}_\theta)/\partial m$ distribution, it is possible to enhance substantially the decreasing tendency of the reduced static pressure difference $\Delta Cp$ towards the impeller exit in the meridional direction, because this type of distribution results in a relatively large value of $\Delta Cp$ near the inlet of the impeller and a relatively small value of $\Delta Cp$ near the exit of the impeller. Thereby the meridional component of secondary flow on the suction surface of blade can be effectively suppressed. Many verification data prove that the location at which both curves cross is preferably not less than a non-dimensional meridional distance of m=0.5 and is optimum in a range of non-dimensional meridional distance m=0.55-0.85. The location, where $\partial(r\overline{V}_\theta)/\partial m$ at the shroud has a maximum value in the fore part of the impeller, is preferable when it is in the range of non-dimensional meridional distance m=0-0.3, and the location, where $\partial(r\overline{V}_\theta)/\partial m$ at the hub has a maximum value in the aft part of the impeller, is preferable when it is in the range of non-dimensional meridional distance m=0.6-1.0.

Figure 76:
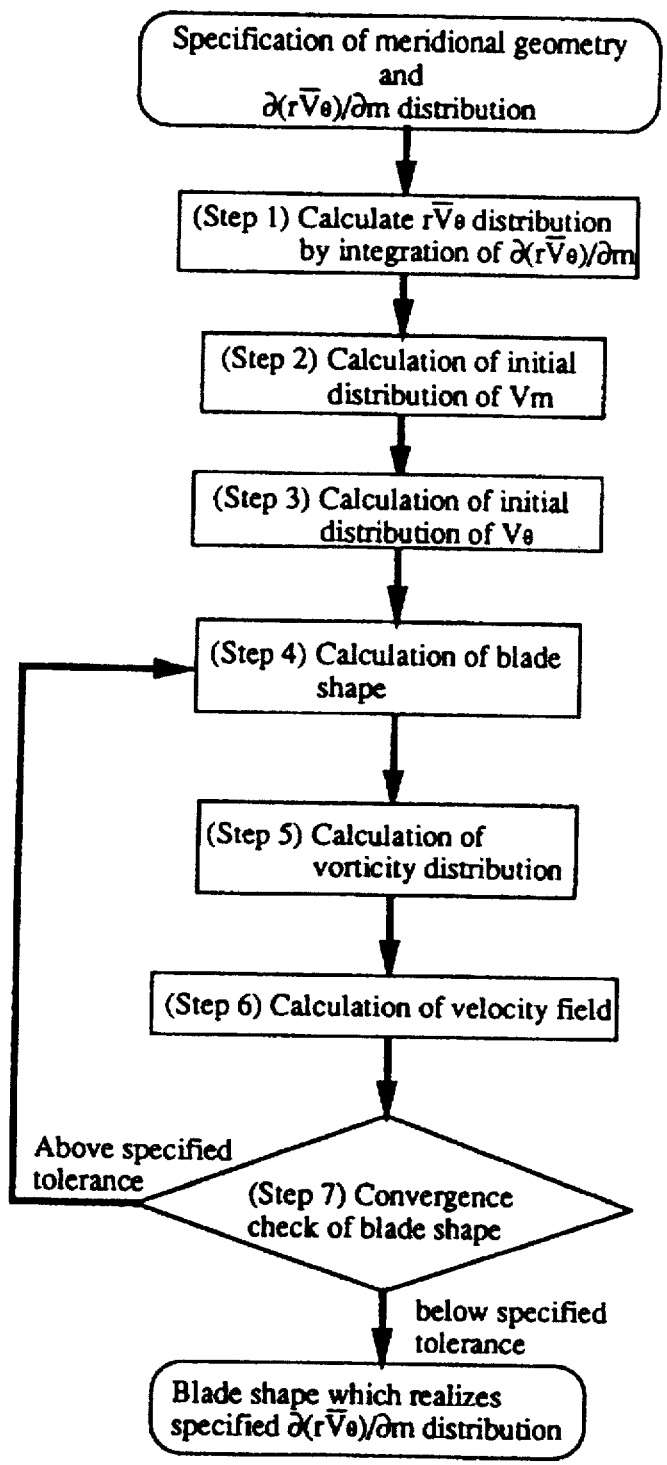
FIG. 76 is a flow chart showing the flow of numerical calculation in the three-dimensional inverse design method used to acquire the verification data for the turbomachine impellers of the present invention.

If a proper distribution of loading distribution $\partial(r\overline{V}_\theta)/\partial m$ is determined, the three-dimensional geometry of the impeller which realizes such distribution can be determined by trial and error modification of the blade profile using a flow analysis method. However, more efficiently, such three-dimensional geometry can also be determined by using a three-dimensional inverse design approach, which is widely known as a method to calculate numerically the three-dimensional blade profile which will realize specified blade loading distribution. Different theories of three-dimensional inverse design method have been proposed; for example, Zangeneh, M., 1991, "A Compressible Three Dimensional Blade Design Method for Radial and Mixed Flow Turbomachinery Blades", International Journal of Numerical Methods in Fluids, Vol. 13, pp. 599–624., Borges, J. E., 1990, "A Three-Dimensional Inverse Method for Turbomachinery: Part I—Theory", Transaction of the ASME, Journal of Turbomachinery, Vol. 112, pp. 346–354, Yang, Y. L., Tan, C. S. and Hawthorne, W. R., 1992, "Aerodynamic Design of Turbomachinery Blading in Three-Dimensional Flow: An Application to Radial Inflow Turbines", ASME Paper 92-GT-74, Dang, T. Q., 1993, "A Fully Three-Dimensional Inverse Method for Turbomachinery Blading in Transonic Flows", Transactions of the ASME, Journal of Turbomachinery, Vol. 115, pp. 354–361. The method, proposed by M. Zangeneh (1991) and used in the present invention, is briefly explained as follows. Blades are represented by sheets of vorticity which is distributed along the blade camber line, and the strength of the vorticity is determined by a specified distribution of $r\overline{V}_\theta$ which is the product of tangentially averaged value of circumferential velocity $\overline{V}_\theta$ and radius r. $\overline{V}_\theta$ can be easily determined from the blade loading distribution $\partial(r\overline{V}_\theta)/\partial m$ and the meridional geometry by integration of $\partial(r\overline{V}_\theta)/\partial m$ along the non-dimensional distance m. The blade profile for realizing the blade loading distribution $\partial(r\overline{V}_\theta)/\partial m$ specified in the present invention can be determined by using the condition that velocity induced by sheets of vorticity in the flow field must be aligned to the blade surfaces. The flow of numerical calculation in the three-dimensional inverse method is shown in FIG. 76 as a flow chart and can be briefly explained as follows.

(Step 1) Calculate $r\overline{V}_\theta$ distribution on the meridional plane by integrating the specified loading distribution $\partial(r\overline{V}_\theta)/\partial m$ along the non-dimensional meridional distance m.

(Step 2) Estimate meridional component of the velocity Vm based on the specified design mass flow rate of the impeller and the cross-sectional area of the specified meridional geometry.

(Step 3) Estimate tangential component of the velocity $\overline{V}_\theta$ by dividing $r\overline{V}_\theta$ by the radius r at each location within the impeller. At this stage, the velocity field obtained is an initial approximation of the actual velocity field as the effects of blade shape are not included accurately.

(Step 4) Calculate the blade shape at each location by using the velocity field and the inviscid slip condition which implies that the relative flow must be aligned to the blade surfaces. The blade shape is calculated by solving a first order hyperbolic partial differential equation, and so it is possible to give blade lean at the impeller exit by specifying the θ distribution along the blade exit as an initial value for integration.

(Step 5) Calculate the velocity distribution throughout the blade region based on the calculated $r\overline{V}_\theta$ distribution obtained at Step 1 and the blade shape at this stage obtained at Step 4.

(Step 6) Calculate the velocity field by solving the governing partial differential equations using the velocity distribution obtained at Step 5 and the calculated blade shape obtained at Step 4.

(Step 7) Go back to Step 4 with the revised velocity field obtained at Step 6, and repeat the process from Step 4 to Step 7 until changes in blade shapes between iterations fall below a certain given tolerance.

Next, an embodiment according to the third aspect of the present invention will be described below.

Figure 1A:
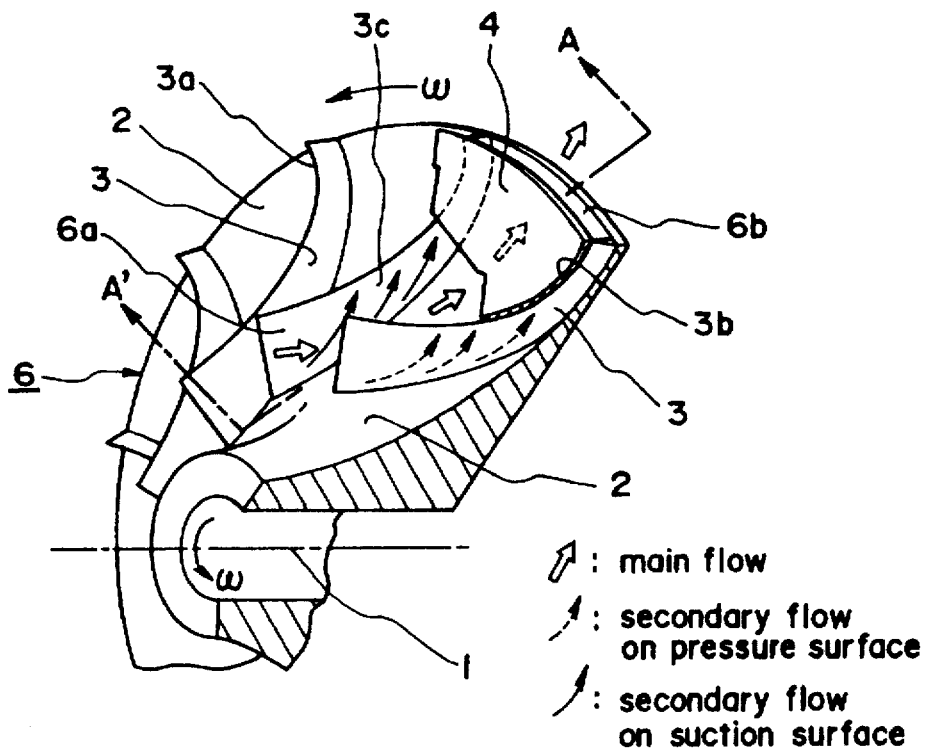
FIGS. 1(A) and 1(B) are views for explaining meridional component of secondary flow in three-dimensional geometry of a closed type impeller.
Figure 1B:
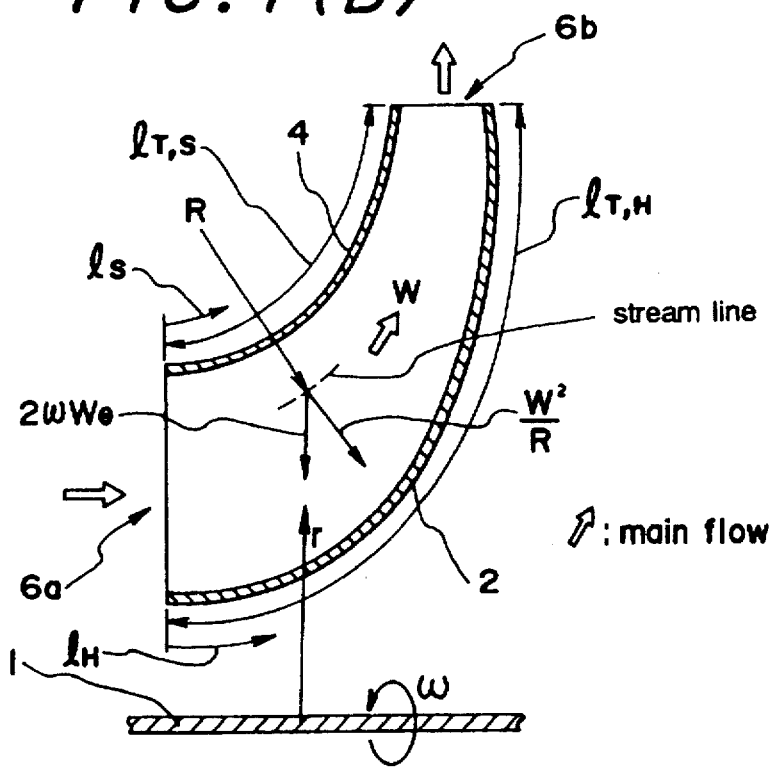
Figure 2A:
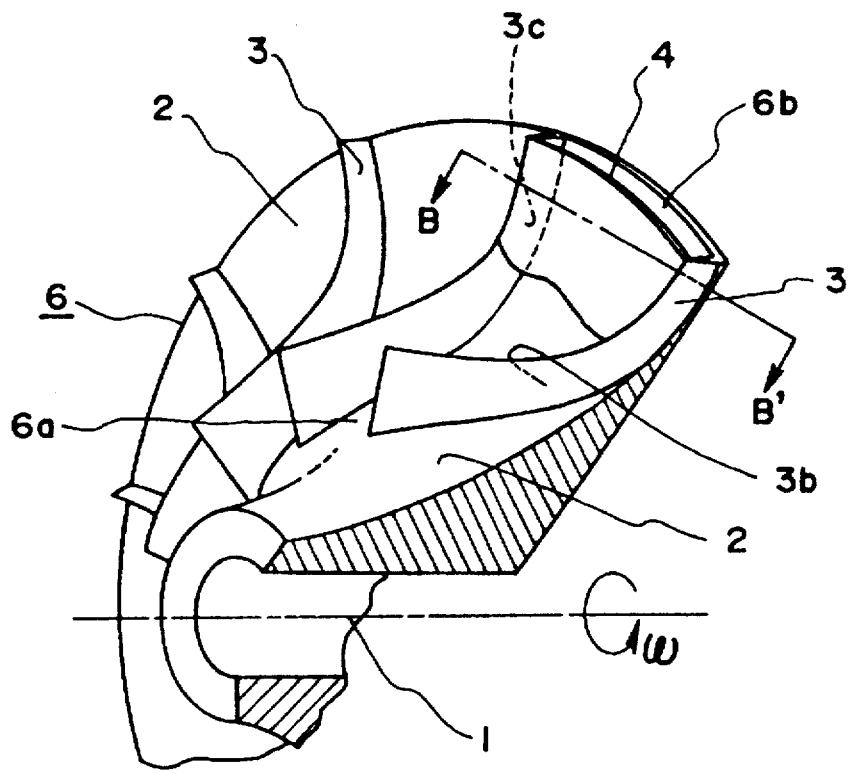
FIGS. 2(A) and 2(B) are views for explaining secondary vortices caused by a meridional component of secondary flow in the closed type impeller.
Figure 2B:
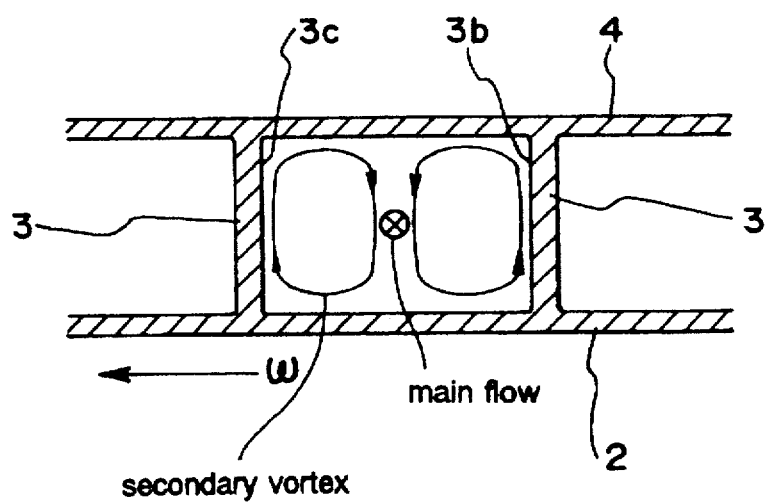
Figure 9A:
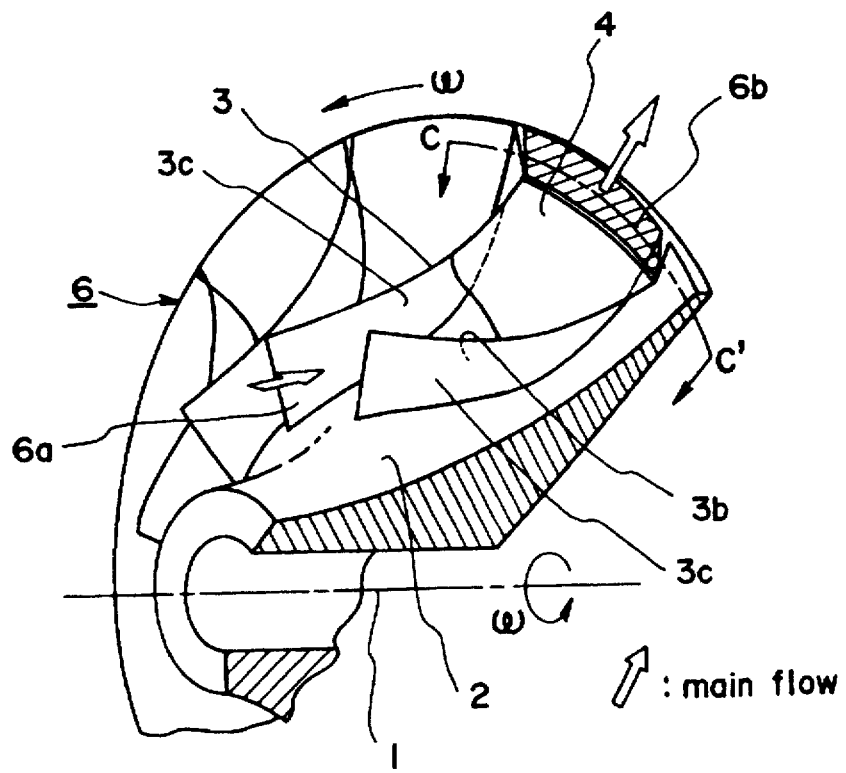
FIG. 9(A) is a perspective view of an impeller, partly in section.
Figure 9B:
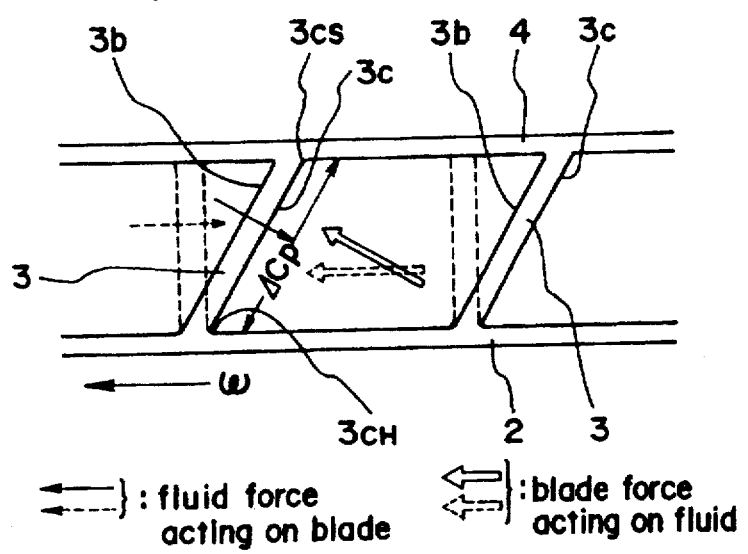
FIG. 9(B) is a cross-sectional view taken along a line C–C' of FIG. 9(A)

According to the present invention, in order to optimize the distribution of the reduced static pressure p* in the impeller, the blades are leaned in the circumferential direction in such a way that the blade at the hub precedes that at the shroud in the rotating direction of the impeller. FIG. 9(A) shows schematically a perspective view of the three-dimensional geometry of a closed type impeller partly in section, similar to FIG. 1(A). FIG. 9(B) shows a cross-sectional view taken along a line C–C' in FIG. 9(A). Here, the symbols in FIGS. 9(A) and 9(B) represent the same parts shown in FIG. 1(A) having the same symbols.

As shown schematically in FIG. 9(B), due to the pressure difference between the blade pressure surface 3b and the blade suction surface 3c, a fluid force acts on the blade nearly normal to the blade surface, and a reaction force acts on the fluid in the opposite direction towards the blade suction surface 3c nearly normal to the blade 3. When there is no blade lean in the circumferential direction as shown with broken lines in FIG. 9(B), the force acts on the fluid in the circumferential direction and has no force component normal to the hub or the shroud.

On the other hand, if the blade 3 is inclined such that the blade at the hub 3CH precedes that at the shroud 3CS in the rotating direction of the impeller, a force having a component normal to the shroud surface acts on the fluid as a reaction force directed from the pressure side to the suction side of the flow passage as shown in FIG. 9(B). As a result, a reduced static pressure field is produced in the flow passage to balance the above described blade force acting on fluid, and the reduced static pressure p* has a higher value at the shroud surface and a lower value at the hub surface as compared to the case with no blade lean. Therefore, the pressure difference ΔCp between the hub surface and the shroud surface of pressure coefficient Cp distribution in FIG. 3 decreases, thus the pressure field suitable for secondary flow suppression can be formed as shown in FIG. 4.

The influence of blade lean in the circumferential direction upon the meridional component of secondary flow has been studied qualitatively by conventional research on axial flow turbomachines. However, since the influence of the blade geometry on the secondary flows has not been essentially and quantitatively understood, effects of blade lean have been utilized under a certain limitation in the conventional blade lean by simply shifting the shroud side of the blade in the circumferential direction keeping the blade lean angle γ the same between the blade inlet and the blade exit, or by stacking conventional blade profiles along a curved spanwise stacking line.

Figure 10:
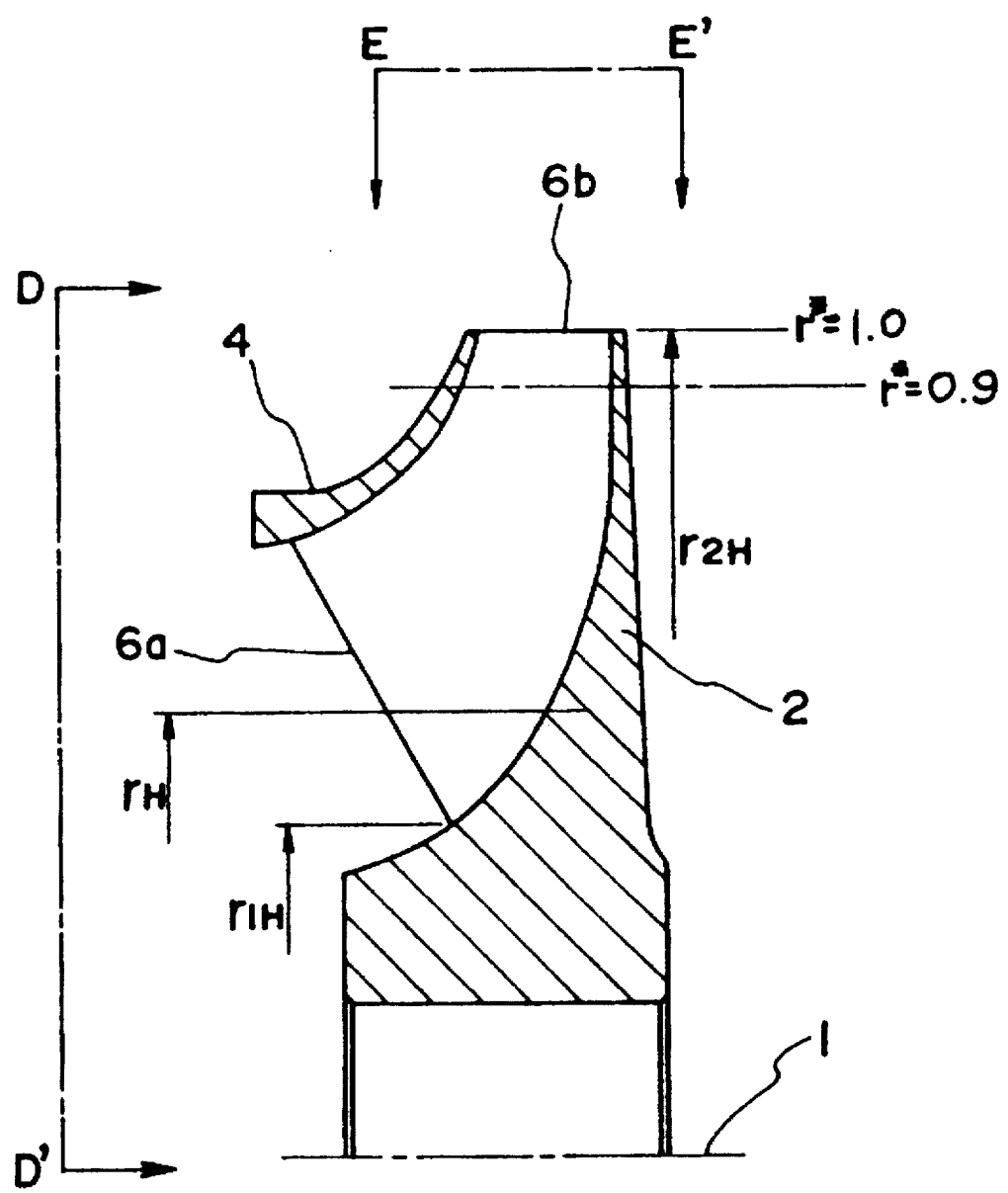
FIG. 10 is a meridional cross-sectional view of such impeller.
Figure 11A:
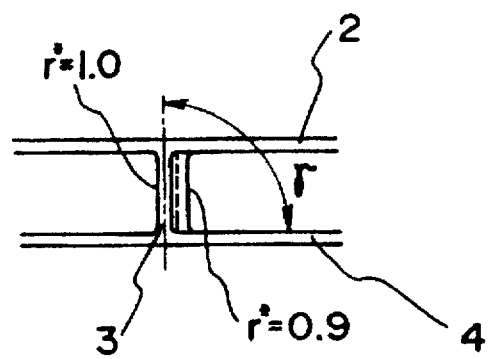
FIGS. 11(A)(1), 11(B)(1) and 11(C)(1) and FIGS. 11(A)(2), 11(B)(2) and 11(C)(2) are views as viewed from D–D' and E–E' of FIG. 10 respectively, FIGS. 11(A)(1) and 11(A)(2) show an impeller designed by a conventional design method, FIGS. 11(B)(1) and 11(B)(2) show an impeller having lean blade designed by a conventional design method, and FIGS. 11(C)(1) and 11(C)(2) show an impeller having lean blade designed by the present invention.
Figure 11A:
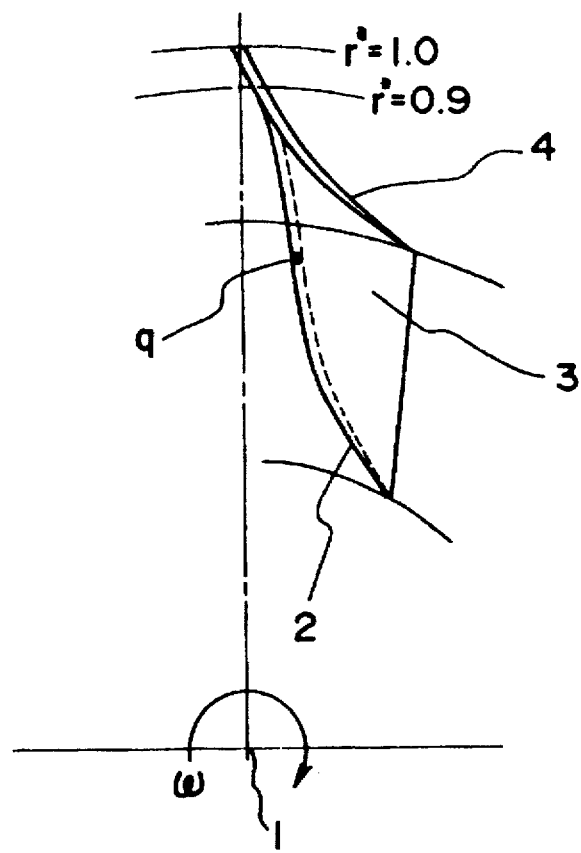
Figure 11B:
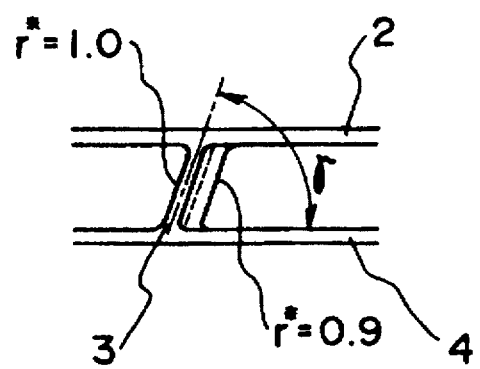
Figure 11B:
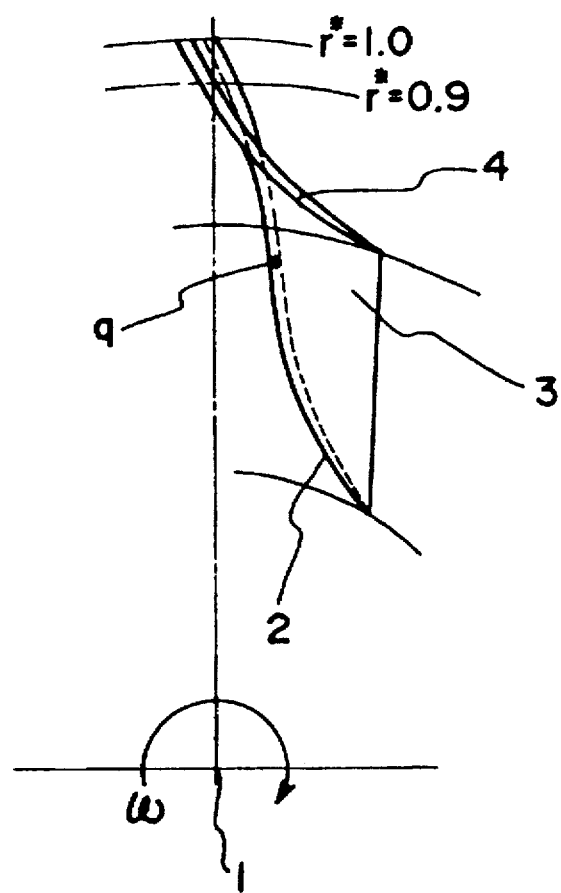

FIG. 10 schematically shows the meridional cross-section of a closed impeller, and the plan view of the impeller viewed in the D–D' direction of FIG. 10 from the impeller inlet 6a and the plan view of the impeller outlet viewed in the E–E' direction of FIG. 10 from the impeller exit 6b are presented together in FIGS. 11(A)(1), 11(B)(1), 11(C)(1) and 11(A)(2), 11(B)(2), 11(C)(2), respectively. When a conventional blade lean, disclosed for example in Japanese laid-open Patent Publication No.55-134798, is applied to a conventional impeller shown in FIGS. 11(A)(1) and 11(A)(2), the impeller having the plan view of FIGS. 11(B)(1) and 11(B)(2) is obtained. In this conventional blade lean, the blade in the shroud side is simply shifted in the circumferential direction without modifying blade geometry at the shroud. In this case, the location of reflection point q on the blade camber line at the hub 2, where the blade curvature changes its sign, is the same with that of the conventional impeller shown in FIG. 11(A)(2). Also, FIG. 11(B)(1) shows that the blade lean angle γ, defined as the angle between the center line of the blade 3 and the shroud surface 4, remains nearly constant near the impeller exit.

Figure 11C:
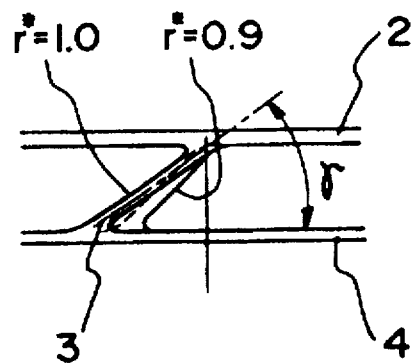
Figure 11C:
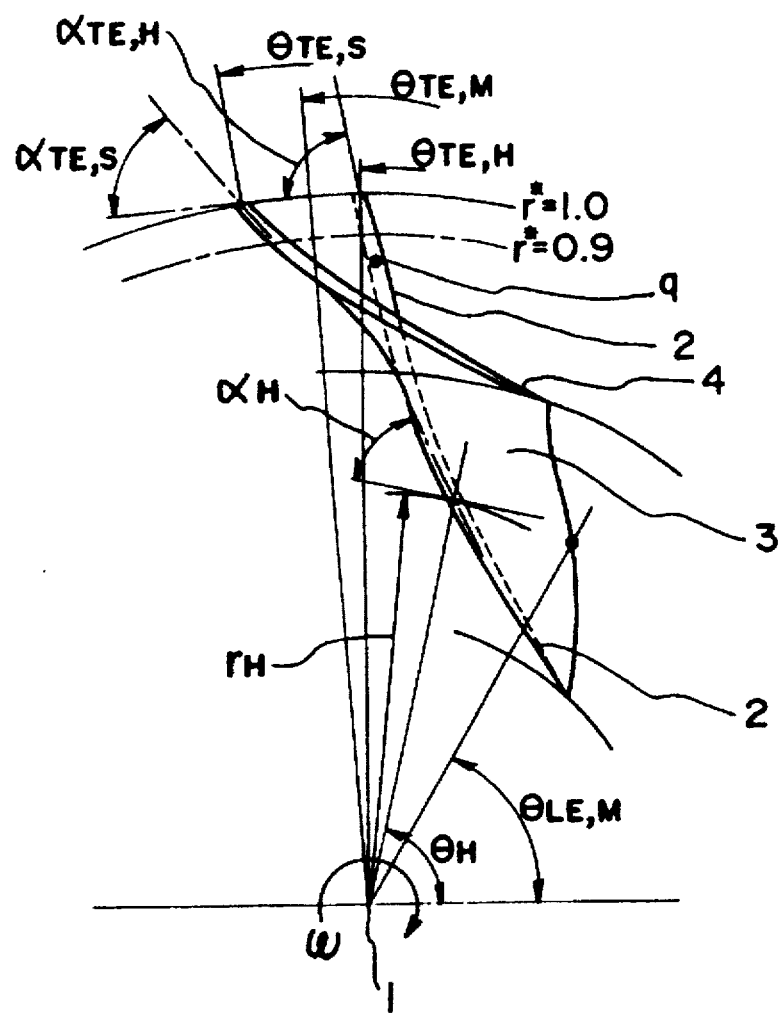

On the other hand, in the third aspect of the present invention, the blade geometry at the hub is modified more actively by shifting the location of the reflection point q radially outward and thus reducing the degree of backsweep at the latter part of the blade. Namely, the blade angle $d_H$ at the hub is increased toward the impeller exit, and the blade geometry of the flow passage is designed so that the hub side precedes the shroud side in the direction of the impeller revolution. In this case, as shown in FIG. 11(C)(2), the reflection point q of the blade camber line at the hub is moved toward the exit side of the impeller compared to the case of conventional blade lean shown in FIG. 11(B)(2). Also, impellers are designed such that the degree of the backsweep, i.e. {d(rθ)/dr}, towards the impeller exit becomes higher at the shroud side, giving {d(rθ)/dr}$_S$>{d(rθ)/dr}$_H$, where, suffix "S" represents a value at the shroud and "H" at the hub.

Also, it is favorable to design the blade lean angle γ such that it shows decreasing tendency towards impeller exit as shown in FIG. 11(C)(1). Here, it is necessary not to keep the value of the blade lean angle γ constant. In this case, the pressure difference ΔCp is kept relatively high near the inlet because of the small effects of blade lean having a relatively large value of the blade lean angle γ, and the pressure difference ΔCp is reduced towards the exit because of large effects of the blade lean having a small value of the blade lean angle γ towards the exit of the impeller. Thus, a tendency of ΔCp to be remarkably reduced is obtained. In addition, as shown in FIG. 11(C)(2), it is preferable to design the impeller such that the blade exit angle $α_{TE}$, defined on the plan view of the impeller viewed from the impeller inlet side, has a tendency to decrease from the angle of $α_{TE,H}$ at the hub 2 to the angle of $α_{TE,S}$ at the shroud 4, and the blade angle $α_H$ at the hub has a maximum or a local maximum value at the exit side of the impeller.

The effects of blade lean become even more effective by giving such special consideration to the blade geometry in the hub side in addition to the conventional blade lean created by moving the shroud side in the opposite direction of the impeller revolution. Many verification data prove that the favorable radius position of the reflection point, where the blade angle $α_H$ becomes maximum and the blade profile at the hub changes the sign of its curvature, is located at a position not less than the radius ratio of $r^*=(r-r_{1H})/(r_{2H}-r_{1H})=0.6$ or after the non-dimensional meridional distance of m=0.7, where $r_{1H}$ represents the impeller inlet radius at the hub and $r_{2H}$ the impeller exit radius at the hub as shown in FIG. 10. Also it was proved that the effects of blade lean become most effective when the blade lean ratio S is more than $S=(θ_{TE,S}-θ_{TE,H})/(θ_{TE,M}-θ_{LE,M})=0.14$, where θ represents the circumferential co-ordinate of a cylindrical polar co-ordinate system as shown in FIG. 11(C)(2), suffix "TE" the value at the blade exit (blade trailing edge), "LE" the value at the blade inlet (blade leading edge), "S" the value at the shroud 4, "H" the value on the hub 2, and "M" the value at the midspan location.

However, in order to completely suppress the meridional component of secondary flow in a centrifugal or mixed flow turbomachine, which shows much stronger secondary flow than an axial turbomachine, the required blade lean in a circumferential direction becomes excessive, and the use of such lean becomes impractical because of difficulties in manufacturing, and structural and strength problems. On the other hand, according to the present invention, a method is proposed to suppress the meridional component of secondary flow by using the second aspect (optimization of the blade loading distribution ∂(rV$_θ$)/∂m) together with the blade lean without manufacturing difficulties, structural and strength problems.

Next, an embodiment according to the fourth aspect of the present invention will be described below.

With regard to optimization of ∂(rV$_θ$)/∂m distribution, or blade lean in a circumferential direction in which the blade is inclined towards a circumferential direction, or a combination of both according to the present invention, the three-dimensional blade profile is calculated by the three-dimensional inverse design method following the flow chart in FIG. 76. It has been proven that the impellers in which the meridional component of secondary flow is effectively suppressed have characteristic blade angle distributions, i.e. the fourth aspect of the present invention is to design an impeller which has the following blade angle distribution.

Figure 13A:
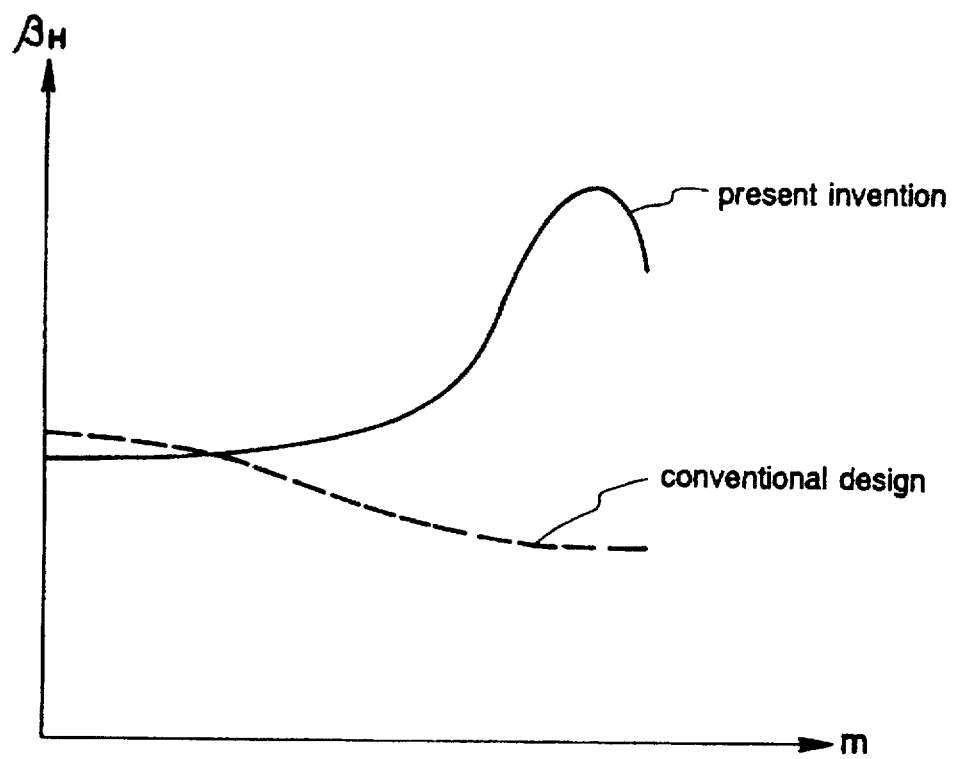
FIGS. 13(A) and 13(B) are graphs showing a relationship between the non-dimensional meridional distance m and blade angle, FIG. 13(A) showing blade angle $\beta_H$ curves at the hub, and FIG. 13(B) showing blade angle $\beta_H$ curves at the shroud.

(a) Blade angle distribution with respect to non-dimensional meridional distance at the hub side increases remarkably towards the impeller exit as shown in FIG. 13(A).

Figure 13B:
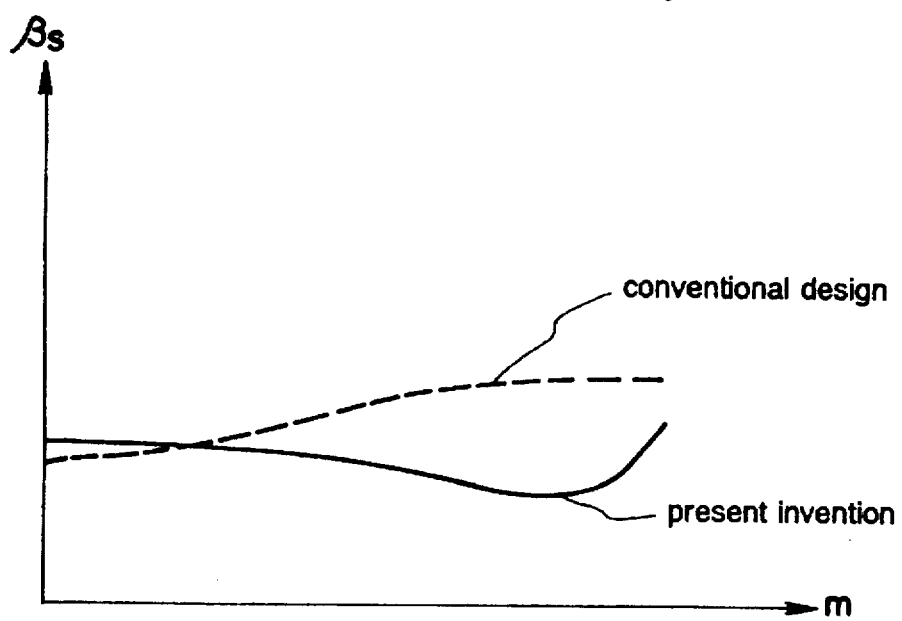

(b) Blade angle distribution with respect to non-dimensional meridional distance at the shroud surface side decreases remarkably towards the impeller exit as shown in FIG. 13(B).

Figure 14:
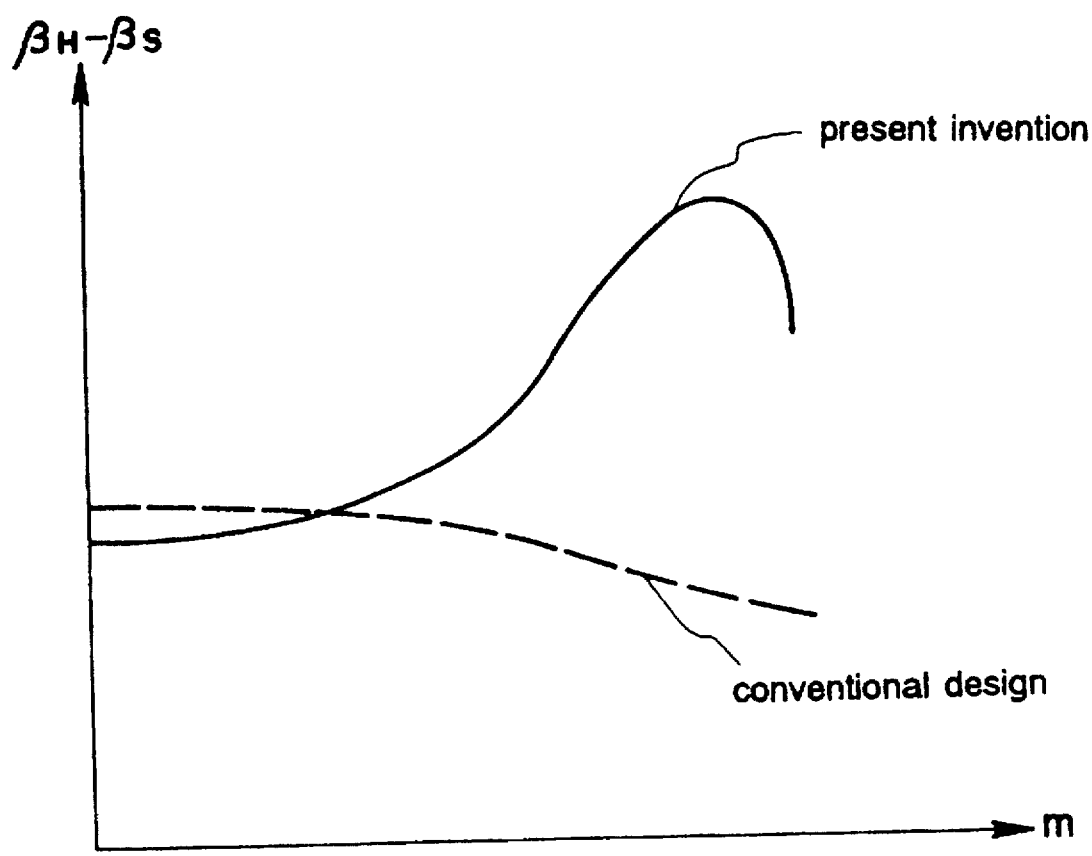
FIG. 14 is a graph showing curves of blade angle difference $\beta_H-\beta_S$ between blade angle $\beta_H$ at the hub and blade angle $\beta_S$ at the shroud.

(c) Blade angle difference between the hub and the shroud in the blade angle distribution with respect to non-dimensional meridional distance increases remarkably towards the impeller exit as shown in FIG. 14.

In this case, when the location of maximum value of blade angle difference is not less than the non-dimensional meridional distance of m=0.5 or most effectively in the range of non-dimensional meridional distance 0.7–1.0 and the maximum blade angle difference is not less than 20 degrees, it is ascertained in many verification data that the effect of suppression of the meridional component of secondary flow is remarkable. It is also ascertained that the maximum value of blade angle difference is larger than the average blade angle difference in the range of non-dimensional distance m=0.0–0.2 by more than 10 degrees. The definition of above described blade angle is presented in FIGS. 12(A) and 12(B). FIG. 12(A) shows a perspective view of a closed type impeller partly in section, which corresponds to that in FIG. 1(A). FIG. 12(B), viewed in direction F in FIG. 12(A), shows the blade profile on the surface hub 2 viewed normal to the hub 2 along the curved surface of hub 2. The blade angle $\beta_H$ at the hub 2 is defined as an angle between the camber line of the blade 3 and the tangential direction at a radial distance of r from the axis 1 of rotation. FIG. 12(C), viewed in direction G in FIG. 12(A), shows the blade profile on the surface of shroud 4 viewed normal to the shroud 4 along the curved surface of shroud 4. The blade angle $\beta_S$ at the shroud 4 is defined as an angle between the camber line of the blade 3 and the tangential direction at a radial distance r from the axis 1 of the rotation. The blade angle difference $\beta_H-\beta_S$ is defined as the angle difference between the blade angle $\beta_H$ at the hub 2 and the blade angle $\beta_S$ at the shroud 4. The physical meaning of the characteristic distribution in blade angles can be understood considering the basic structure for suppressing the meridional component of secondary flow as shown in FIG. 4. As the blade angle (defined from a circumferential direction) becomes large, fluid flow discharged from the impeller has a large swirl velocity, thus giving a large impeller work on the fluid flow. At this time, the pressure difference between the suction surface and the pressure surface, generating the impeller work, also increases, and hence the blade loading increases. That is, as the blade angle on the hub surface increases towards the impeller exit as shown in FIG. 13(A), the corresponding blade loading (the area surrounded by solid and broken lines in FIG. 5) on the hub surface increases towards the impeller exit as shown in FIG. 5. On the other hand, as the blade angle on the shroud surface decreases toward the impeller exit as shown in FIG. 13(B), the corresponding blade loading on the shroud surface decreases toward the impeller exit as shown in FIG. 6. As a result, it can be understood that by designing the impeller to have such a blade angle distribution, the pressure distribution on blades for effectively suppressing the meridional component of secondary flow can be realized. As is apparent from the description of FIG. 4, since the effect of suppression of the meridional component of secondary flow is determined by the difference of reduced static pressure distribution between the hub and the shroud on the blade suction surface, the blade angle difference between the hub and the shroud is physically important. Thus, the feature of the blade profile of the impeller which is advantageous to suppress the meridional component of secondary flow is reflected in the distribution of the blade angle difference shown in FIG. 14.

There is a case where the distribution of blade angle difference $\beta_H-\beta_S$ shows a tendency to decrease in a part of the non-dimensional distance between m=0–1.0 followed by a tendency to remarkably increase as the non-dimensional meridional distance increases. However, the effects of such remarkable increase of the blade angle difference on the suppression of secondary flow are basically the same.

The above characteristic feature of the blade angle distribution is reflected in the third aspect of the present invention, i.e. a characteristic feature of the blade lean in the circumferential direction. The location of the reflection point, where the hub blade profile changes the sign of its curvature as shown in FIG. 11(c)(2), gives the characteristic feature of the third aspect of the present invention, and is given as the location of minimum (rθ) change in the radial direction, i.e. the location where d(rθ)/dr becomes minimum. On the other hand, the blade angle $\beta_H$ defined in FIG. 12(B) is given by tan $\beta_H=\{dm/d(r\theta)\}_H$. Here, $$\tan \alpha_H = \{dr/d(r\theta)\}_H = \{dm/d(r\theta)\}_H (dr/dm)_H = \tan \beta_H (dr/dm)_H$$

and the value of $(dr/dm)_H$ is calculated once the meridional geometry is specified. Consequently, the location of the minimum $\{d(r\theta)/dr\}_H$ is closely correlated with the location of the maximum $\beta_H$. Because of this, it is easily acknowledged that the most effective location of such point of reflection on the hub, which is the characteristic feature of the third aspect of the present invention, is not less than the non-dimensional radius ratio of r*=0.6 or not less than the non-dimensional distance of m=0.7.

Next, verification data for ascertaining the above embodiments will be described below.

FIGS. 15 through 26 and FIGS. 27 through 38 show verification data for pump impellers. FIGS. 15 through 26 show those for a centrifugal impeller with a low specific speed and FIGS. 27 through 38 are those for a mixed flow impeller with a medium specific speed. FIGS. 39 through 50 and FIGS. 51 through 62 show verification data for compressor impellers, FIGS. 39 through 50 are those for a centrifugal impeller and FIGS. 51 through 62 are those for a mixed flow impeller. In order to ascertain the effect of suppression of the meridional component of secondary flow, the result of numerical analysis by a well established three-dimensional viscous calculation method (Dawes, W. N., 1988, "Development of a 3D Navier-Stores Solver for Application to all Types of Turbomachinery" ASME Paper No. 88-GT-70.) was used. FIGS. 17, 20, 23, 26, 29, 32, 35, 38, 41, 44, 47, 50, 53, 56, 59, 62 show flow velocity vectors in the vicinity of the suction surface of the blade predicted by numerical analysis and the flow pattern of secondary flow in the boundary layer along the suction surface.

Figure 15:
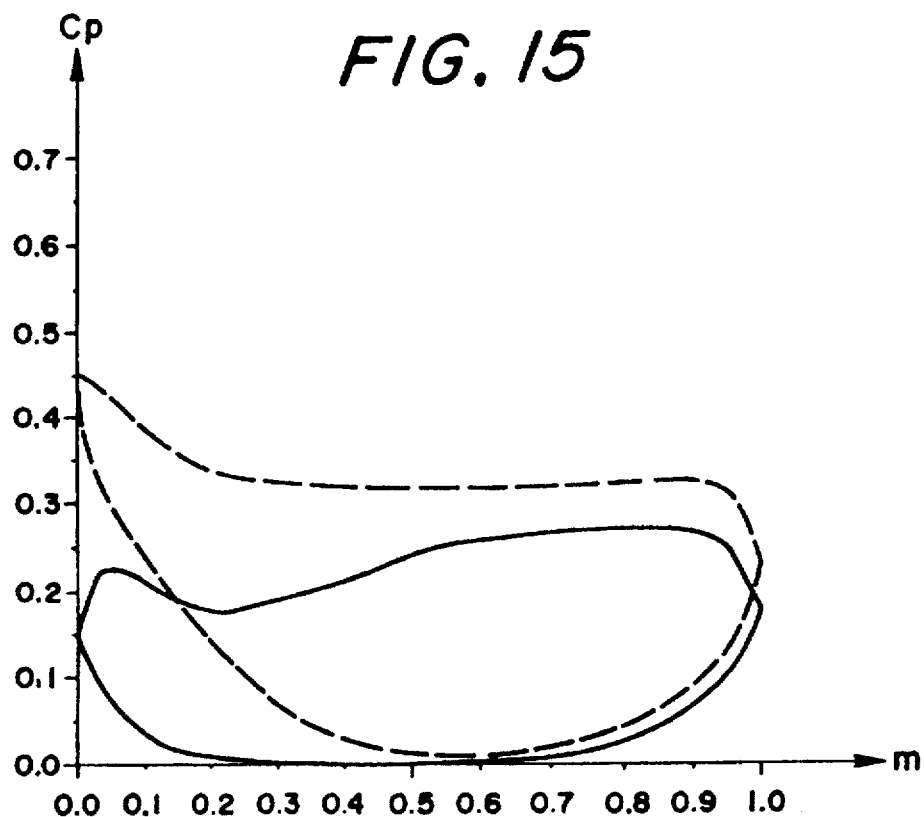
FIGS. 15 through 74 are graphs of verification data of the best mode for carrying out the present invention.
Figure 16:
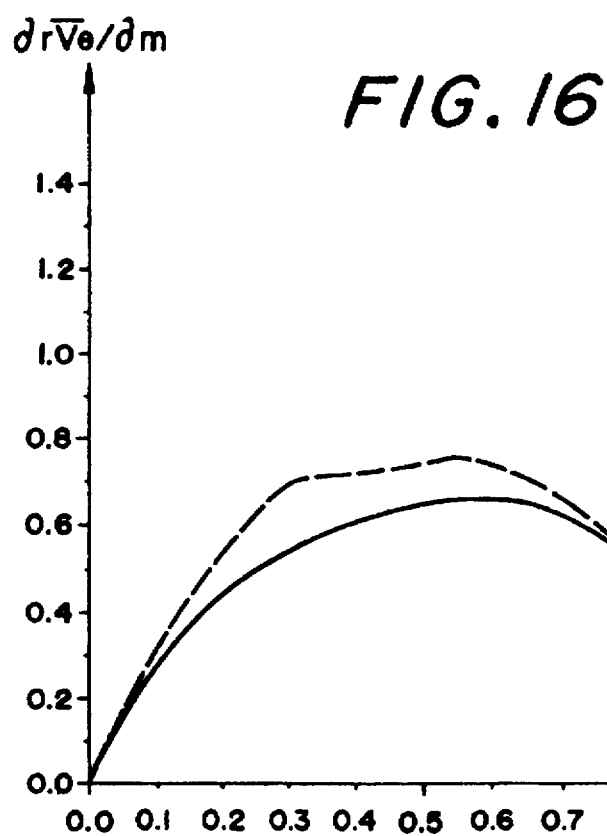
Figure 17:
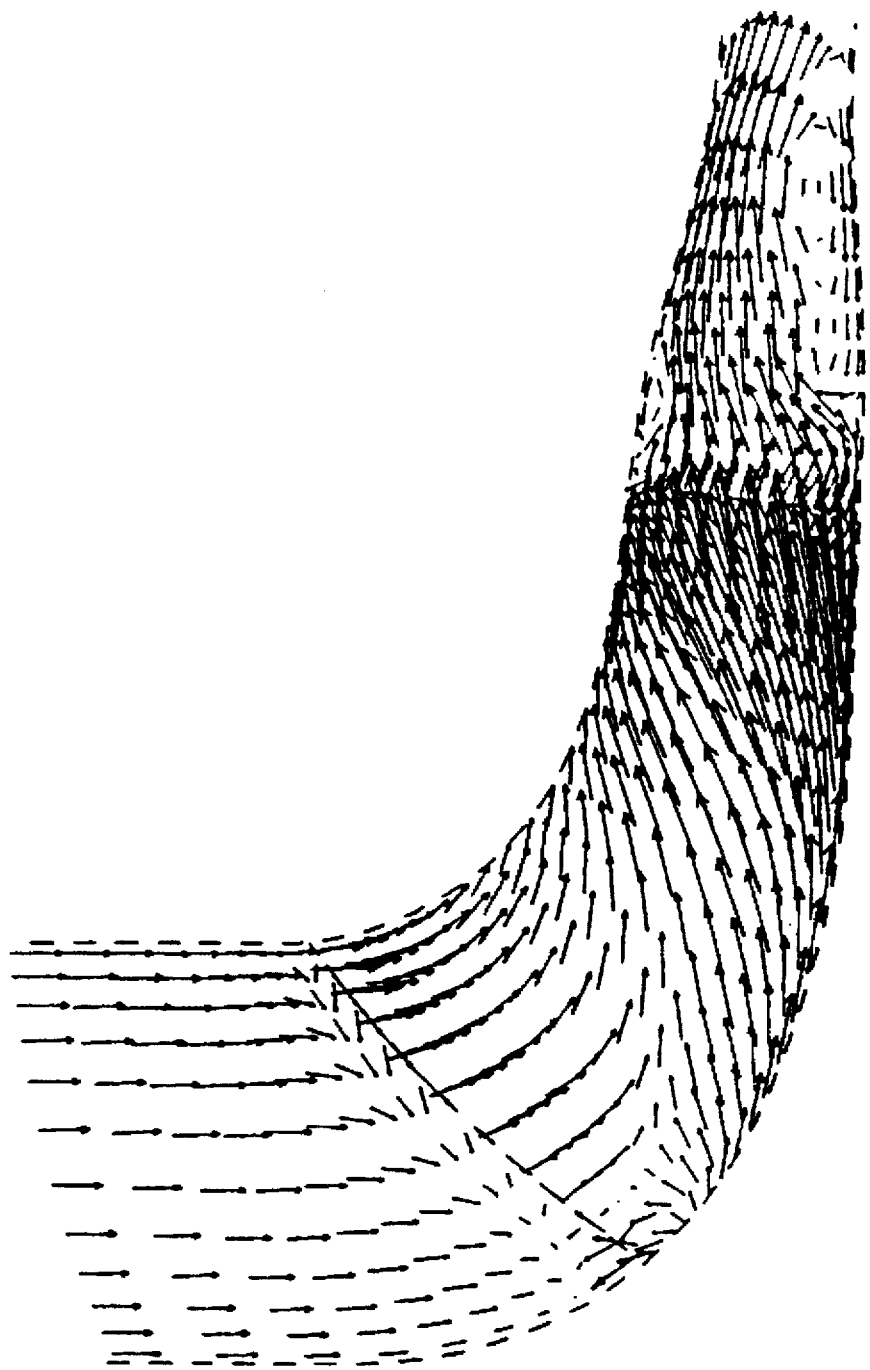

The invention will now be more particularly described based on the verification data of FIGS. 15 through 26 for centrifugal pump impellers. In the design of a conventional impeller, there is no consideration of suppression of secondary flows in the impeller, and the meridional distribution of the pressure coefficients Cp towards such impeller exit shows larger pressure coefficient difference of ΔCp between the hub and the shroud on the blade suction surface, showing insufficient decrease of ΔCp to suppress secondary flows as shown in FIG. 15. The distribution of ∂(rVθ)/∂m in FIG. 16 shows relatively flat distribution both at the shroud and the hub and is different from the distribution described in the second aspect of the present invention which is favorable to suppress secondary flows. Thus, it is confirmed that there is no consideration in the loading distribution of the conventional design to suppress secondary flows. As a result, the results of numerical analysis predicted strong secondary flows on the blade suction surface from the hub to the shroud as presented in FIG. 17 showing an unfavorable flow pattern.

Figure 18:
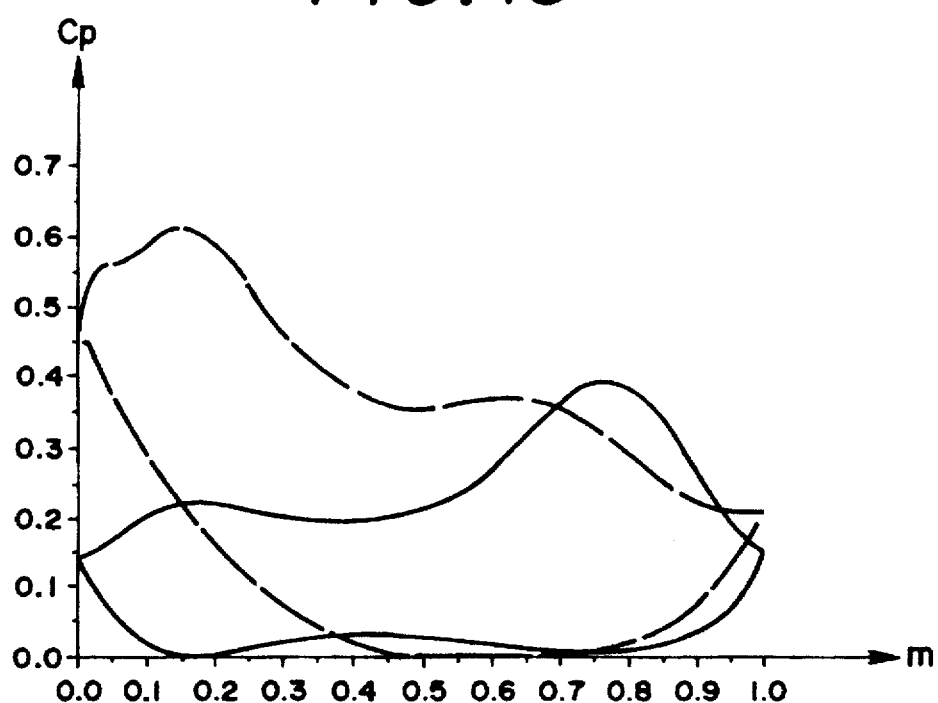
Figure 19:
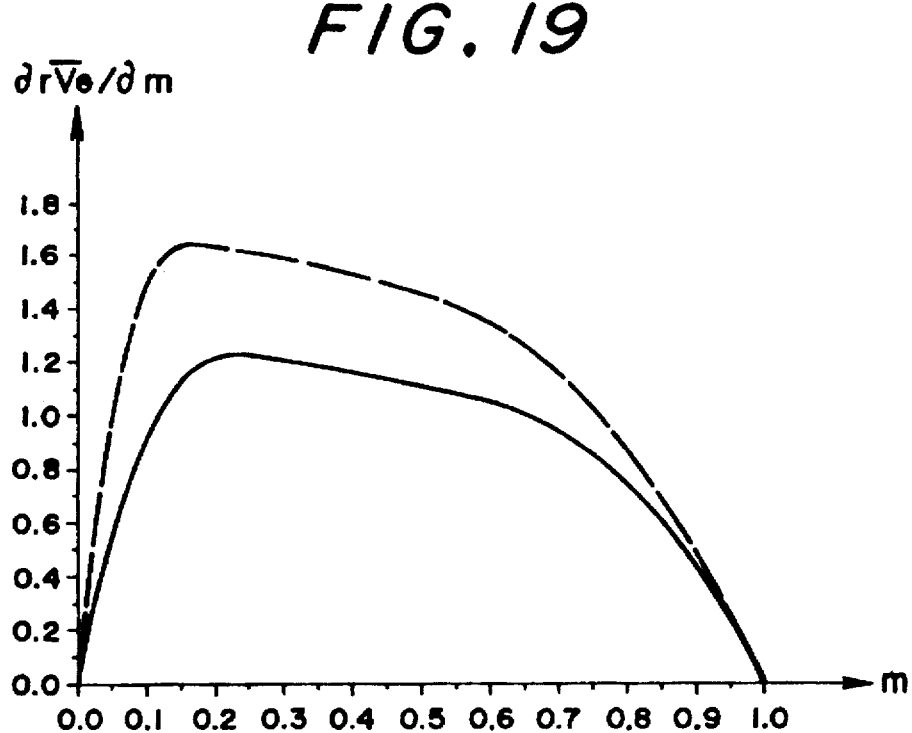
Figure 20:
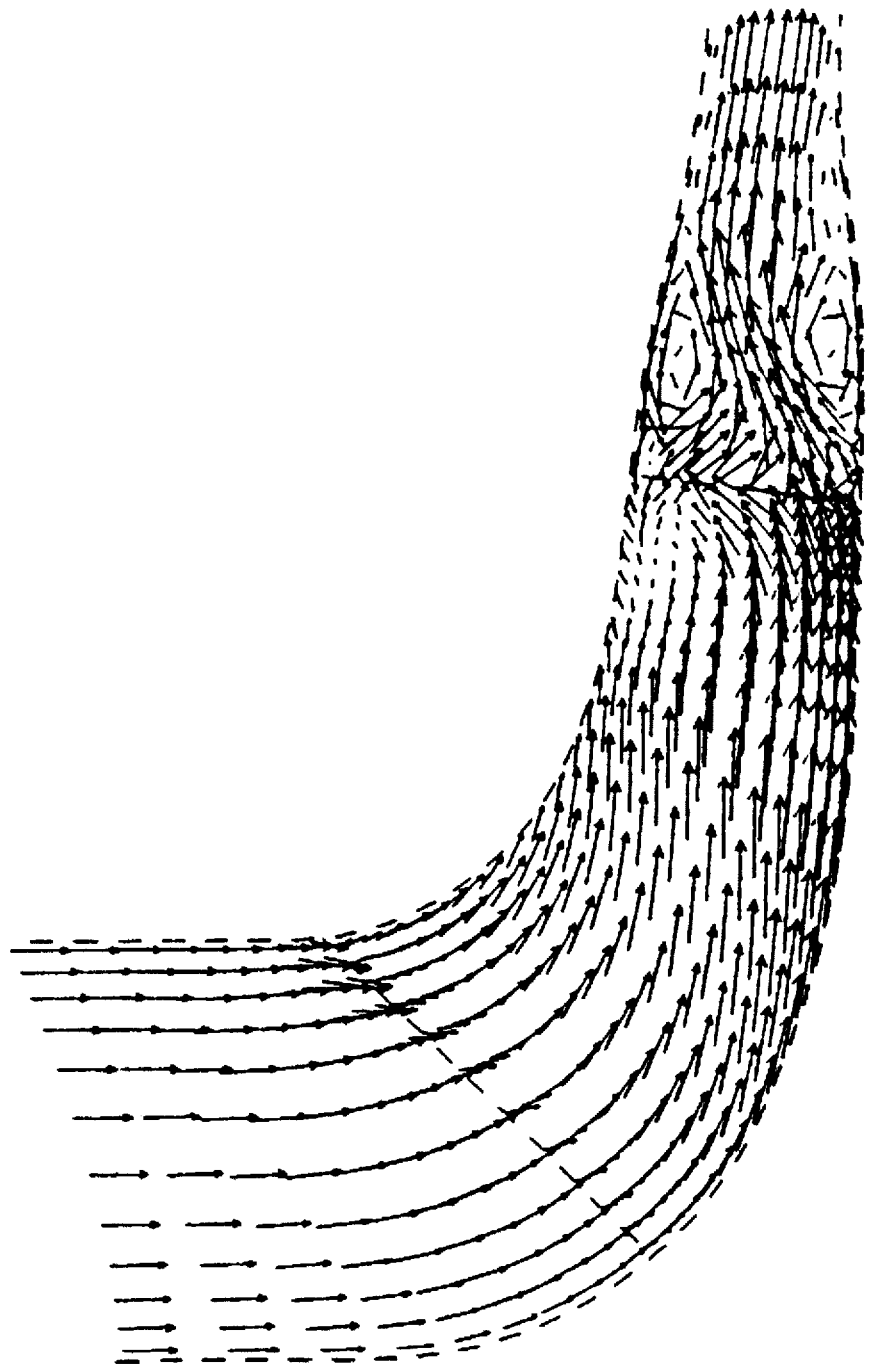

On the other hand, in the case of the verification data of FIGS. 18 through 20, where the third aspect of the present invention was employed, the first aspect of the present invention is realized due to the effects of the blade lean in the circumferential direction. FIG. 18 shows a remarkable decreasing tendency of the pressure coefficient difference $\Delta Cp$ on the suction surface between the hub and the shroud towards the impeller exit, and $\Delta Cp$ changes its sign at the non-dimensional meridional distance of about 0.7, giving sufficient tendency to suppress secondary flows. In this case, although the maximum loading at the shroud occurs in the fore part of the blade, the maximum loading at the hub does not occur at the latter part of the blade and the second aspect of the present invention is not sufficiently satisfied. However, the third aspect of the present invention is fully utilized by using the blade lean ratio of S=0.142, and thus favorable pressure distribution is obtained as shown in FIG. 18. As a result, the secondary flows from the hub to the shroud on the suction surface are completely suppressed and a favorable flow pattern is achieved as shown in the result of the numerical analysis of FIG. 20.

Figure 21:
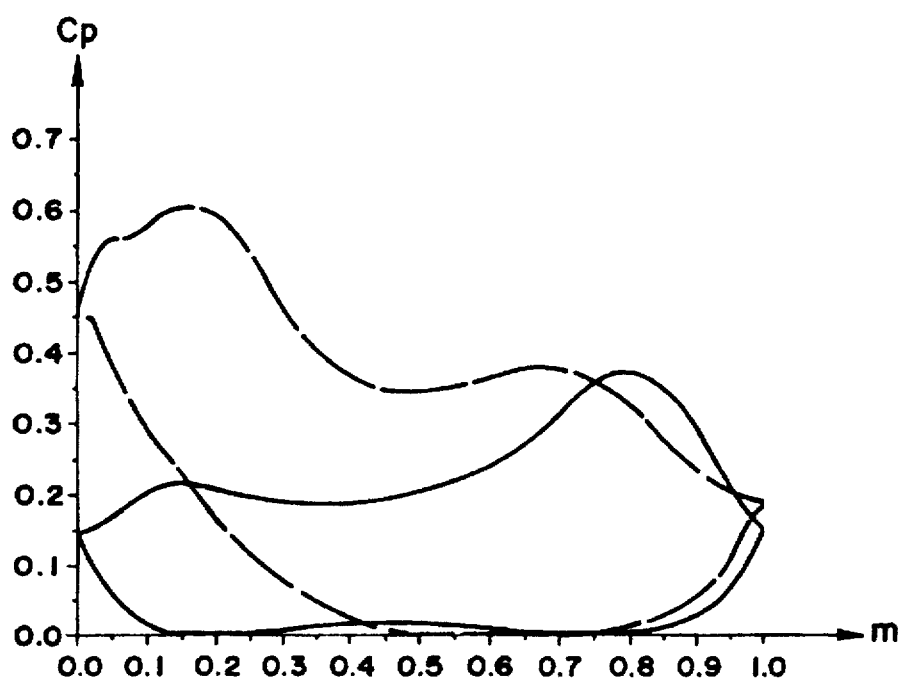
Figure 22:
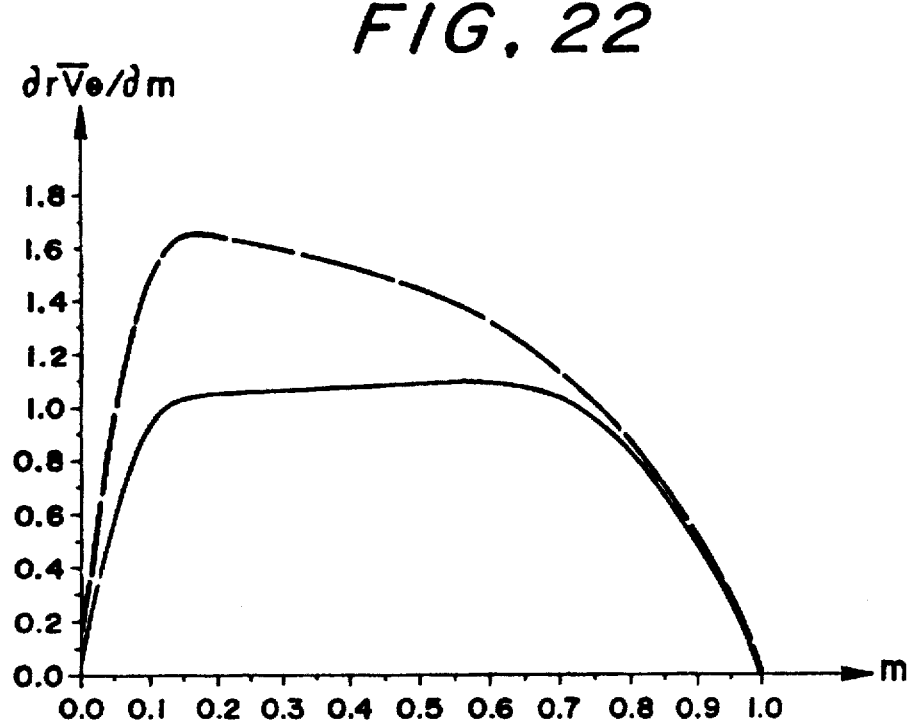

Next, FIGS. 21 though 23 show the case which was obtained by the combination of the third and the second aspects of the present invention. Because of the synergism of the effects of the third aspect of blade lean in the circumferential direction and the second aspect of the blade loading, a remarkable decreasing tendency of the pressure coefficient difference $\Delta Cp$ on the suction surface between the hub and the shroud towards the impeller exit is realized, and $\Delta Cp$ changes in sign at the non-dimensional meridional distance of about 0.75, providing a sufficient tendency to suppress secondary flows. As a result, the secondary flows from the hub to the shroud on the suction surface are suppressed and a favorable flow pattern is achieved as shown in the result of the numerical analysis of FIG. 23. In this case, the blade lean ratio is S=0.078, which is about the half of that obtained for the case of FIGS. 18 through 20 designed using only the third aspect. As a result, a three dimensional flow passage geometry which is more favorable for manufacturing has been successfully obtained.

Figure 24:
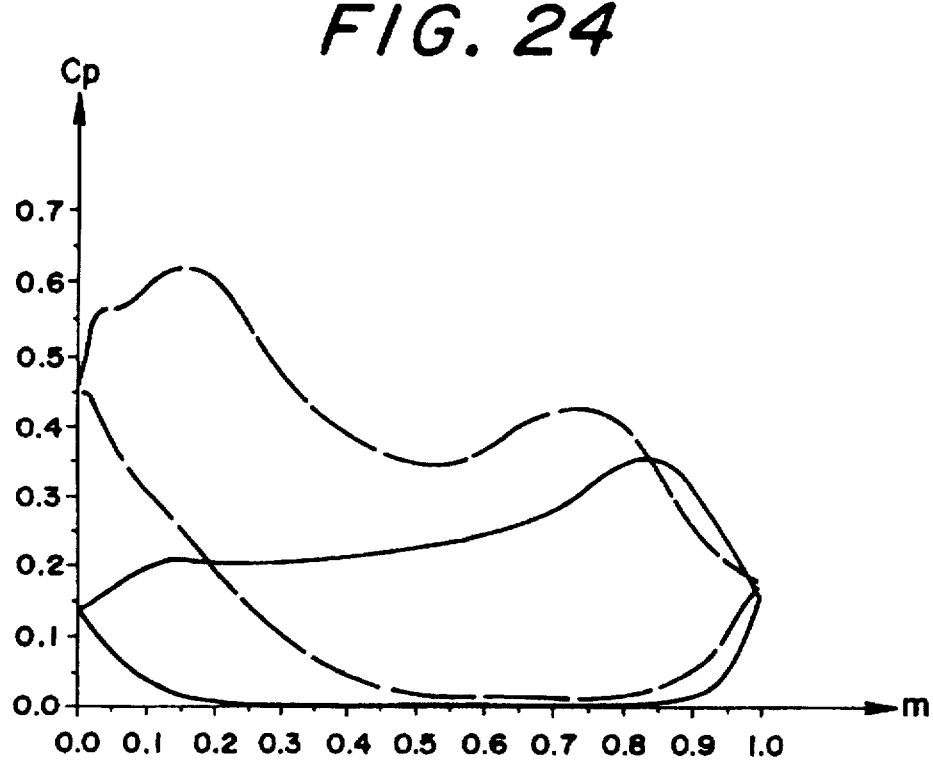
Figure 25:
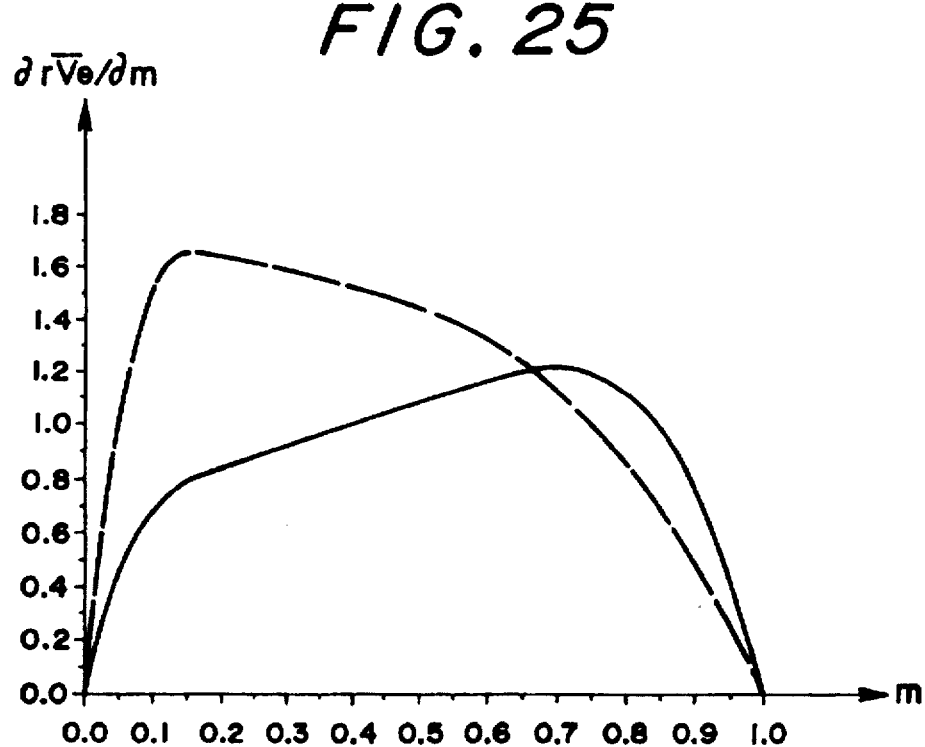
Figure 26:
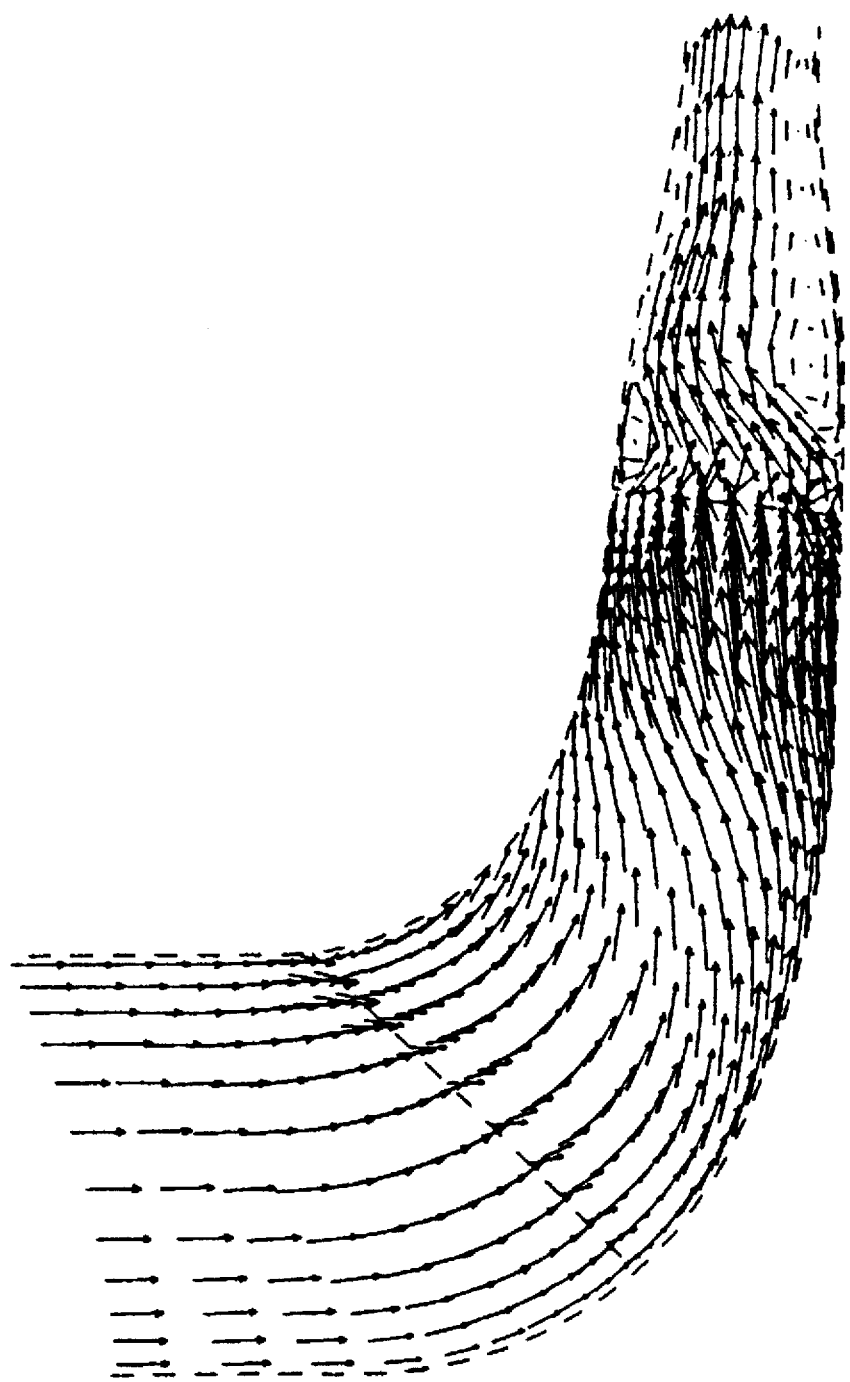
Figure 27:
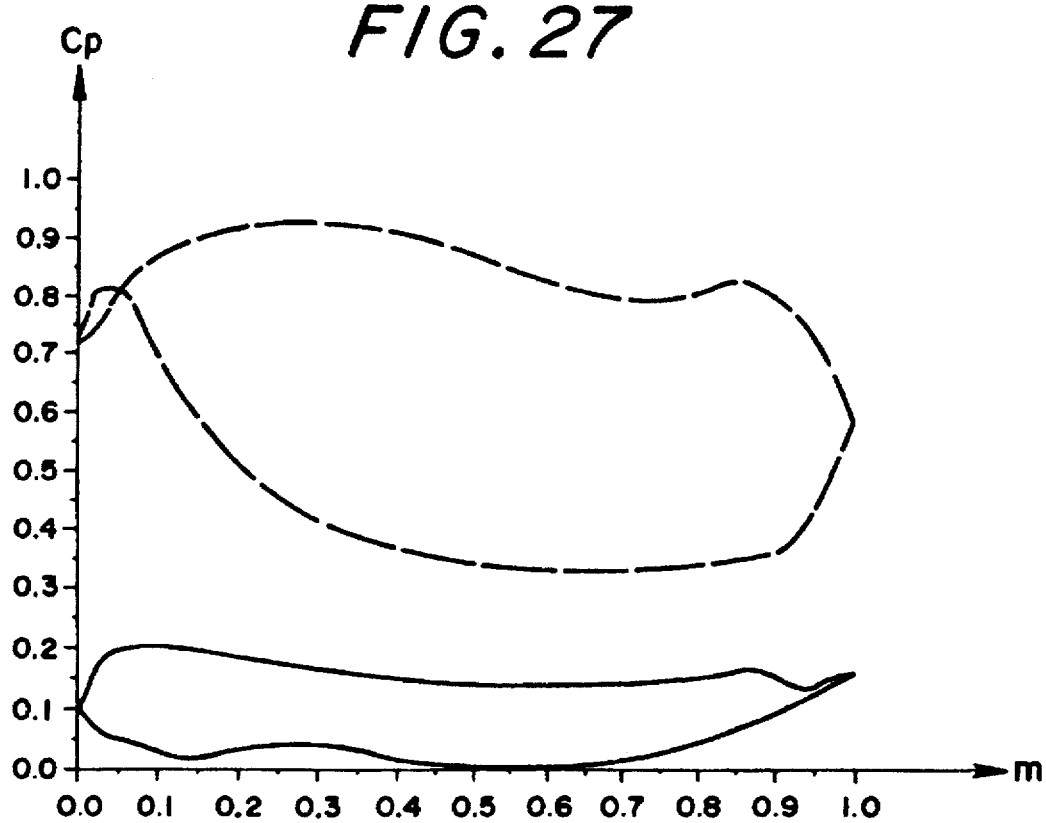
FIGS. 27 through 38 show verification data for impellers of a mixed flow pump with a medium specific speed, FIGS. 27, 30, 33 and 36 showing the pressure coefficient Cp curves (solid lines represent curves at the hub and broken lines represent curves at the shroud), FIGS. 28, 31, 34 and 37 showing blade loading $\partial(r\overline{V}_\theta)/\partial m$ curves (solid lines represent curves at the hub and broken lines represent curves at the shroud), FIGS. 29, 32, 35 and 38 showing secondary flow velocity vector diagrams, FIGS. 27 through 29 showing the case designed by the conventional design method, FIGS. 30 through 32 showing the case designed by using only blade lean in a circumferential direction according to the present invention, FIGS. 33 through 35 showing the case designed by a combination of blade lean and blade loading $\partial(r\overline{V}_\theta)/\partial m$ according to the present invention, and FIGS. 36 through 38 showing the case designed by using only blade loading $\partial(r\overline{V}_\theta)/\partial m$ according to the present invention.
Figure 28:
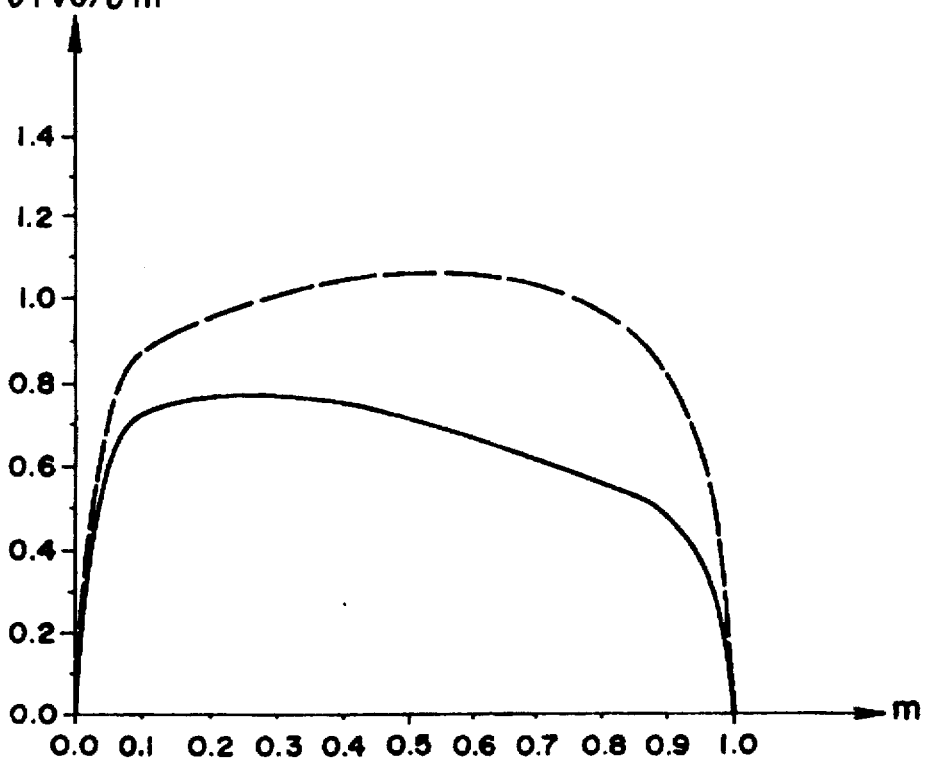
Figure 29:
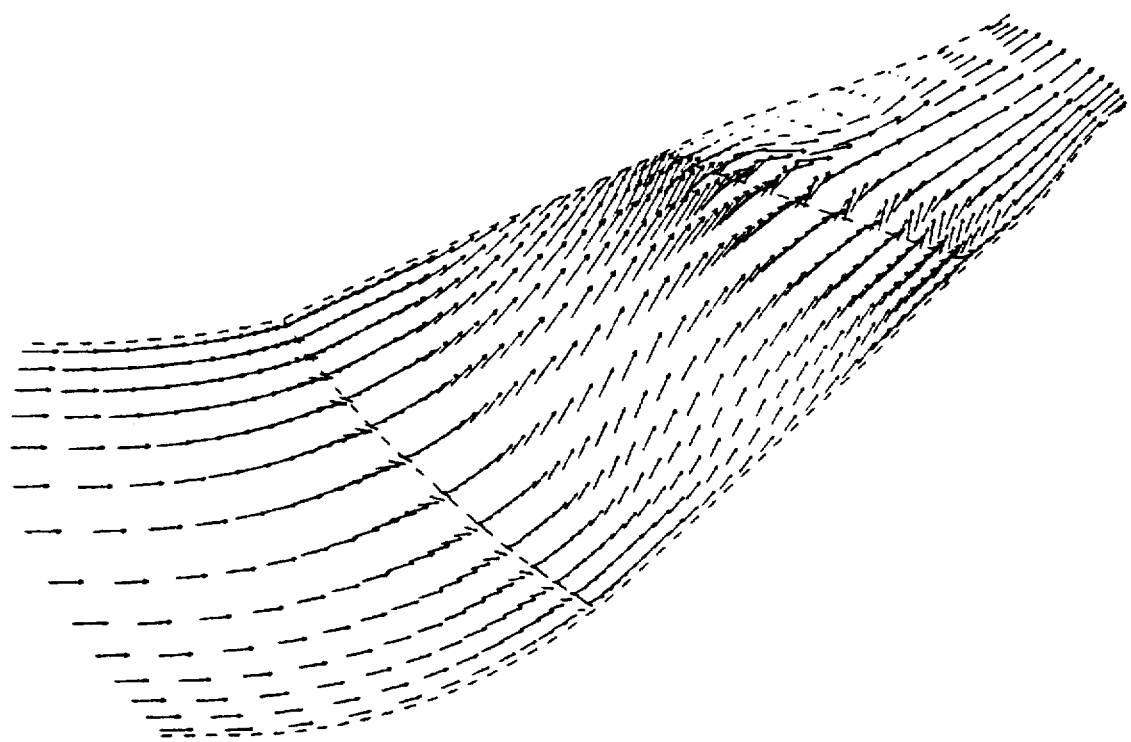
Figure 30:
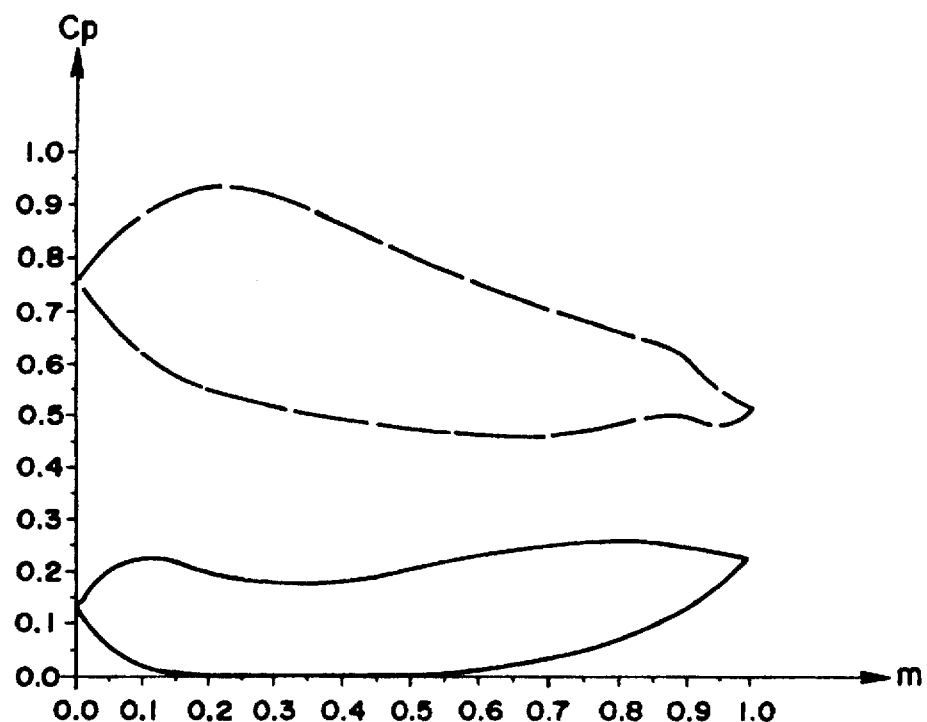
Figure 31:
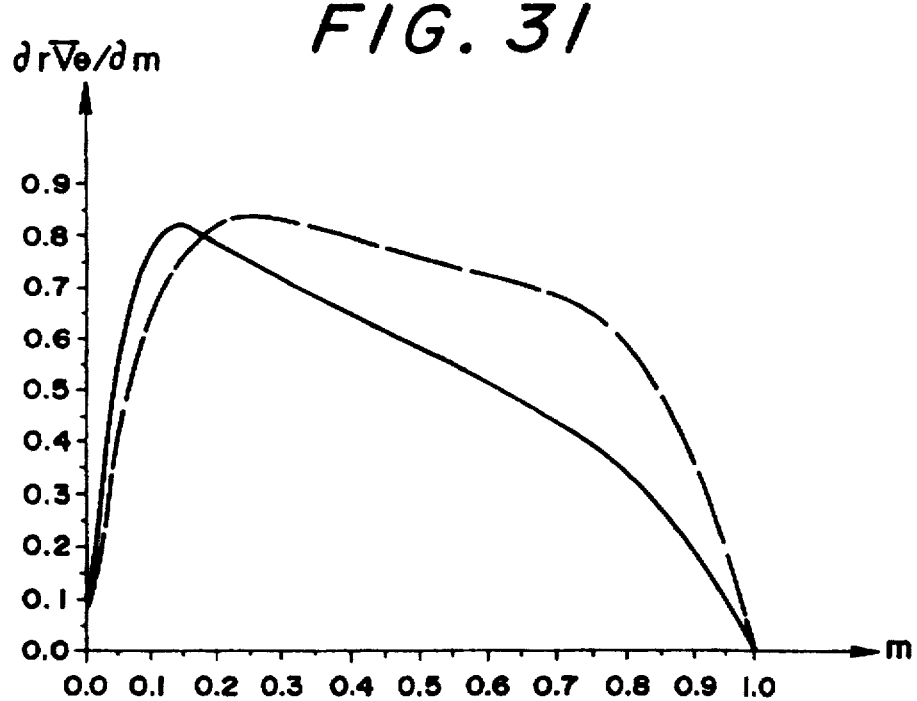
Figure 32:
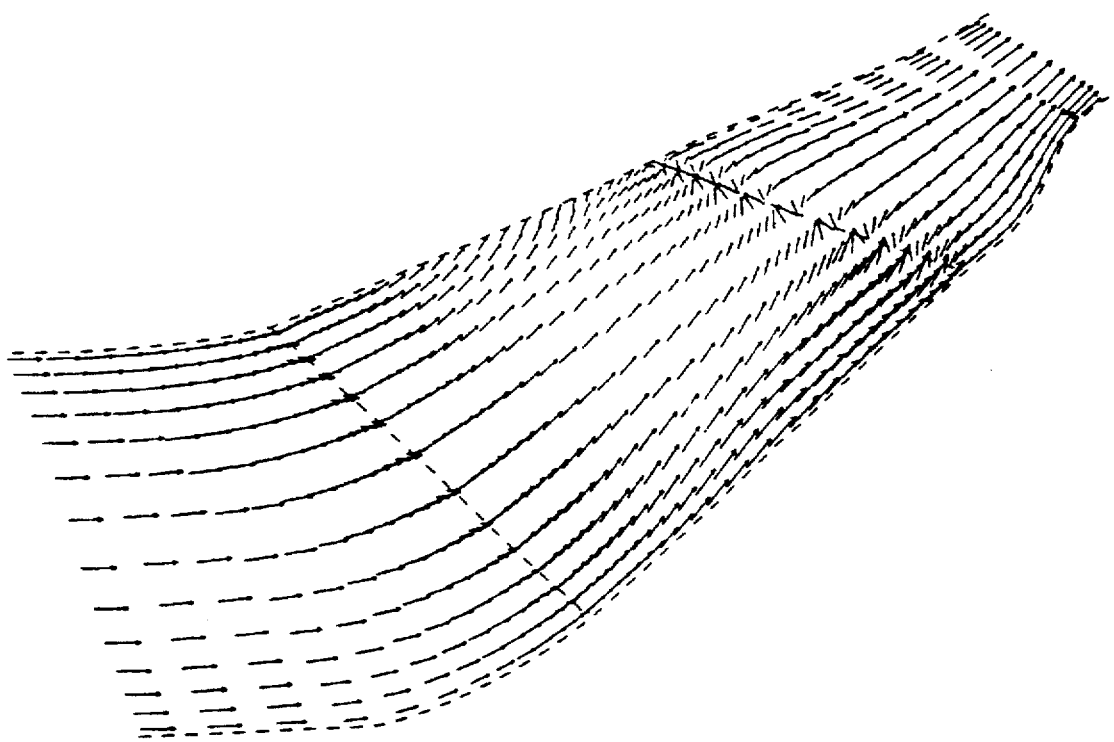
Figure 33:
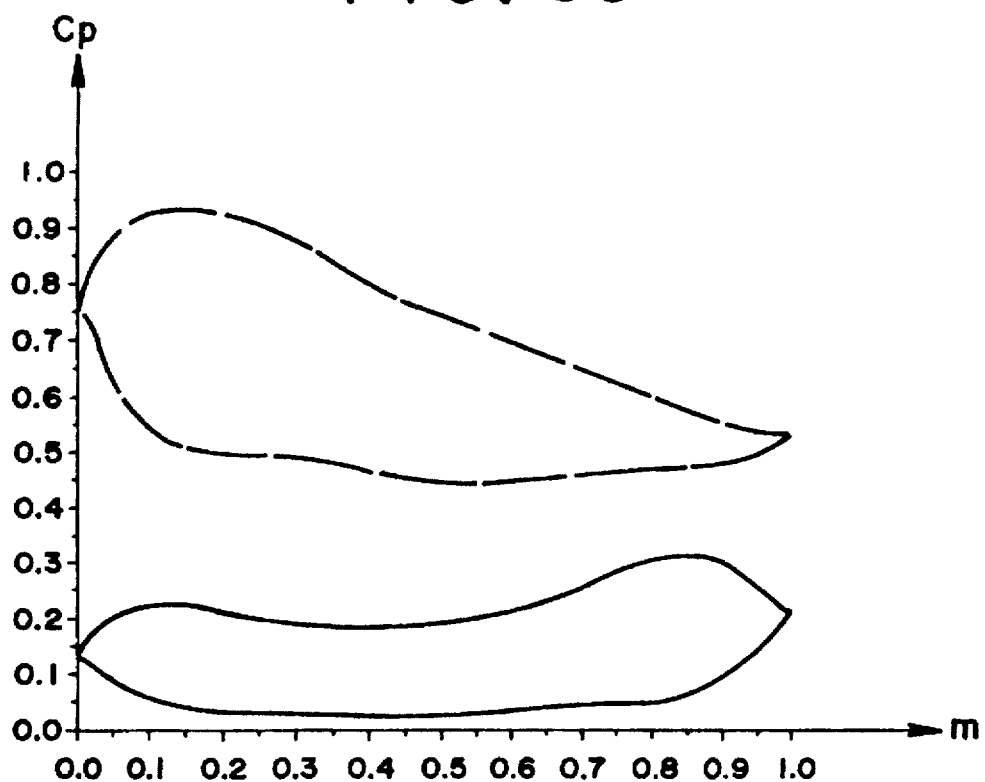
Figure 34:
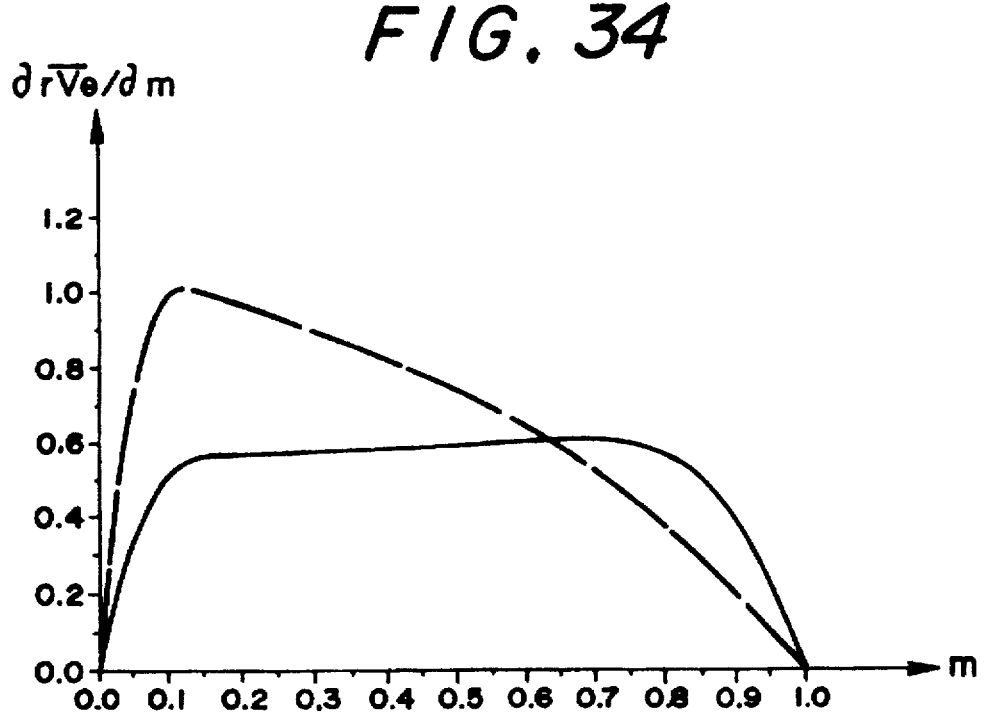
Figure 35:
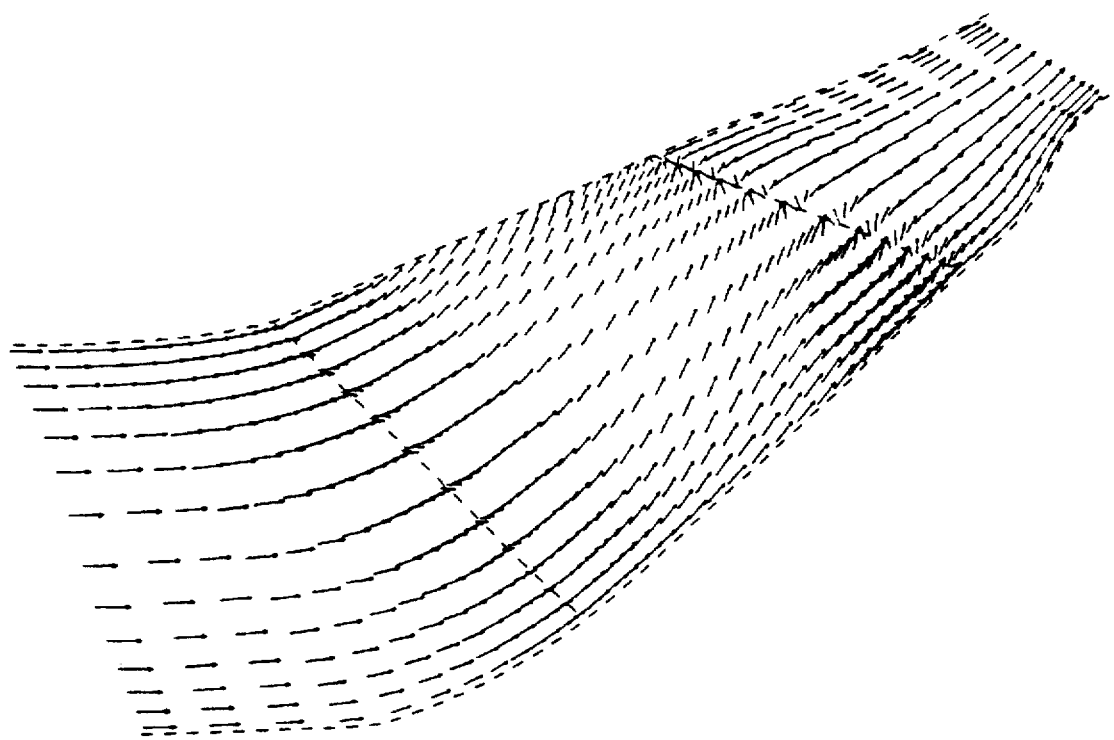
Figure 36:
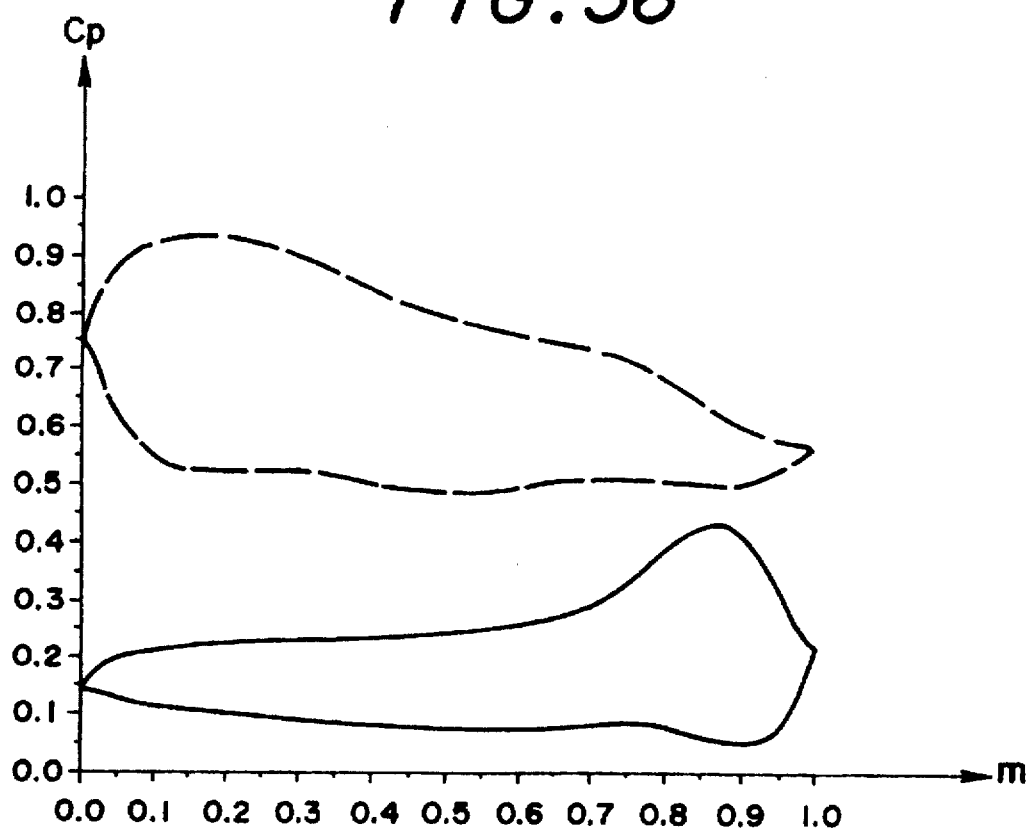
Figure 37:
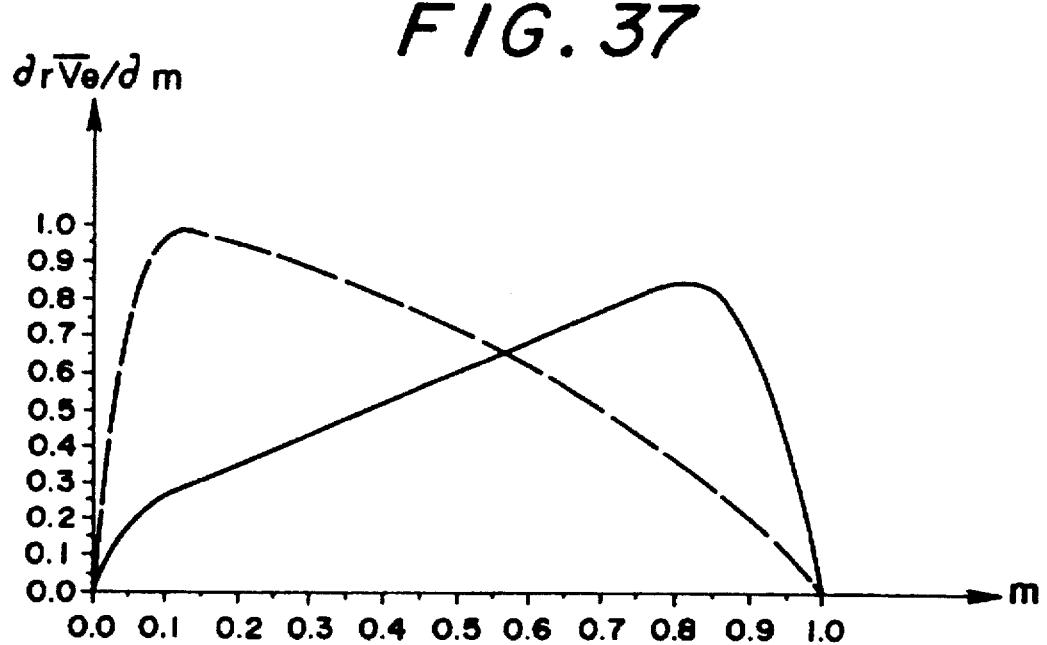
Figure 38:
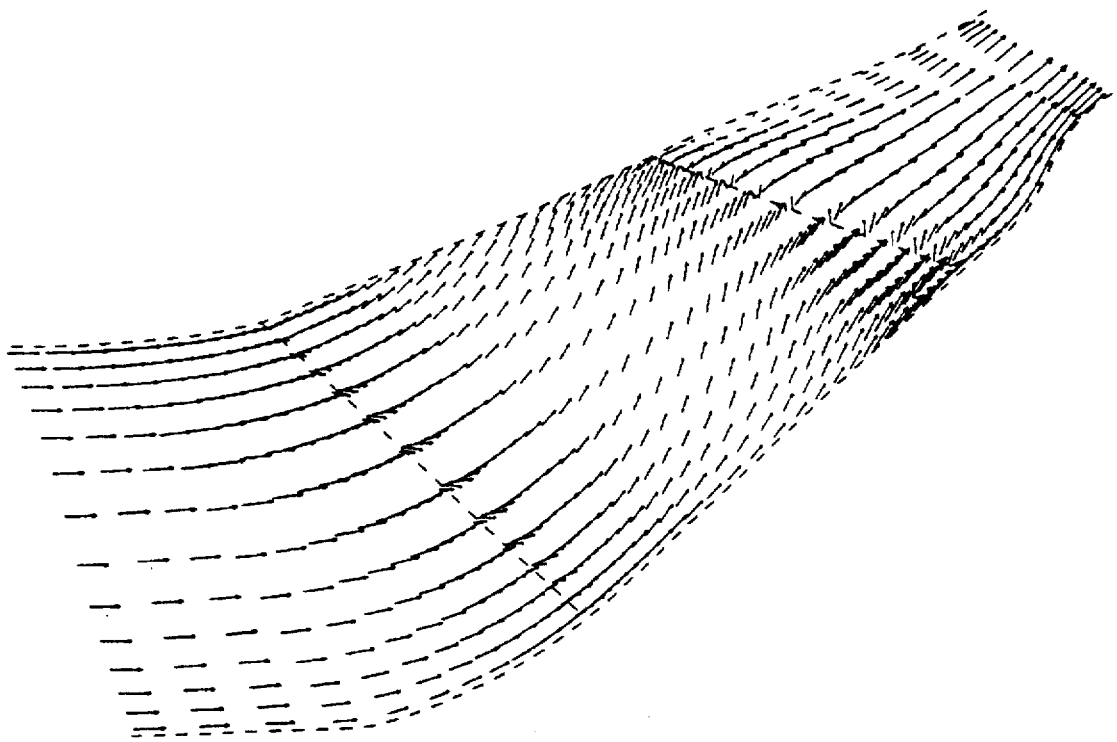

FIGS. 24 though 26 show the case where only the second aspect of the present invention is employed. Because of the favorable distribution of the blade loading $\partial(rV_\theta)/\partial m$ of FIG. 25, the pressure coefficient difference $\Delta Cp$ on the suction surface between the hub and the shroud shows a remarkably decreasing tendency towards the impeller exit compared to that for the conventional design, having a favorable tendency to suppress secondary flows. As a result, the secondary flows from the hub to the shroud on the suction surface are fully suppressed as shown in the result of the numerical analysis of FIG. 26, compared to that of conventional design of FIG. 17. However, as is apparent from a comparison between FIGS. 18 and 24, the decreasing tendency, in FIG. 24, of the pressure coefficient on the suction surface between the hub and the shroud is not as remarkable as that of FIG. 18. As a result, and as is apparent from a comparison between FIGS. 20 and 26, the secondary flow is suppressed less effectively than the previous design using the third aspect of the present invention.

FIGS. 27 through 38 show verification data for mixed flow pump impellers, and the effects of secondary flow suppression similar to those for centrifugal pump impellers described above (FIGS. 15 through 26), and the applicability of the present invention can be confirmed also for mixed flow pump impellers.

Figure 39:
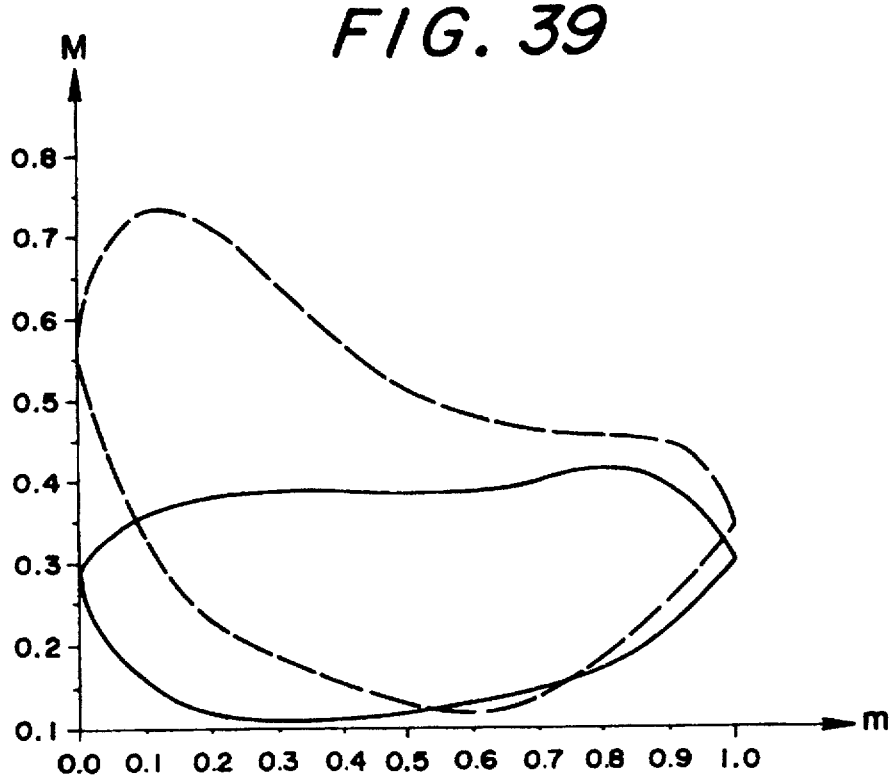
FIGS. 39 through 50 show verification data for impellers of a centrifugal compressor, FIGS. 39, 42, 45 and 48 showing relative Mach number M curves (solid lines represent curves at the hub and broken lines represent curves at the shroud), FIGS. 40, 43, 46 and 49 showing blade loading $\partial(r\overline{V}_\theta)/\partial m$ curves (solid lines represent curves at the hub and broken lines represent curves at the shroud), FIGS. 41, 44, 47 and 50 showing secondary flow vector diagrams, FIGS. 39 through 41 showing the case designed by the conventional design method, FIGS. 42 through 44 showing the case designed by using only blade lean in a circumferential direction according to the present invention, FIGS. 45 through 47 showing the case designed by a combination of blade lean and blade loading $\partial(r\overline{V}_\theta)/\partial m$ according to the present invention, and FIGS. 48 through 50 showing the case designed by using only blade loading $\partial(r\overline{V}_\theta)/\partial m$ according to the present invention.
Figure 40:
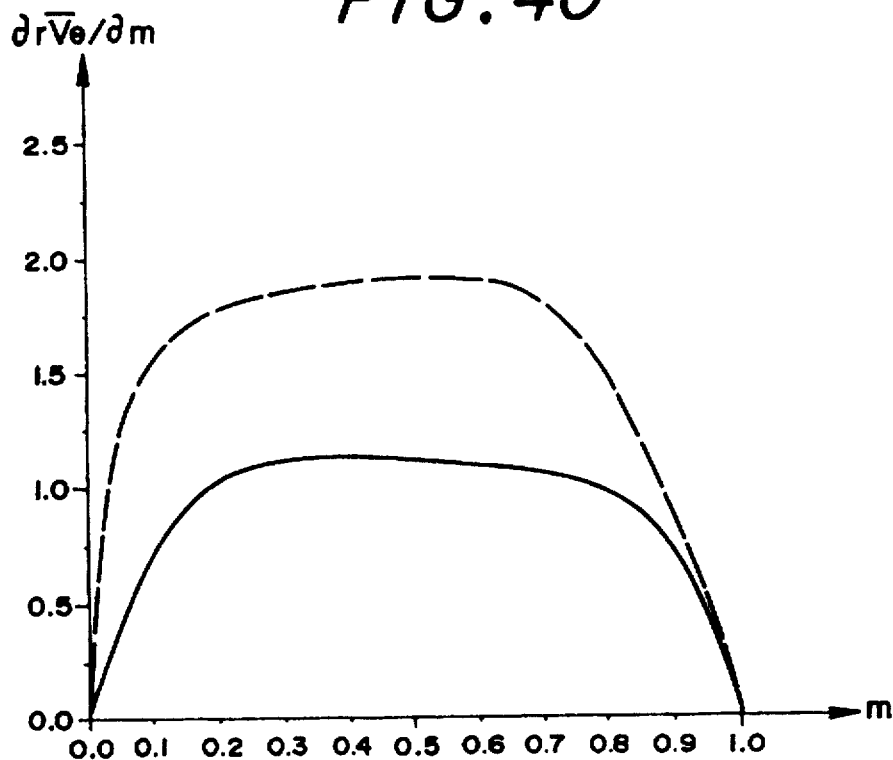

Next, the verification data of FIGS. 39 through 50 for centrifugal compressor impellers will be described in detail. As is described in the previous section, in compressible flows, the physical variable, which is closely related to the behavior of secondary flows and is used in the first aspect of the present invention, is the relative Mach number distribution. In the conventionally designed impellers, there is no consideration of suppression of secondary flows, and the meridional distribution of the relative Mach number M towards impeller exit does not show sufficient decreasing tendency of relative Mach number M on the suction surface between the hub and the shroud as shown in FIG. 39. Furthermore, the blade loading in FIG. 40 shows relatively flat distribution both at the hub and the shroud and is different from the favorable distribution to suppress secondary flows. Thus, it is confirmed that there is no consideration of loading distribution in the conventional design to suppress secondary flows. Thus, the results of the numerical analysis presented in FIG. 41, predicts strong secondary flows on the blade suction surface from the hub to the shroud towards the impeller exit.

Figure 42:
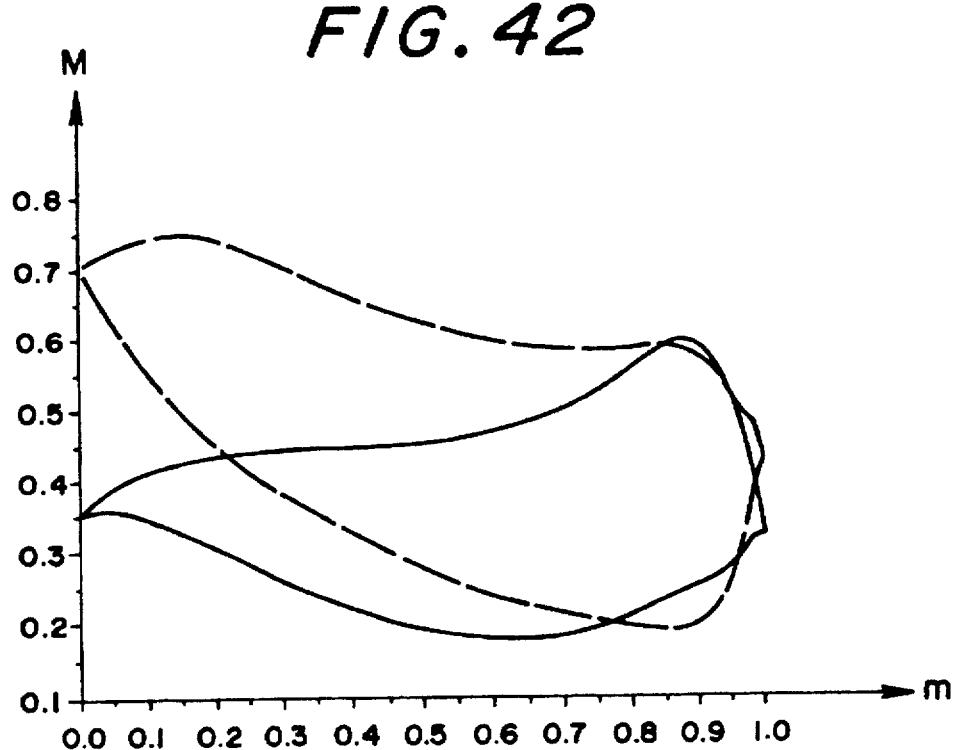
Figure 43:
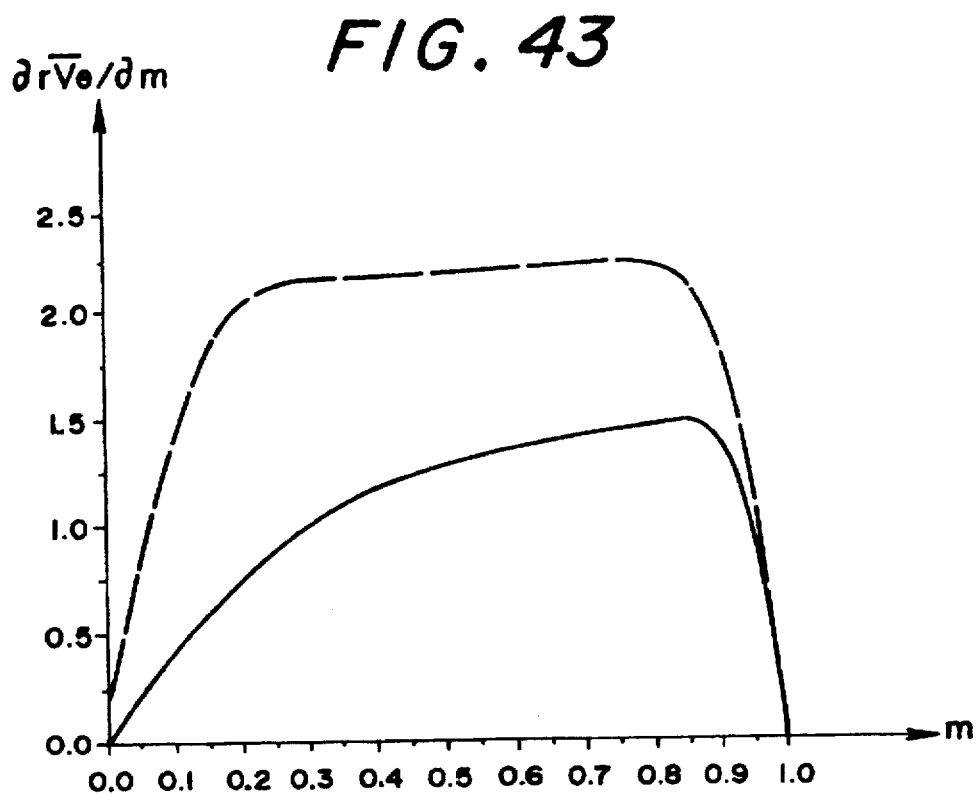
Figure 44:
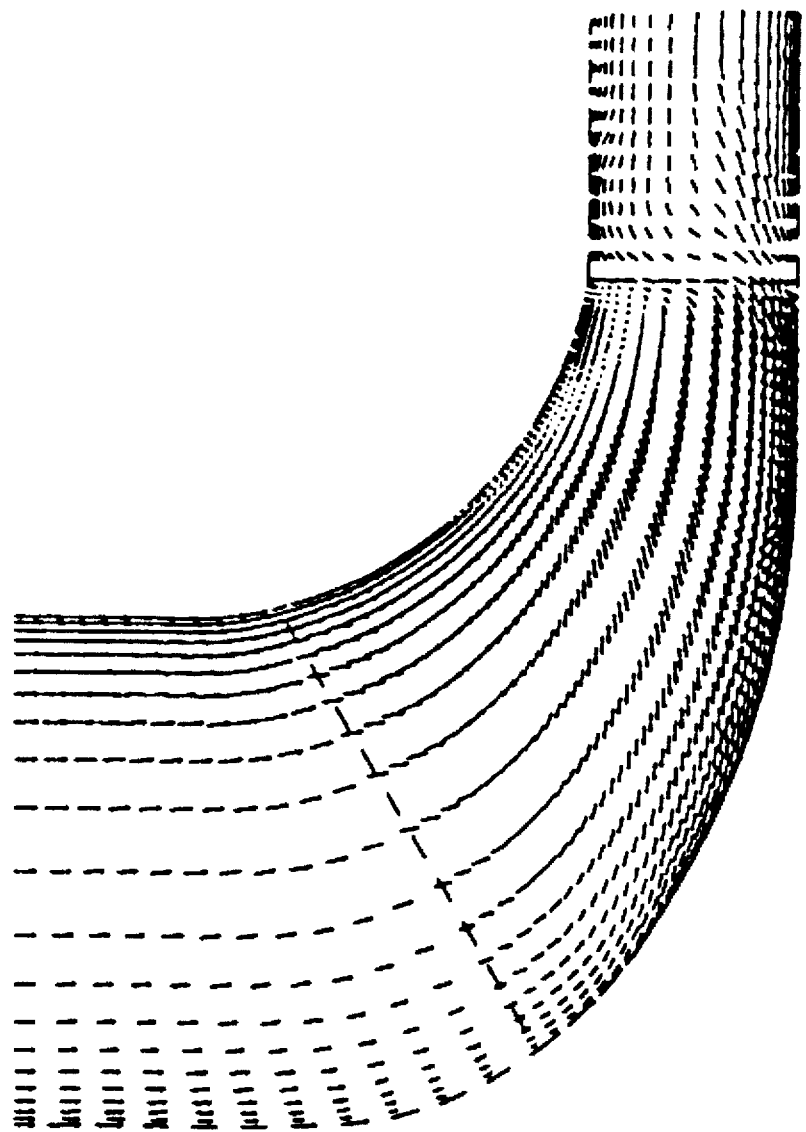

On the other hand, in the case of the verification data of FIGS. 42 through 44, where the third aspect of the present invention was employed, the first aspect of the present invention is realized due to the effects of the blade lean in the circumferential direction. FIG. 42 shows a remarkable decreasing tendency of the relative Mach number difference $\Delta M$ on the suction surface between the hub and the shroud towards the impeller exit, and $\Delta M$ changes in sign at the non-dimensional meridional distance of about 0.85, giving a sufficient tendency to suppress secondary flows. In this case, the maximum loading at the shroud occurs in the latter part of the blade and the second aspect of the present invention is not sufficiently satisfied. However, the third aspect of the present invention is fully utilized, and thus a favorable relative Mach number distribution is obtained as shown in FIG. 42. As a result, the secondary flows from the hub to the shroud on the suction surface are completely suppressed and a favorable flow pattern is achieved as shown in the result of the numerical analysis of FIG. 44.

Figure 45:
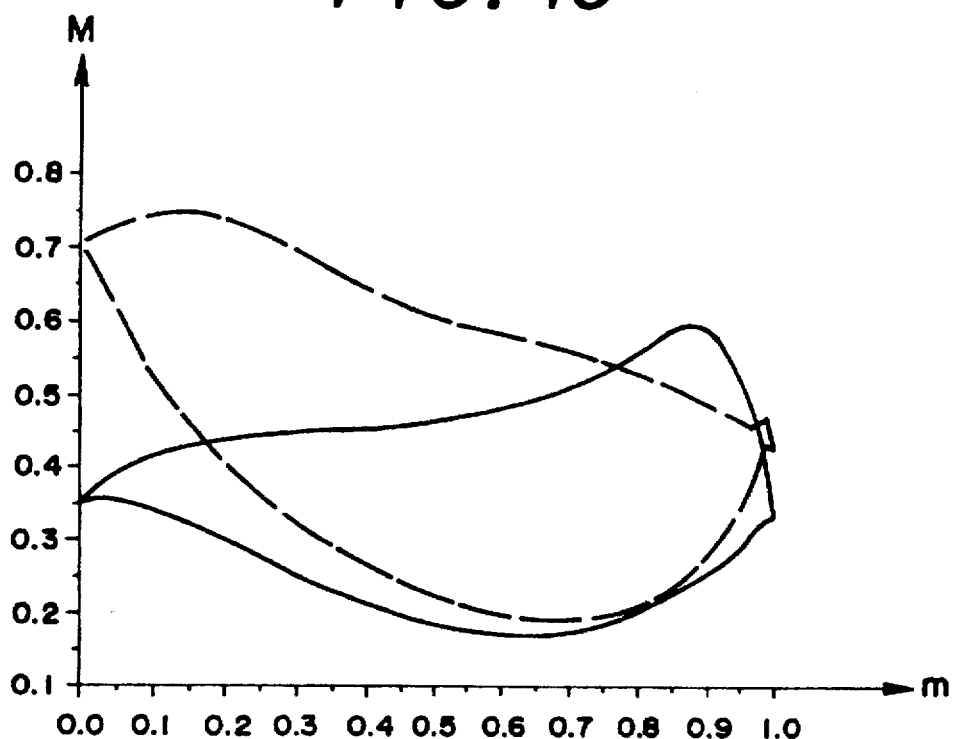
Figure 46:
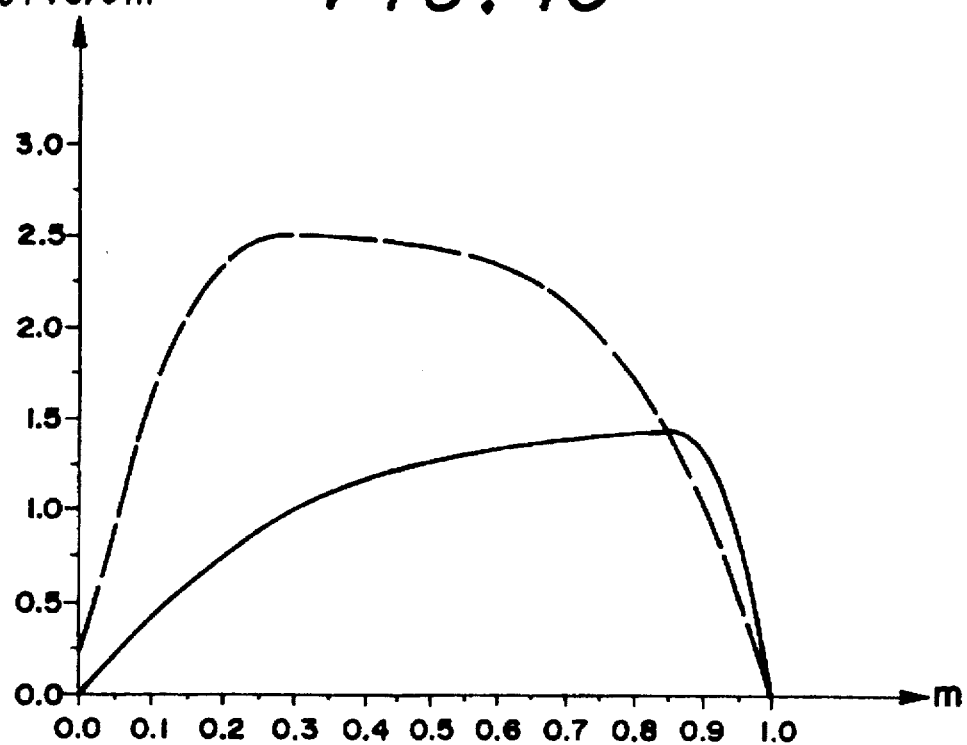
Figure 47:
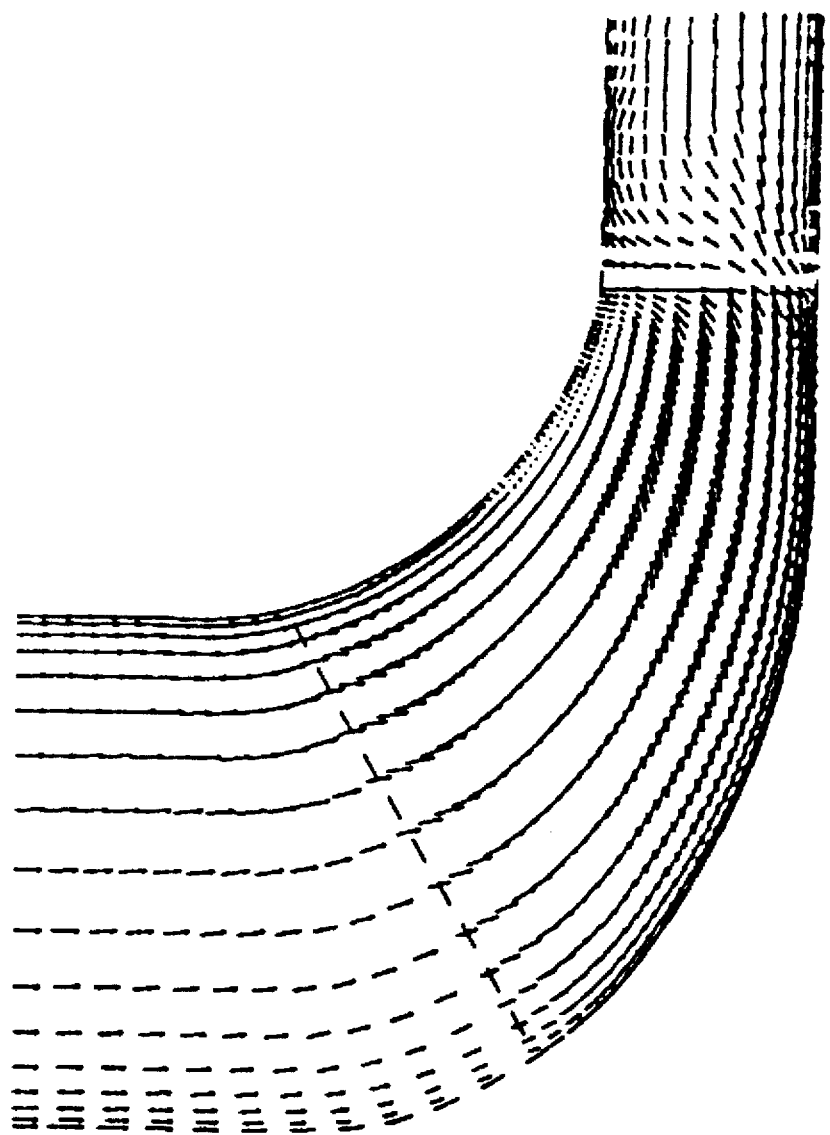

Next, FIGS. 45 though 47 show the case which was obtained by the combination of the third and the second aspects of the present invention. Because of the synergism of the effects of the third aspect of blade lean in the circumferential direction and the second aspect of the blade loading, a remarkable decreasing tendency of the relative Mach number difference $\Delta M$ on the suction surface between the hub and the shroud towards the impeller exit can be seen in FIG. 45, which shows that $\Delta M$ changes in sign at the non-dimensional meridional distance of about 0.75, giving sufficient tendency to suppress secondary flows. As a result, the secondary flows from the hub to the shroud on the suction surface are suppressed and a favorable flow pattern is achieved as shown in the result of the numerical analysis of FIG. 47. In this case, the blade lean ratio is similar to that employed for the case of FIGS. 42 through 44 designed using only the third aspect. However, as is apparent from a comparison between FIGS. 42 and 45, the remarkable decreasing tendency of the relative Mach number is achieved by using the second aspect of the present invention in combination.

Figure 48:
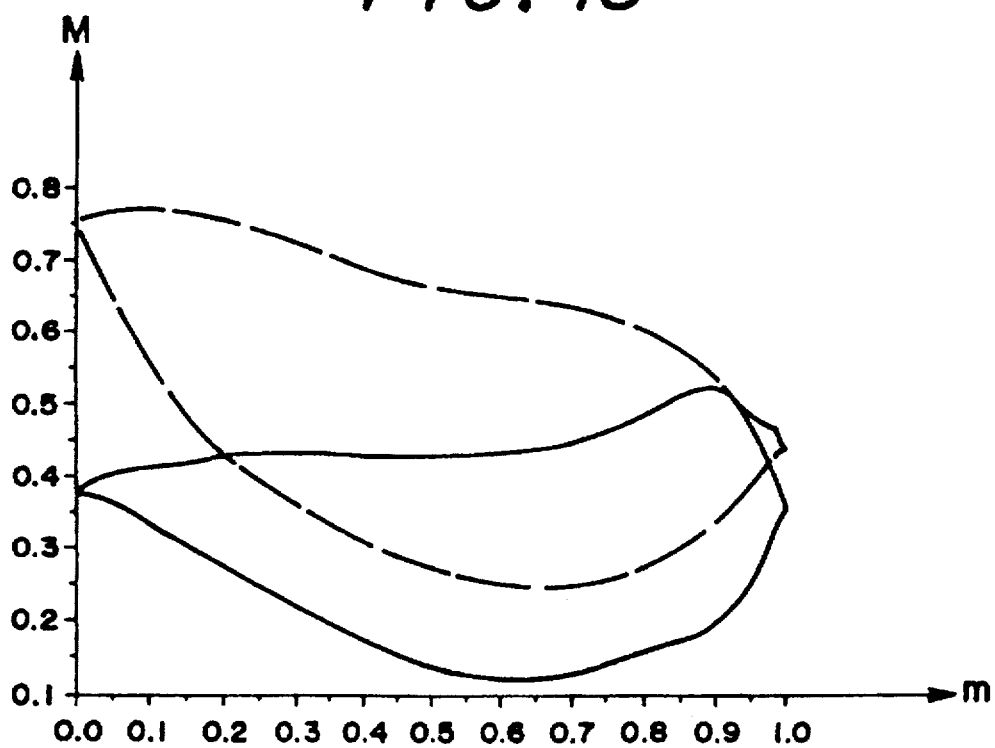
Figure 49:
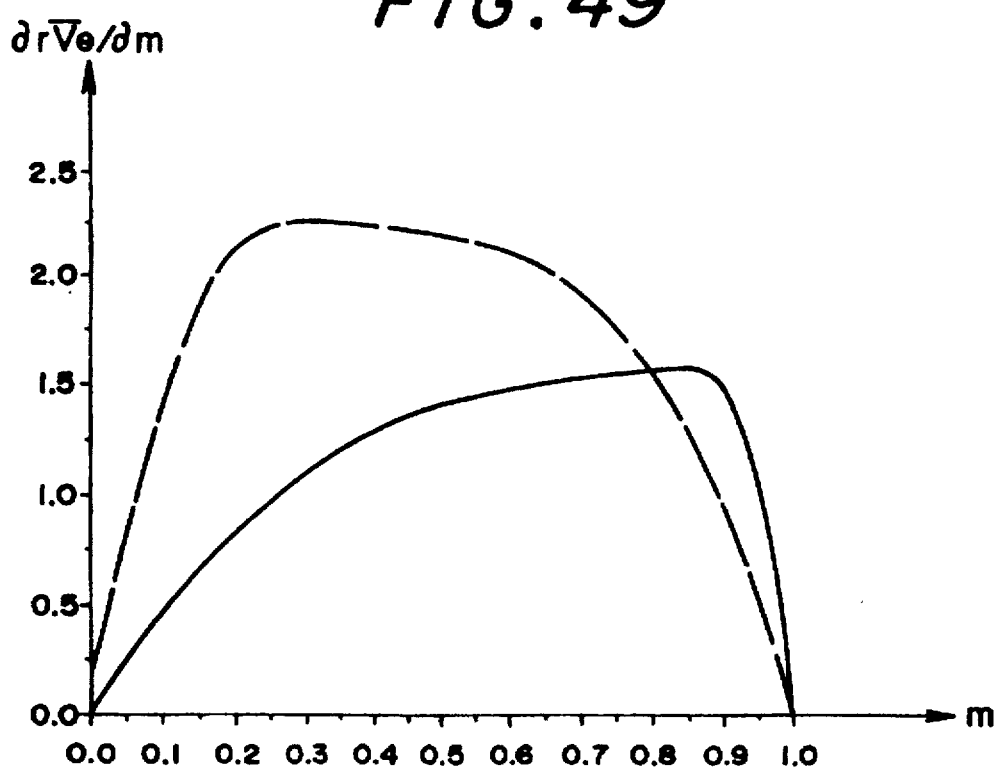
Figure 50:
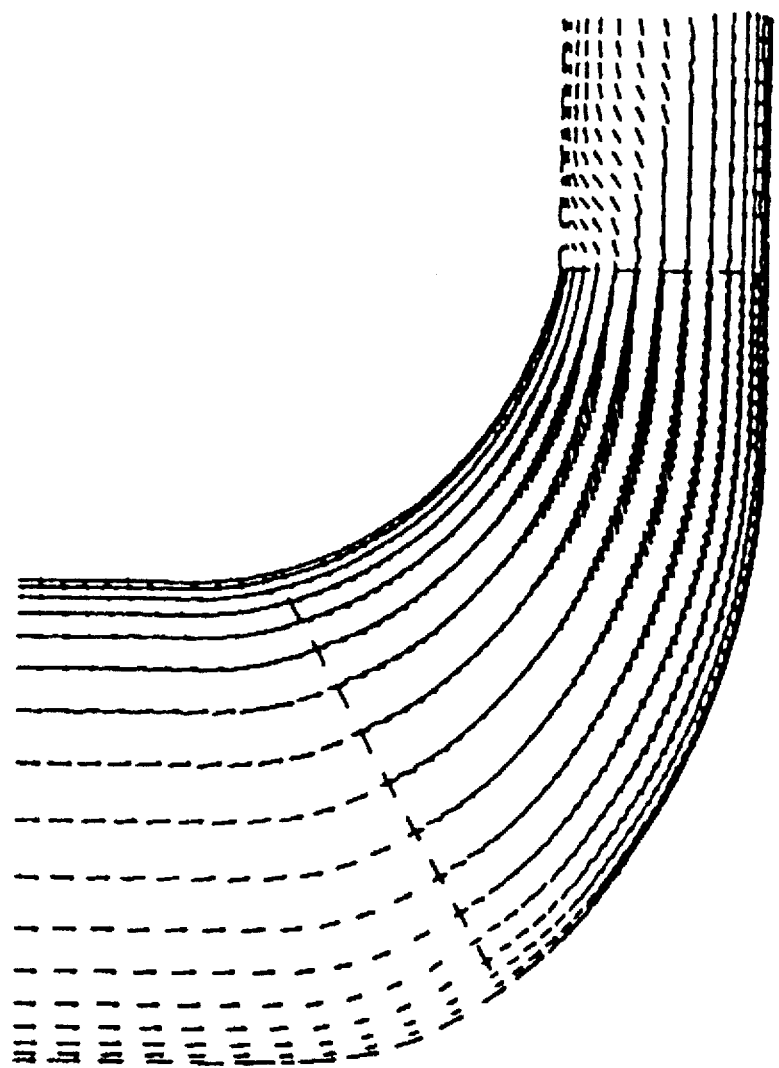
Figure 51:
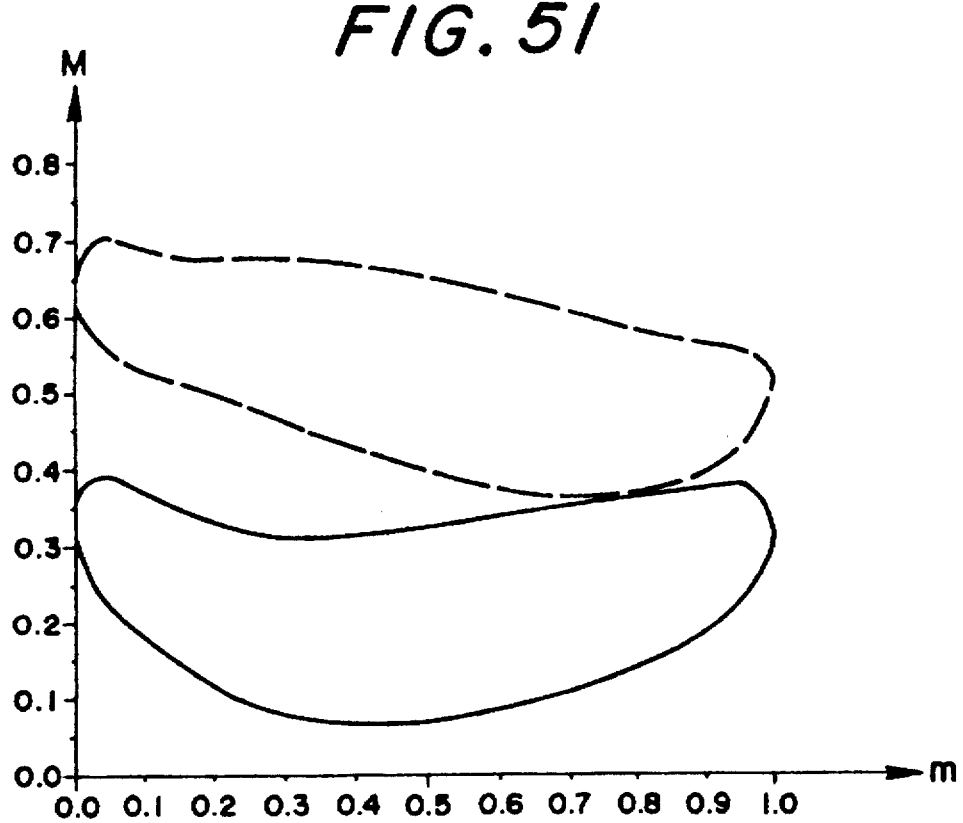
FIGS. 51 through 62 are verification data for impellers of a mixed flow compressor, FIGS. 51, 54, 57 and 60 showing relative Mach number M curves (solid lines represent curves at the hub and broken lines represent curves at the shroud), FIGS. 52, 55, 58 and 61 showing blade loading $\partial(r\overline{V}_\theta)/\partial m$ curves (solid lines represent curves at the hub and broken lines represent curves at the shroud), FIGS. 53, 56, 59 and 62 showing secondary flow vector diagrams, FIGS. 51 through 53 showing the case designed by the conventional design method.
Figure 52:
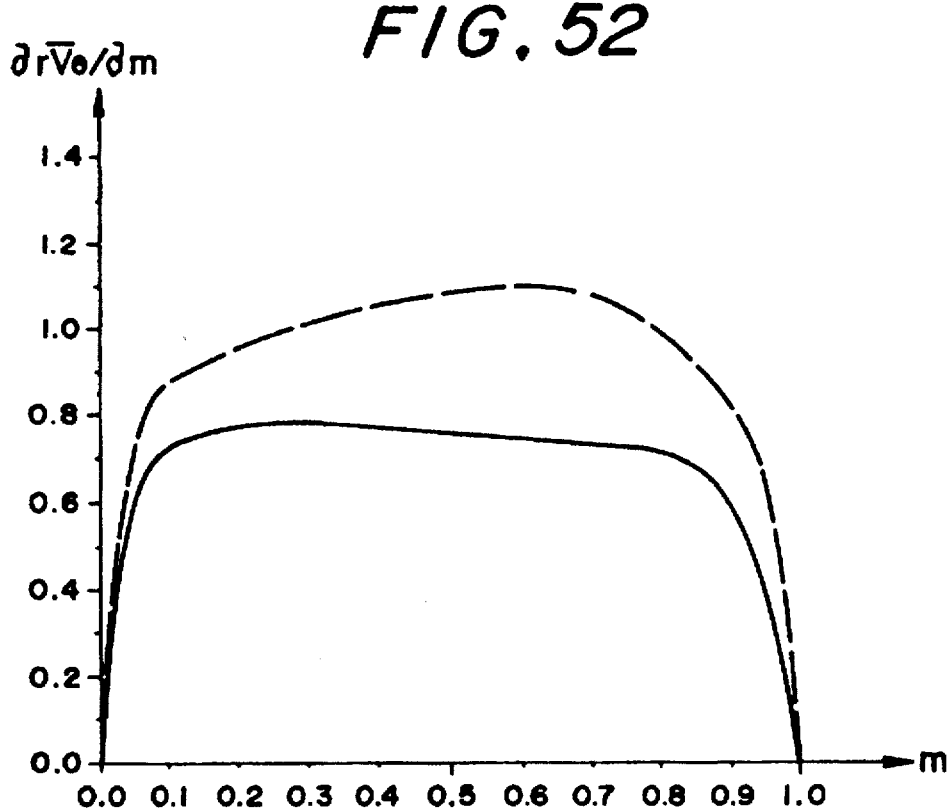

FIGS. 48 though 50 show the case where only the second aspect of the present invention is employed. Because of favorable distribution of the blade loading $\partial(rV\theta)/\partial m$ presented in FIG. 49, the relative Mach number difference $\Delta M$ on the suction surface between the hub and the shroud shows a decreasing tendency towards the impeller exit, and $\Delta M$ becomes very close to zero at the non-dimensional meridional distance of about 0.90, giving favorable distribution to suppress secondary flows. As a result, the secondary flows from the hub to the shroud on the suction surface are completely suppressed as shown in the result of the numerical analysis of FIG. 50 and a favorable flow pattern is achieved.

FIGS. 51 through 62 show verification data for mixed flow compressor impellers, and the effects of secondary flow suppression similar to those for centrifugal compressor impellers described above (FIGS. 39 through 50), and the applicability of the present invention can be confirmed also for mixed flow compressor impellers.

FIGS. 63 through 74 show a characteristic blade angle distribution according to the forth aspect of the present invention. Through comparison with predicted results of the meridional component of secondary flow by numerical analysis shown in FIGS. 15 through 38, it is ascertained that the effect of suppression of the meridional component of secondary flow increases as the characteristic feature of blade angle distribution becomes remarkable.

Figure 23:
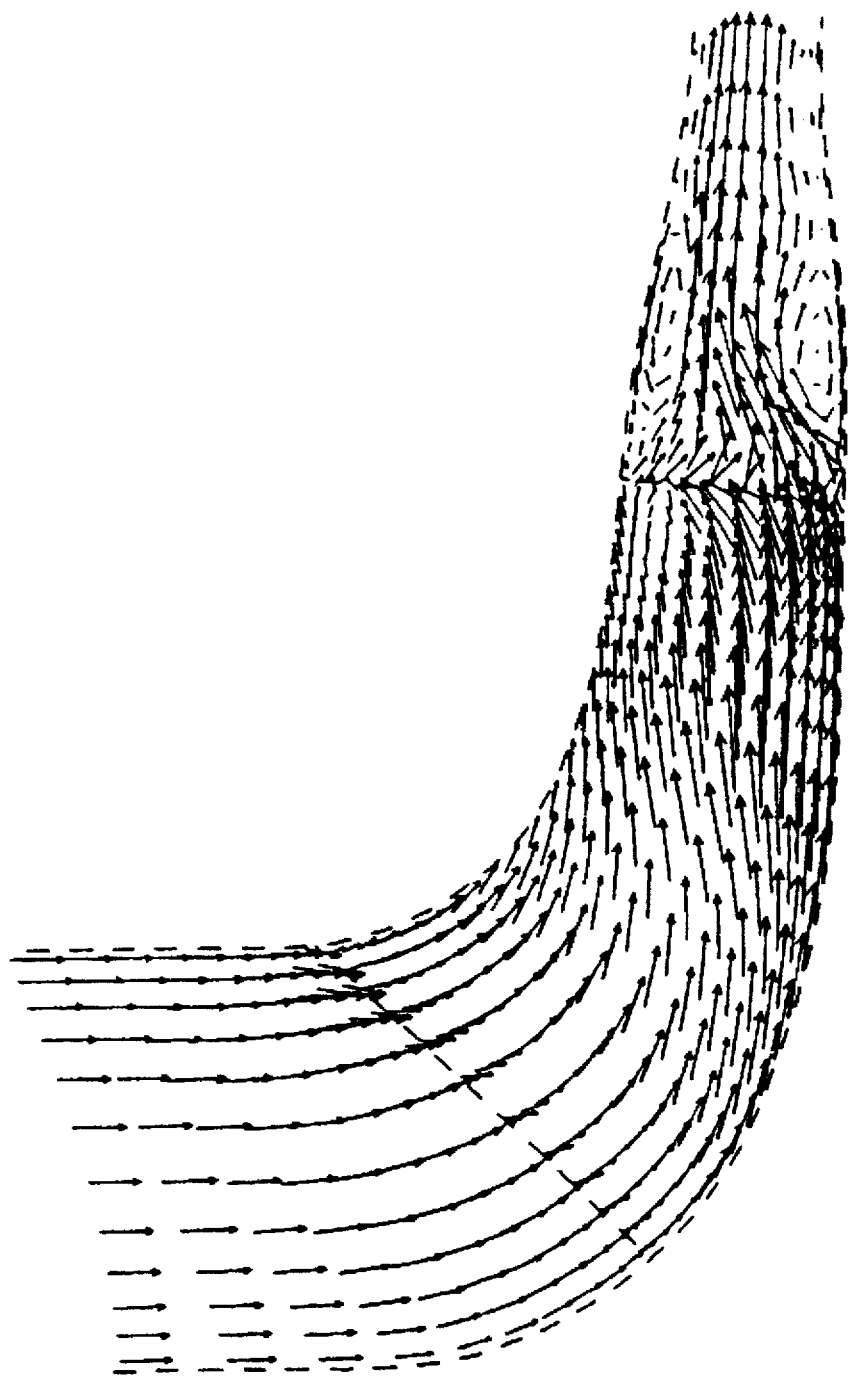
Figure 65:
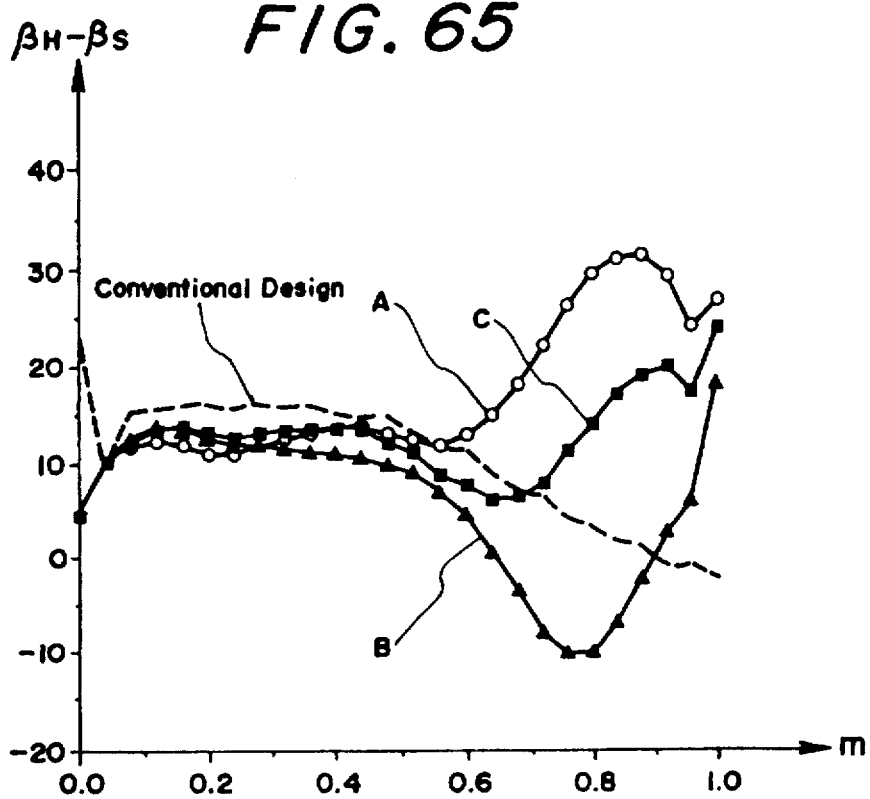

Namely, the results of the numerical analysis for the centrifugal pump impellers show the increase of the effects of secondary flow suppression in the order of FIGS. 20, 23 and 26, and the corresponding distribution of the blade angle difference in FIGS. 65 shows the tendency of the increasing blade angle difference towards the impeller exit more remarkably in the same order. Thus, the effectiveness of the fourth aspect of the present invention can be confirmed very clearly. Also, the blade angle distributions on the hub and the shroud show the characteristic feature of the fourth aspect of the present invention described in relation to FIGS. 13(A) and (B).

Figure 66:
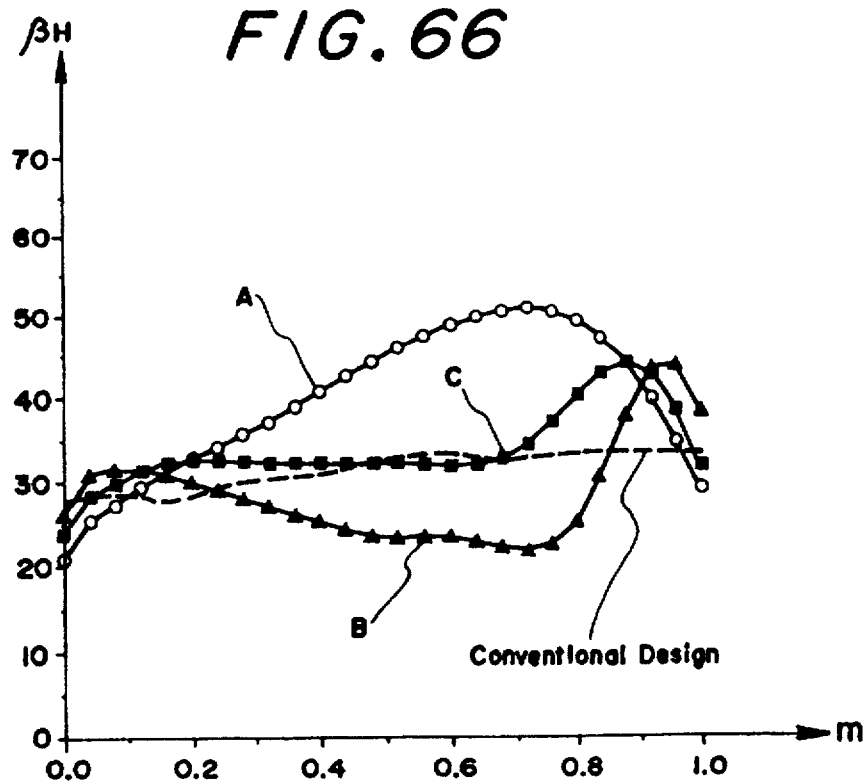
Figure 67:
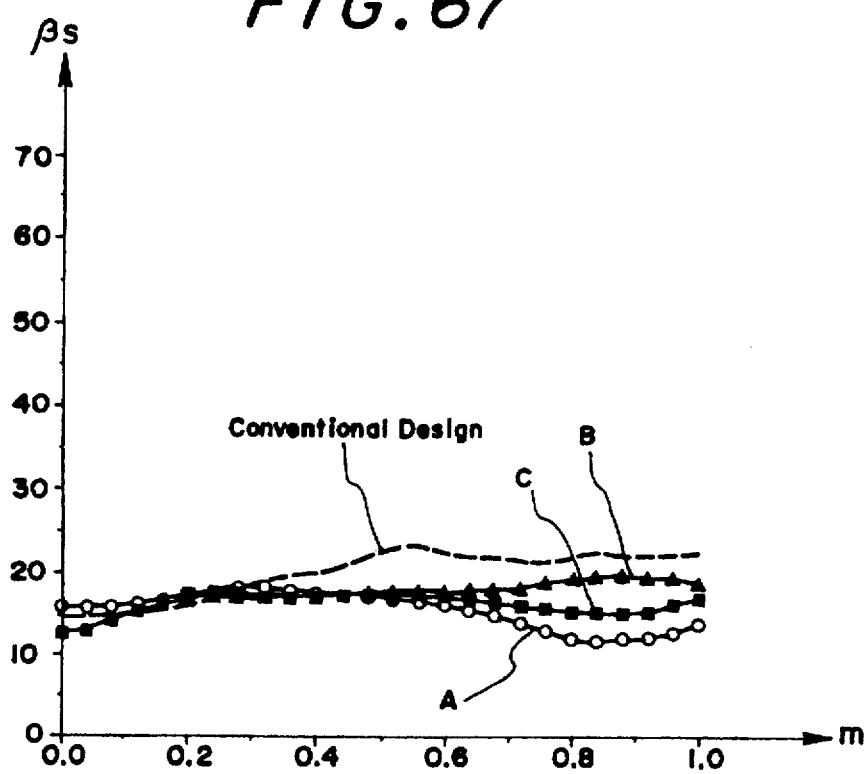
Figure 68:
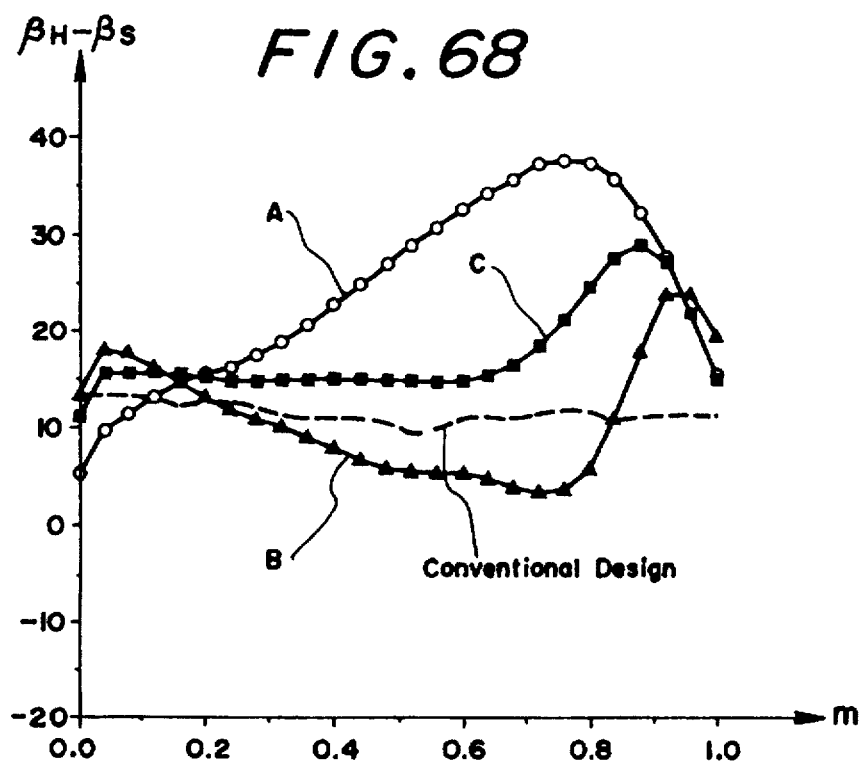
Figure 69:
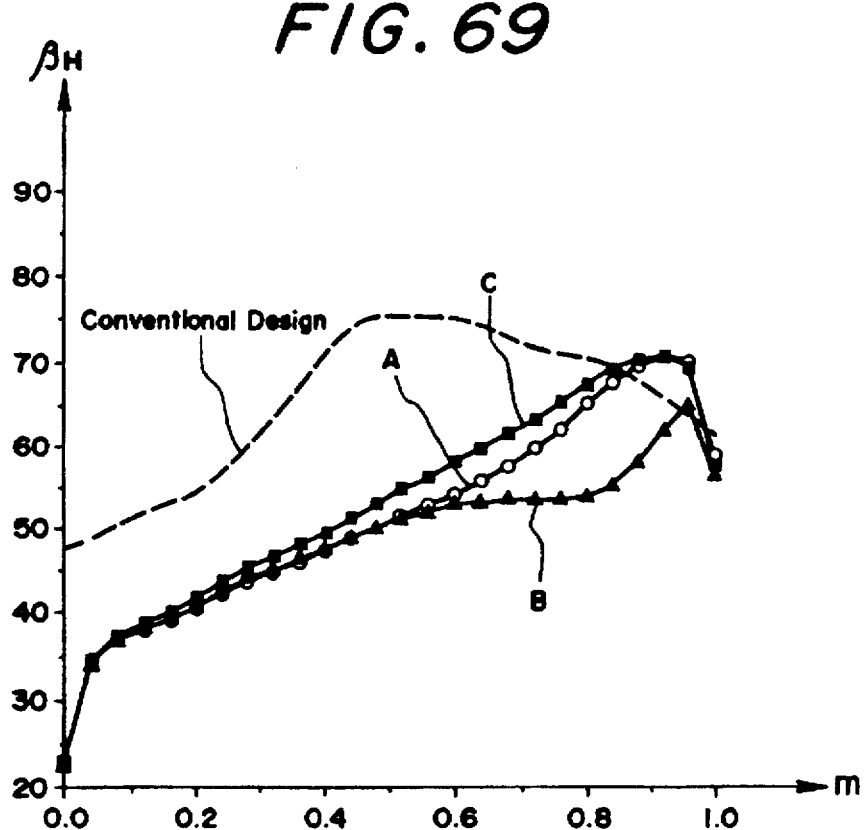
Figure 70:
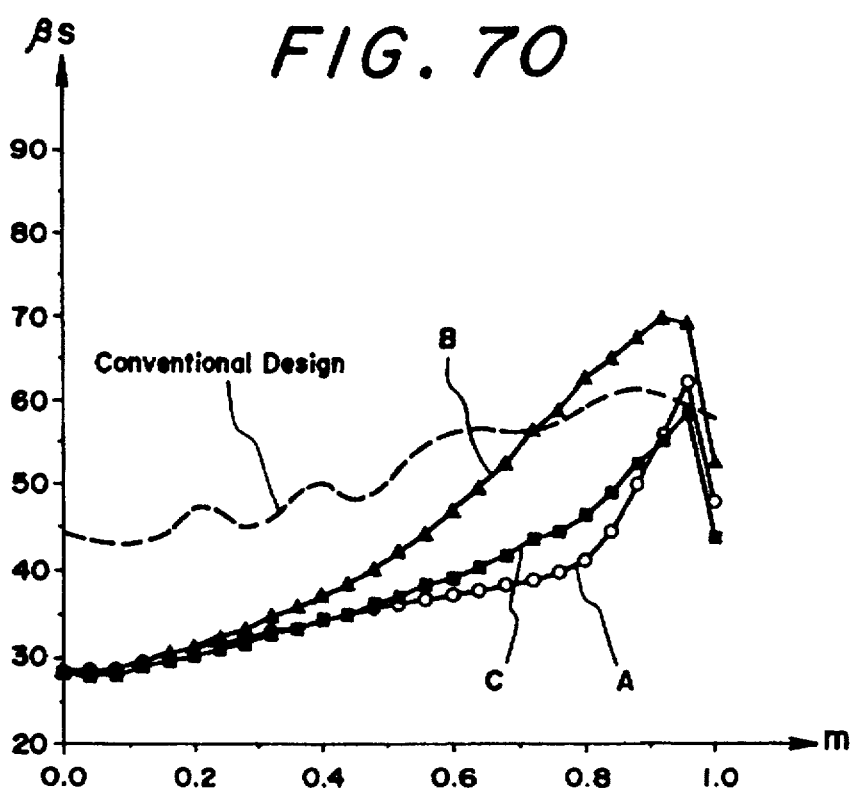
Figure 71:
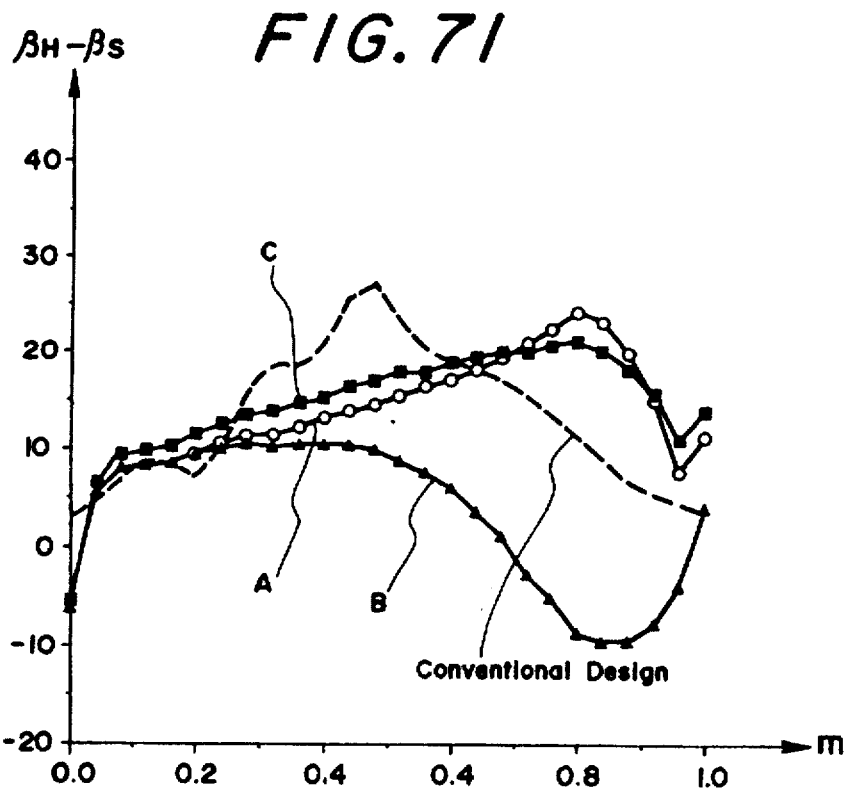
Figure 72:
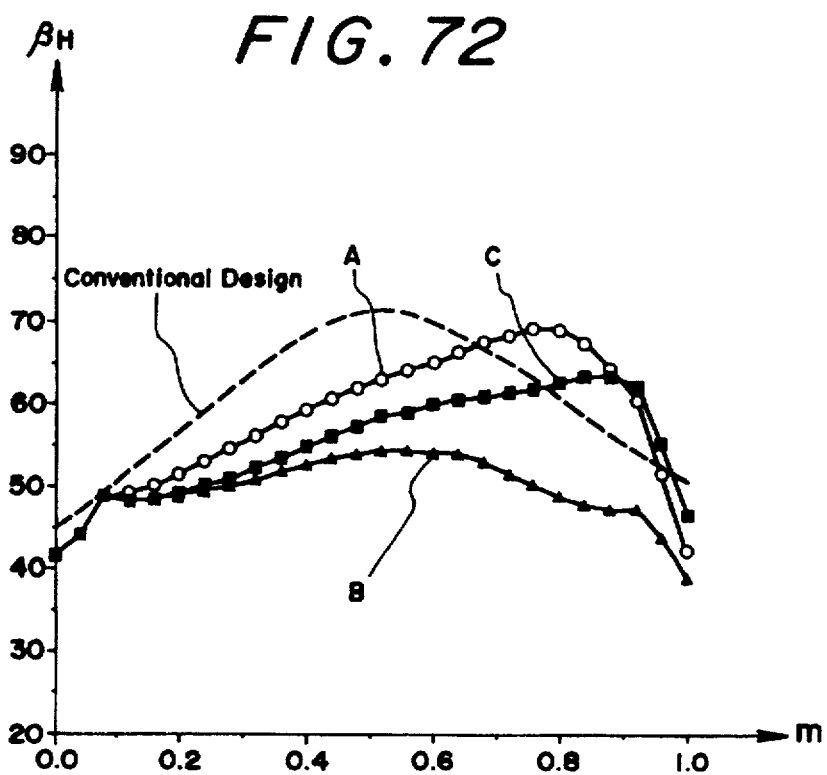
Figure 73:
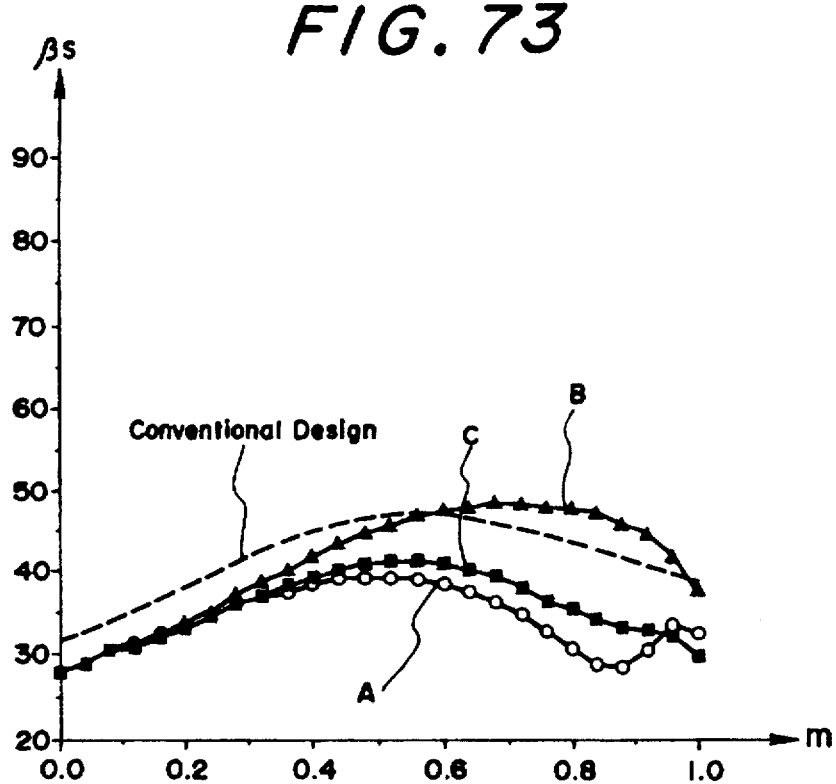
Figure 74:
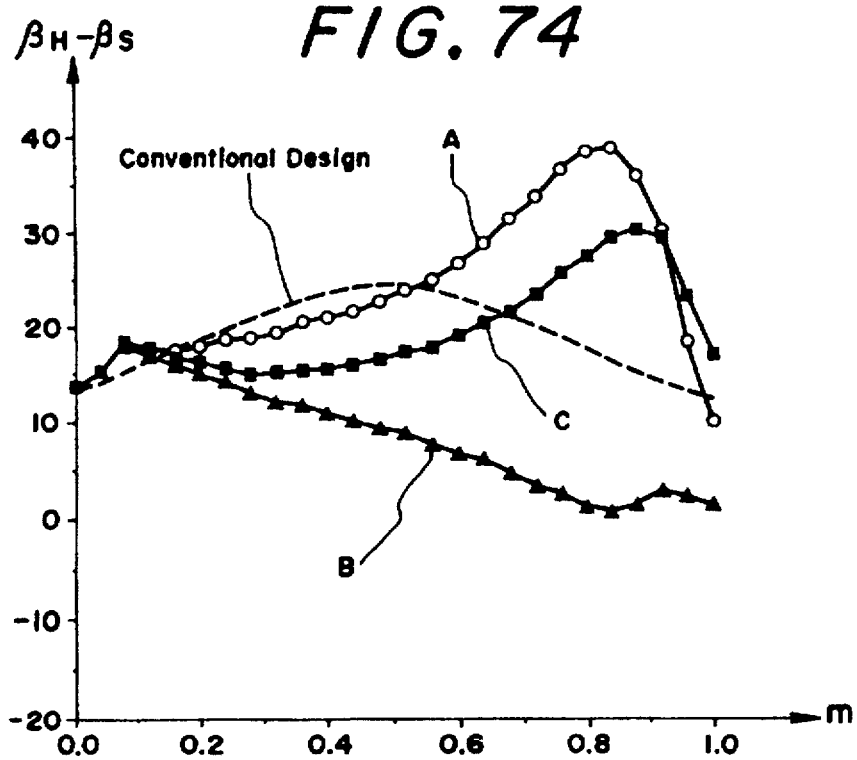

In the verification data for mixed flow pump impellers, the characteristic feature of the blade angles $\beta_H$ and $\beta_S$ can be observed in FIGS. 66 through 68. It can be confirmed that, similar to those of centrifugal pump impeller cases, the fourth aspect of the present invention of FIG. 68 is well correlated with the degree of secondary flow suppression presented in FIGS. 32, 35 and 38.

In the above drawings, the blade angle distributions of the impeller designed by a conventional design method are shown by broken lines. The difference between the conventional method and the present invention can be clearly acknowledged. According to the conventional design method of a centrifugal or mixed flow pump impeller, as described in A. J. Stepanoff, "Centrifugal and Axial Flow Pumps", 2nd ed., John Wiley & Sons, New York, 1957, pp. 95–104, or J. L. Dicmas, "Vertical Turbine, Mixed Flow and Propeller Pumps", MacGraw-Hill, New York, 1989, pp. 305–311, once the blade angles at the impeller inlet and the impeller exit are determined from design specifications, the blade angle distribution between the impeller inlet and the impeller exit is generally determined by connecting both of them by a curved line which changes gradually and smoothly. Thus, the consideration for suppressing secondary flow is not made at all in the conventional design method. The broken lines in FIGS. 63 through 68 show the blade angle distributions of the impellers designed by such a conventional method. Because of this, the secondary flows can not be suppressed in the conventional impellers, and this is confirmed by the results of the numerical analysis of FIGS. 17 and 29, which correspond to the conventional impellers presented with broken lines in FIGS. 65 and 68.

Figure 41:
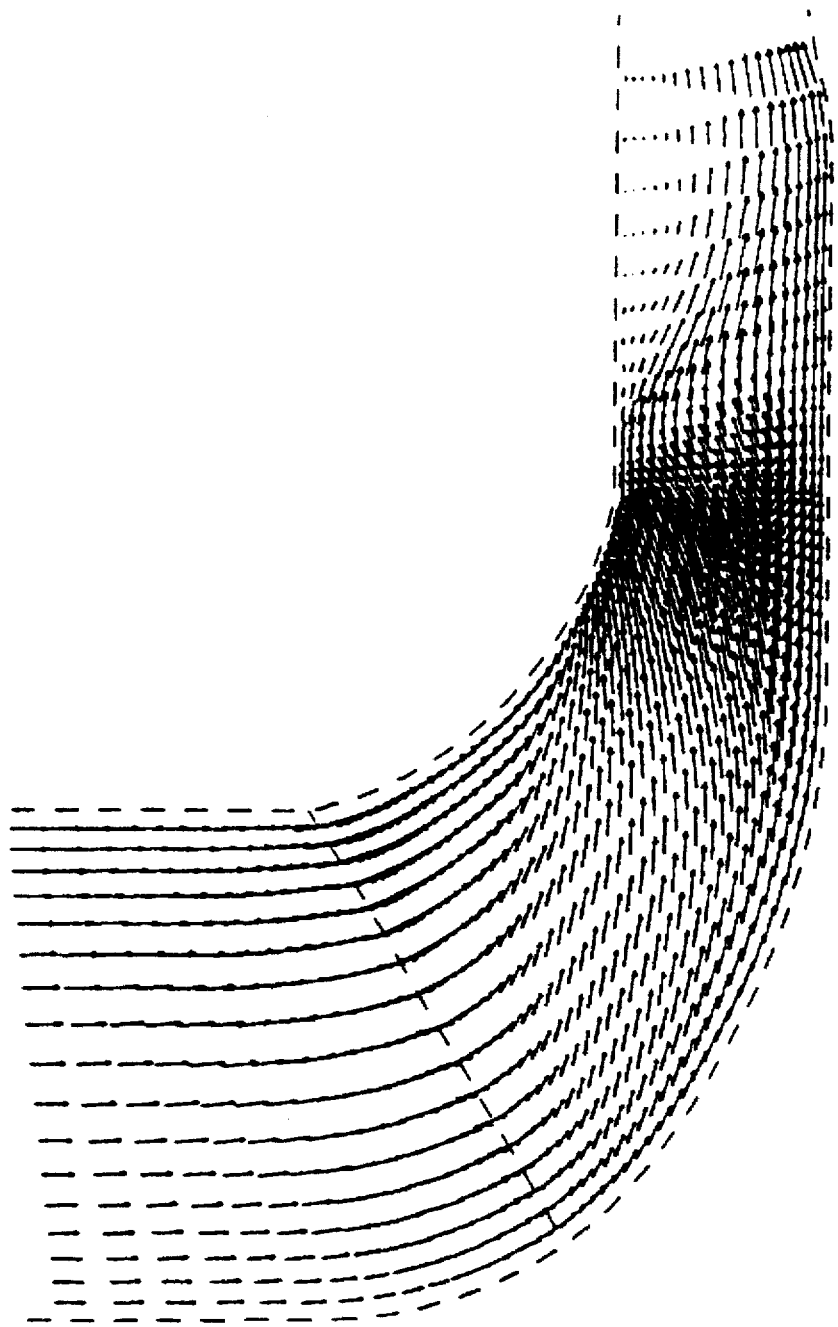
Figure 53:
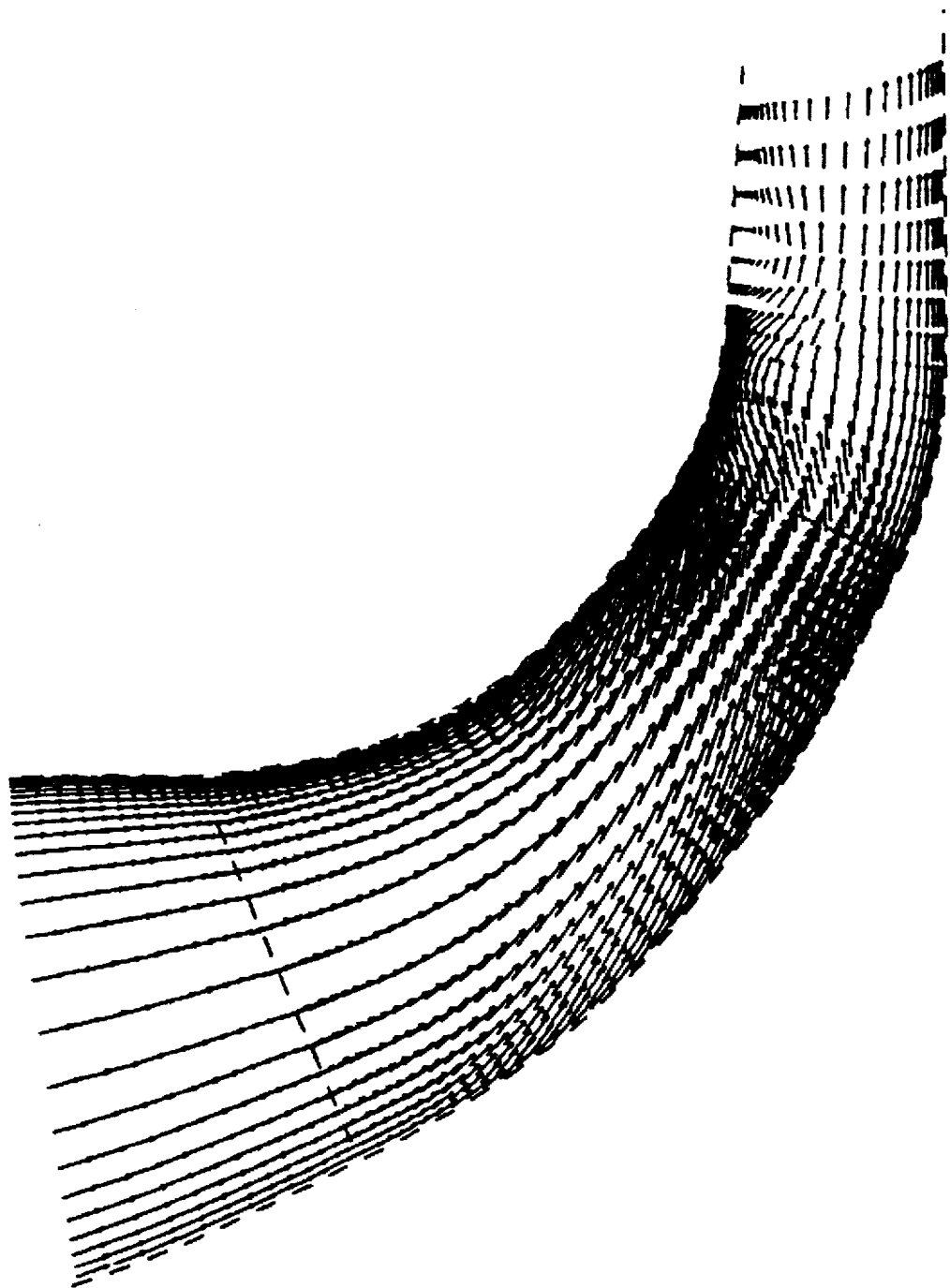
Figure 54:
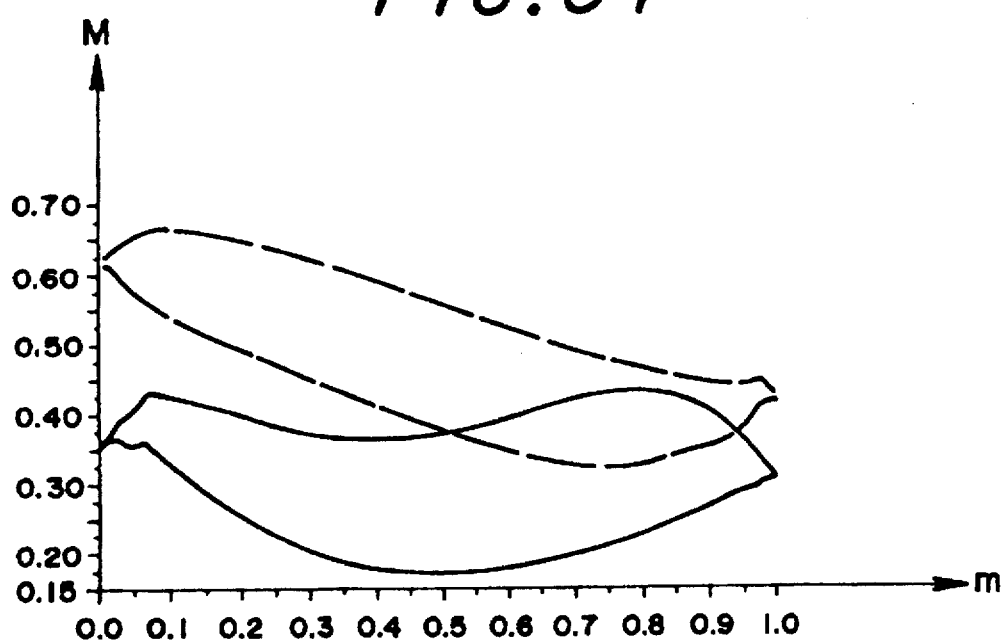
Figure 55:
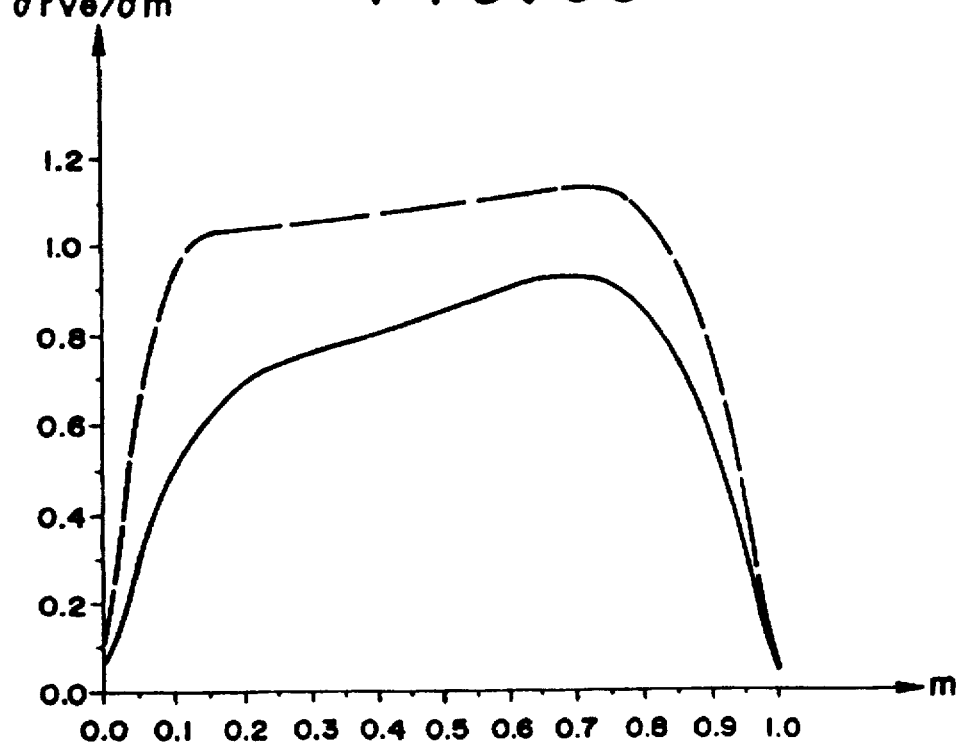
Figure 56:
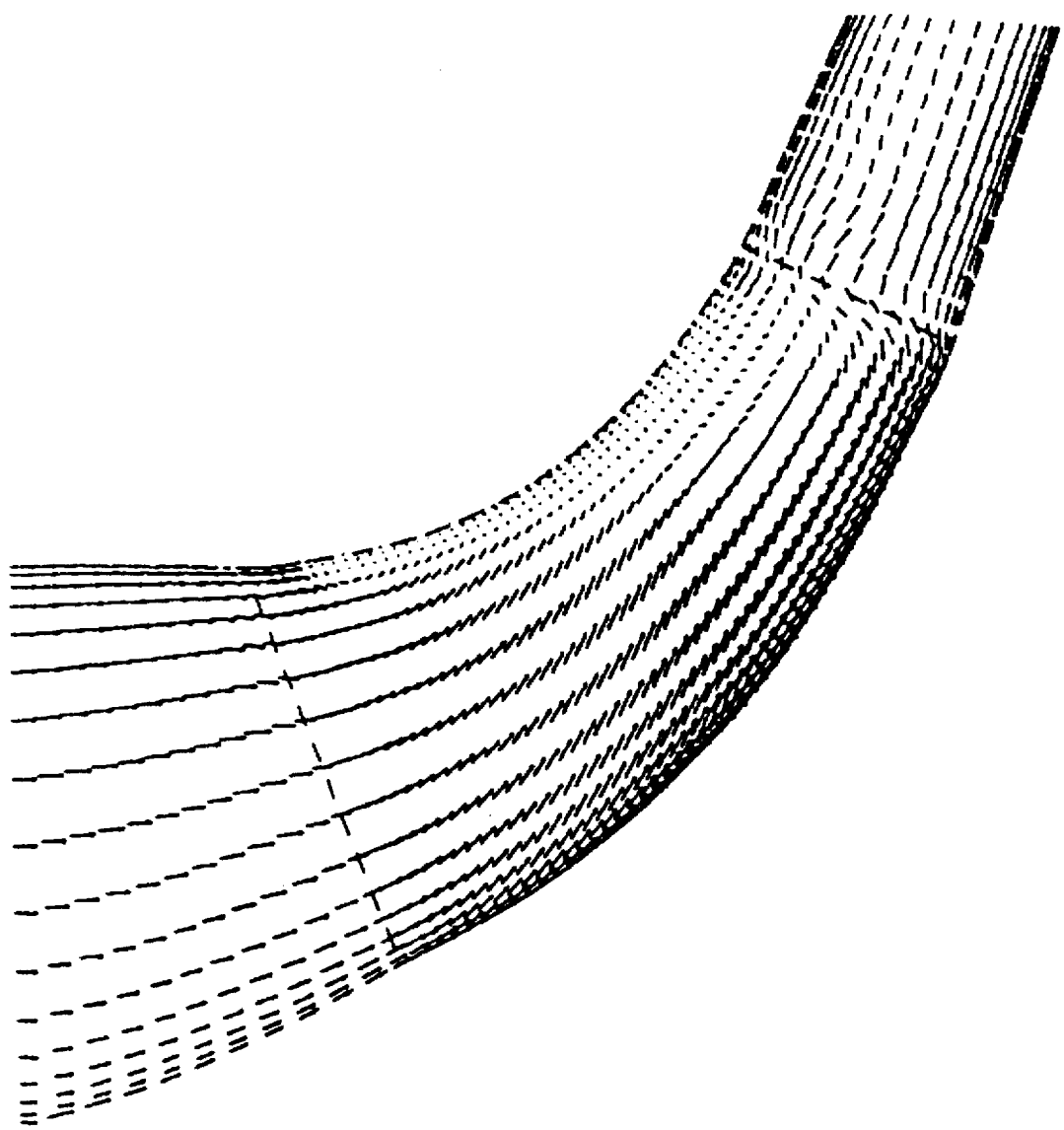
Figure 57:
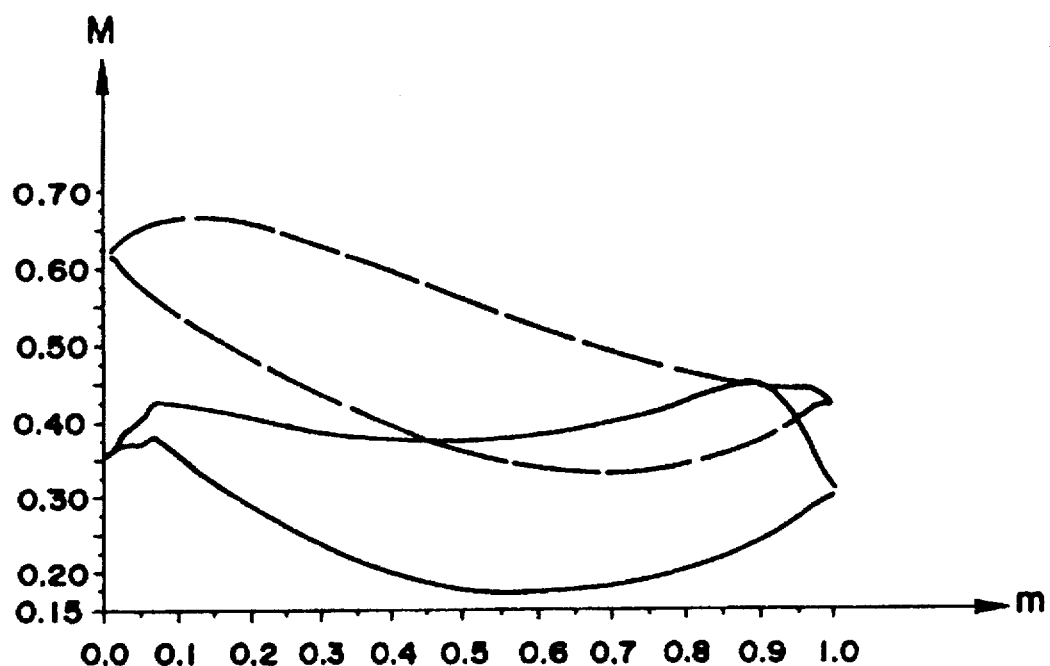
Figure 58:
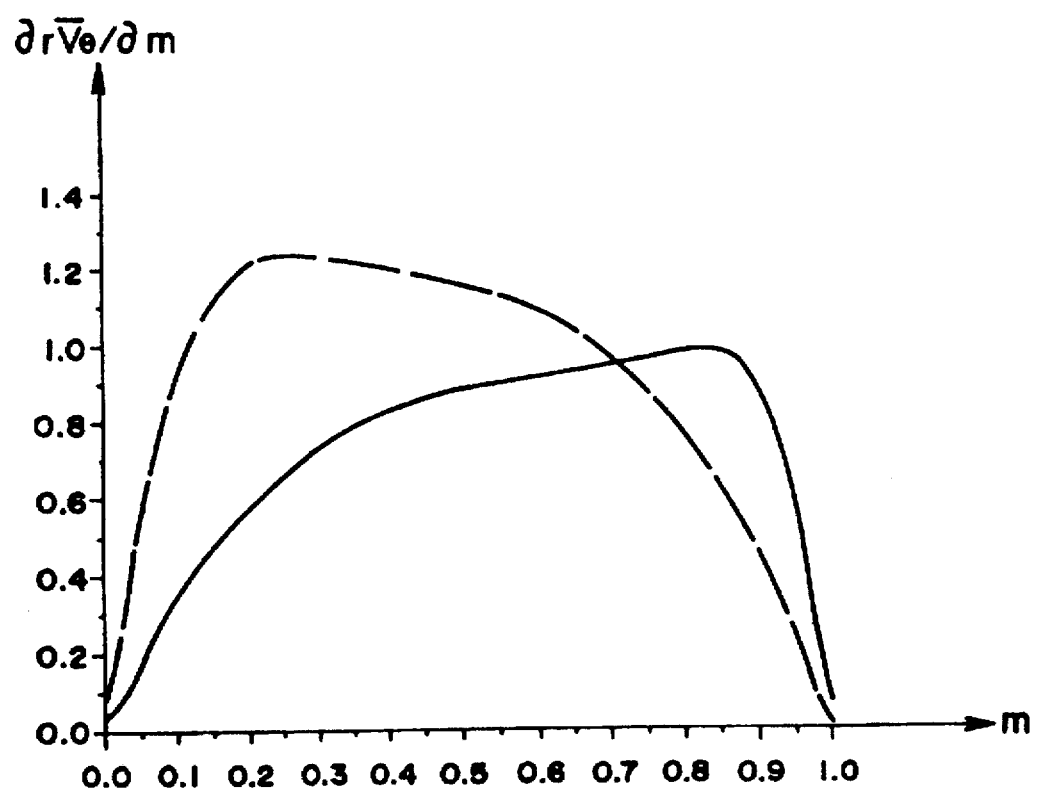
Figure 59:
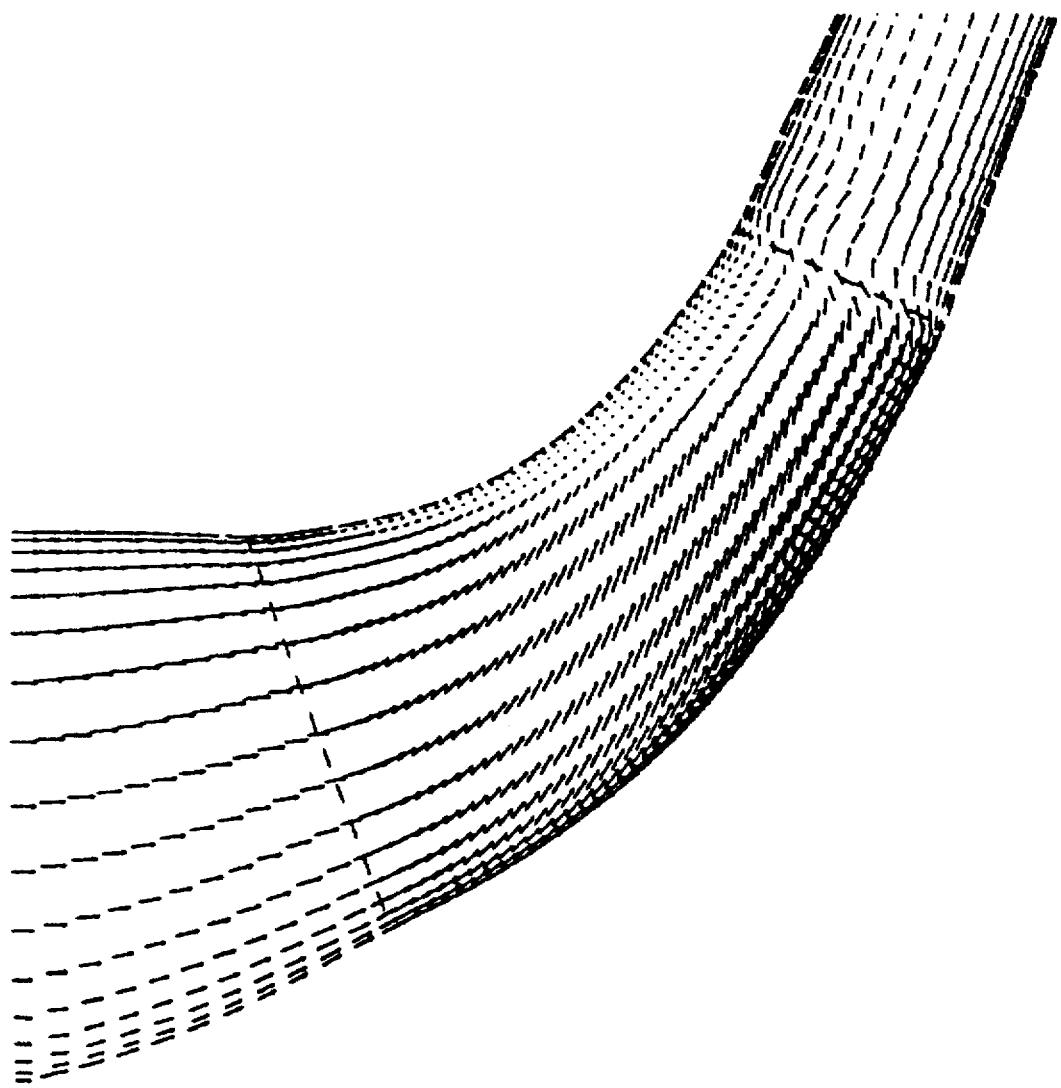
Figure 60:
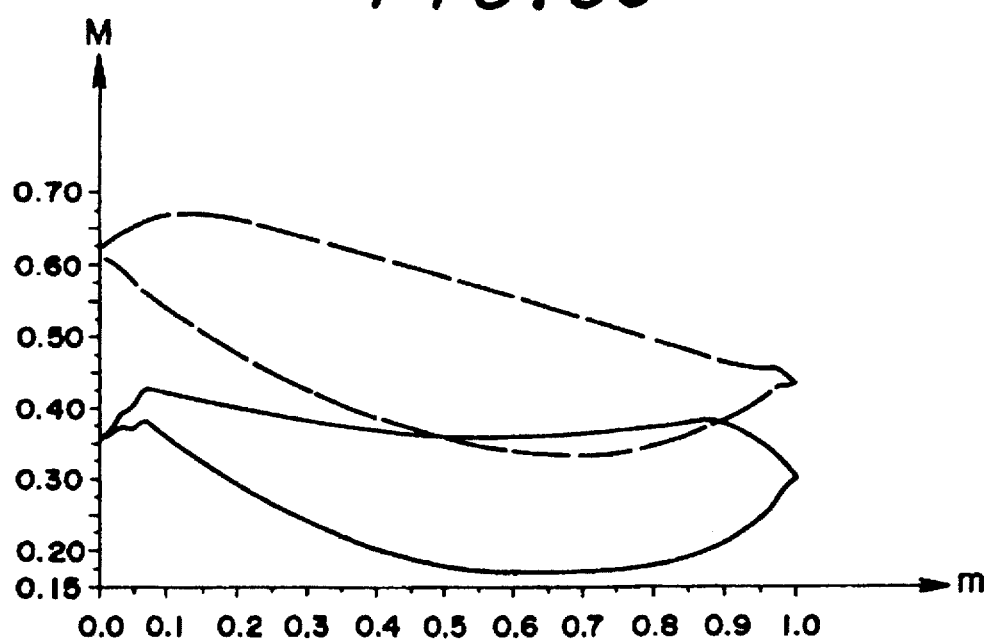
Figure 61:
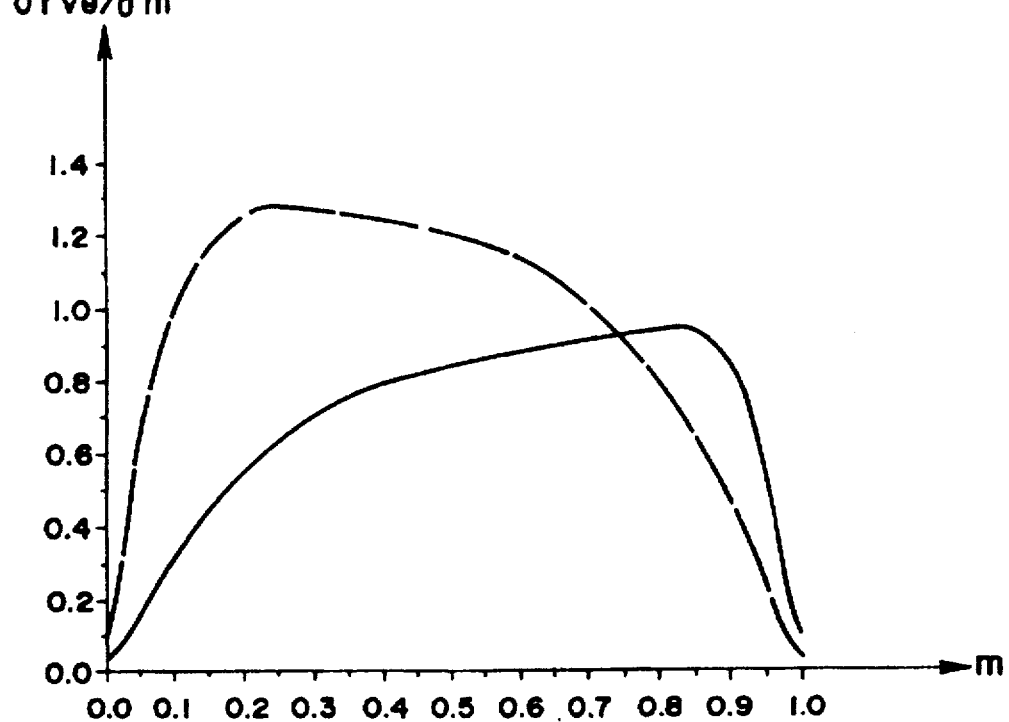
Figure 62:
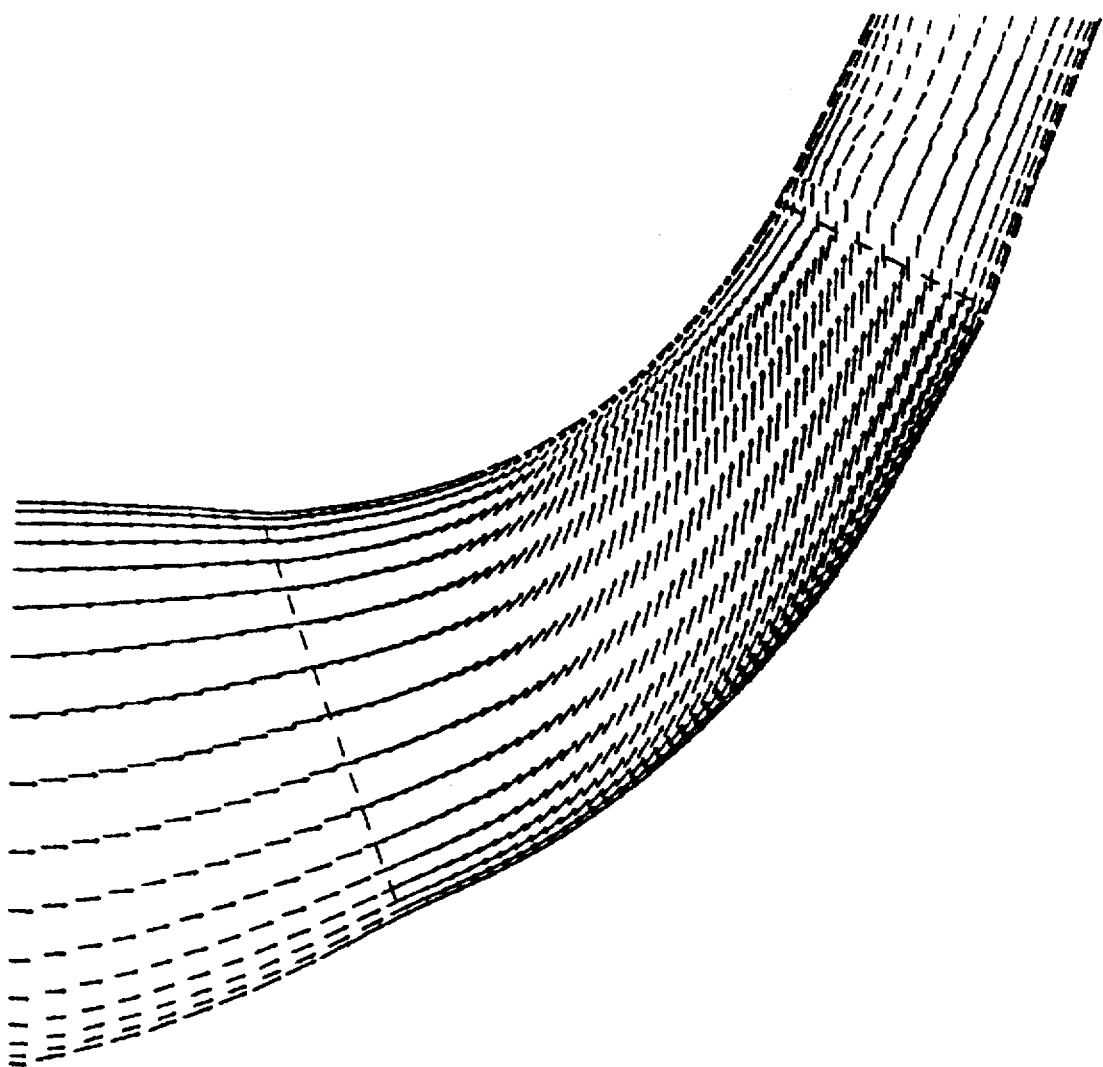
Figure 63:
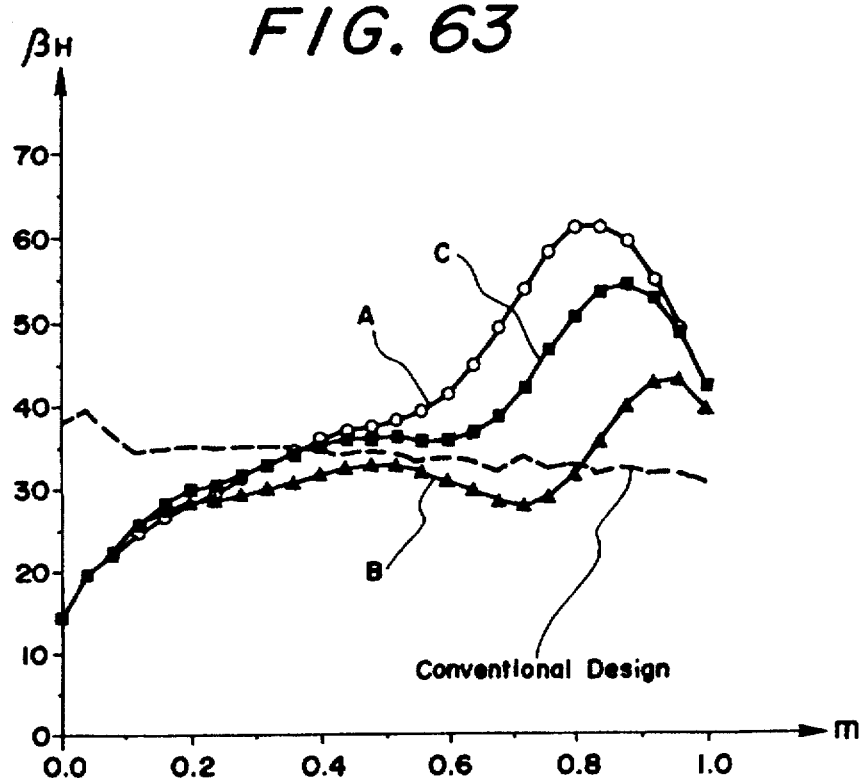
Figure 64:
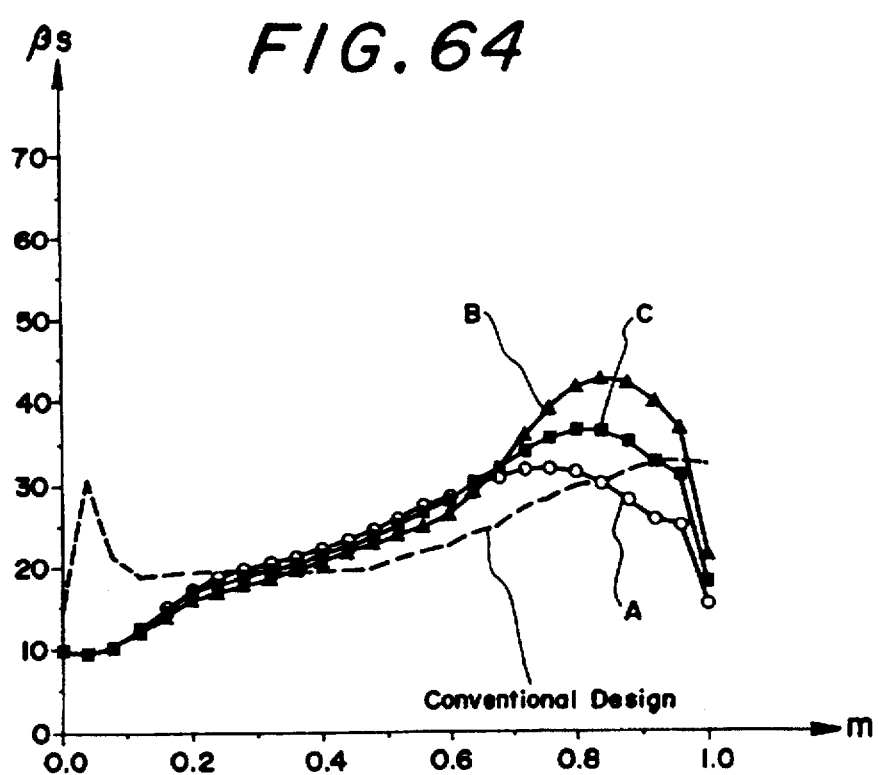

FIGS. 69 through 74 show the verification data for compressor impellers having the characteristic feature of the blade angle distribution of the fourth aspect of the present invention. Through the comparison with the predicted meridional secondary flows by the numerical analysis in FIGS. 44, 47, 50, 56, 59, 69, it can be confirmed clearly that the effectiveness of the secondary flow suppression increases as the characteristic feature of the blade angle distribution of the fourth aspect becomes increasingly remarkable. Here, broken lines in FIGS. 69 through 74 show the blade angle distributions of the conventional impellers of a typical compressor. In the compressor, since deceleration of the flow along the shroud surface is completed in the fore part of the blade in order to reduce friction loss, the blade angle distribution is different from that of the pump impeller. However, since the consideration for secondary flow suppression is not made at all, the meridional component of secondary flow cannot be suppressed. This can be confirmed by the corresponding results of the numerical analysis as shown in FIGS. 41 and 53.

Figure 75A:
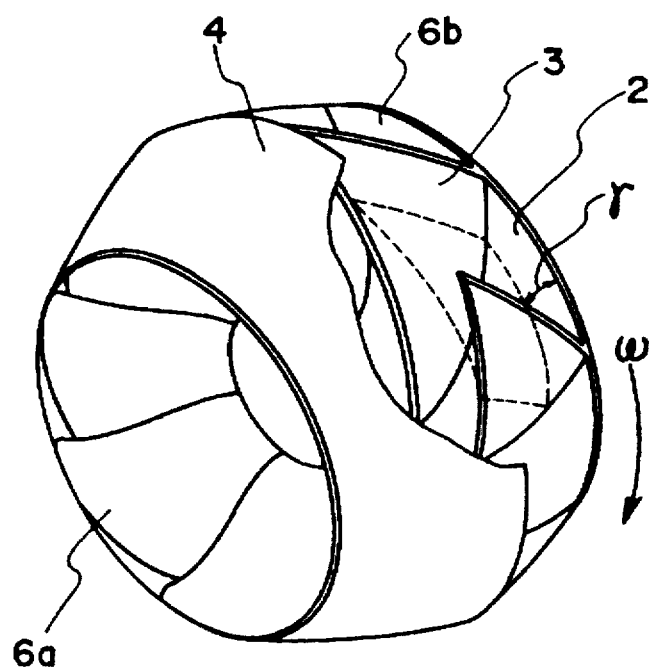
FIGS. 75(A) and 75(B) are perspective views showing the difference of the geometry of blade lean in a mixed flow pump impeller, FIG. 75(A) showing the case designed by using only blade lean in a circumferential direction according to the present invention, and FIG. 75(B) showing a combination of blade lean and blade loading $\partial(r\overline{V}_\theta)/\partial m$ according to the present invention.
Figure 75B:
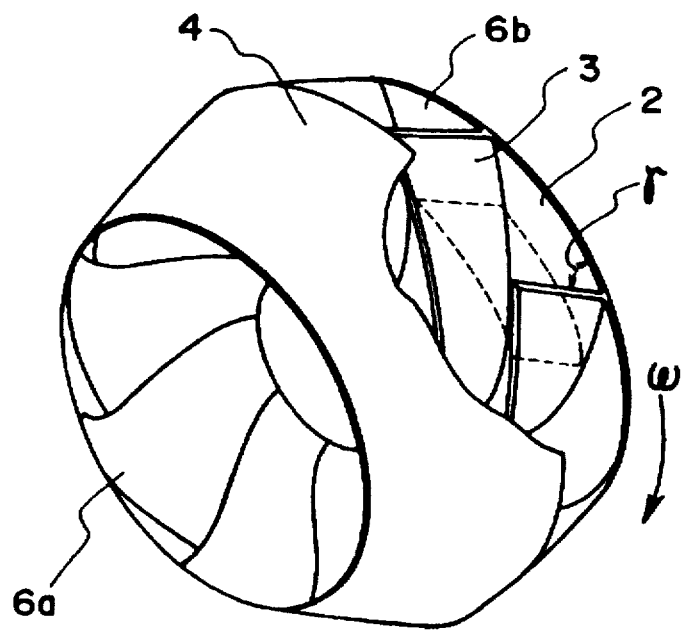

FIGS. 75(A) and 75(B) show the effectiveness of combining the third aspect of blade lean and the second aspect of blade loading in the case of a mixed flow pump impeller. The geometry of the impeller, designed by using only the third aspect of the present invention, has a blade lean ratio of $S=0.217$ showing a substantial blade lean in the circumferential direction with very small blade lean angle $\gamma$ as shown in FIG. 75(A), and the impeller has a geometry which is difficult to manufacture. On the other hand, the impeller, designed by using the second aspect of the present invention in combination with the third aspect, has a halved blade lean ratio of $S=0.10$, relatively large blade lean angle $\gamma$ as shown in FIG. 75(B), thus solving the difficulty in manufacturing, and the effectiveness of the present invention is ascertained.

Industrial Applicability

The present invention is characterized by the following aspects in designing an impeller in a turbomachine.

(1) The reduced static pressure difference $\Delta Cp$ or the relative Mach number difference $\Delta M$ shows a remarkably decreasing tendency with respect to non-dimensional meridional distance.

(2) The meridional derivative of $r\overline{V}_{74}$, i.e. $\partial(r\overline{V}_\theta)/\partial m$ which is a derivative of product $(r\overline{V}_\theta)$ of radius $r$ in the impeller and the tangentially averaged value of the circumferential velocity component $V_\theta$ of absolute velocity $V$ of fluid at the radius $r$, has such distribution along the meridional distance that the peak value of $\partial(r\overline{V}_\theta)/\partial m$ at the shroud emerges on the fore part of the blade and/or that at the hub on the latter part of the blade.

(3) The blade is leaned toward a circumferential direction with a non constant blade lean angle $\gamma$ so that the blade at the hub precedes the blade at the shroud in a rotational direction of the impeller.

(4) The blade angle difference $\beta_H-\Gamma_S$ between blade angle $\beta_H$ at the hub and blade angle $\beta_S$ at the shroud shows a remarkably increasing tendency with respect to non-dimensional meridional distance.

According to the above aspects of the invention, since the meridional component of secondary flow can be effectively suppressed, a loss which occurs in the turbomachine or the downstream flow passage can be reduced, emergence of positively sloped characteristic curve can be avoided, and stability of operation can be improved. Therefore, the present invention has a great utility value in industry.

With regard to the above four aspects of the invention, the propriety thereof is substantiated by verification data in accordance with the inverse design method and flow analysis techniques, which are now widely available, and therefore the present invention can be utilized effectively in industry.

We claim:

1. A turbomachine having an impeller with a plurality of blades supported by a hub on which said blades are circumferentially spaced and covered by a shroud surface which forms an outer boundary to flow of fluid in a flow passage defining a flow direction between two adjacent blades, said impeller having a configuration such that one of a reduced static pressure difference $\Delta Cp$ and a relative Mach number difference $\Delta M$ between said hub and said shroud surface on a suction surface of each said blade has a tendency to decrease to such a degree as to suppress effectively a meridional component of secondary flow between a location of non-dimensional meridional distance m=0 and a location of non-dimensional meridional distance m=1.0 as said non-dimensional meridional distance increases.

2. A turbomachine as claimed in claim 1, wherein each said blade is leaned in a circumferential direction so that said blade at said hub precedes said blade at said shroud surface in a rotational direction of said impeller.

3. A turbomachine as claimed in claim 1, wherein a pressure difference between a pressure coefficient Cp on a pressure surface and a pressure coefficient Cp on said suction surface of each said blade at said hub, and a pressure difference between a pressure coefficient Cp on said pressure surface and a pressure coefficient Cp on said suction surface of each said blade at said shroud surface become zero only at said location of non-dimensional meridional distance m=1.0 in an aft part of said impeller.

4. A turbomachine as claimed in claim 3, wherein each said blade is leaned in a circumferential direction so that said blade at said hub precedes said blade at said shroud surface in a rotational direction of said impeller.

5. A turbomachine as claimed in claim 1, wherein said impeller is configured such that a meridional derivative $\partial(r \overline{V}_\theta)/\partial m$ of $r\overline{V}_\theta$, equal to a product of a radius r of said impeller and a tangentially averaged value of a circumferential velocity component $V_\theta$ of an absolute velocity V of the fluid in said flow passage of said impeller at said radius r, has a maximum value at said shroud surface in a fore part of said impeller and at a non-dimensional meridional distance necessary to suppress effectively the meridional component of secondary flow, and a minimum value of zero at said shroud surface only at said location of non-dimensional meridional distance m=1.0 in an aft part of said impeller, or said meridional derivative has a maximum value at said hub in said aft part of said impeller and at said non-dimensional meridional distance necessary to suppress effectively the meridional component of secondary flow, and a minimum value of zero at said hub only at said location of non-dimensional meridional distance m=1.0 in said aft part of said impeller.

6. A turbomachine as claimed in claim 5, wherein each said blade is leaned in a circumferential direction so that said blade at said hub precedes said blade at said shroud surface in a rotational direction of said impeller.

7. A turbomachine as claimed in claim 1, wherein said impeller is configured such that a meridional derivative $\partial(r \overline{V}_\theta)/\partial m$ of $r\overline{V}_\theta$, equal to a product of a radius r of said impeller and a tangentially averaged value of a circumferential velocity component $V_\theta$ of an absolute velocity V of the fluid in said flow passage of said impeller at said radius r, is larger at said shroud surface than a corresponding value of $\partial(r \overline{V}_\theta)/\partial m$ at said hub at a location in the vicinity of non-dimensional meridional distance m=0 to such a degree as to suppress effectively the meridional component of secondary flow, and said meridional derivative is smaller at said shroud surface than said corresponding value of $\partial(r \overline{V}_\theta)/\partial m$ at said hub at a location in the vicinity of non-dimensional meridional distance m=1 to such a degree as to suppress effectively the meridional component of secondary flow, and a distribution of said meridional derivative at said hub crosses over that at said shroud surface only at a crossing location in an aft part of said impeller, and said meridional derivative has a minimum value of zero at both said shroud surface and said hub only at a location of non-dimensional meridional distance m=1.0 in said aft part of said impeller.

8. A turbomachine as claimed in claim 7, wherein each said blade is leaned in a circumferential direction so that said blade at said hub precedes said blade at said shroud surface in a rotational direction of said impeller.

9. A turbomachine as claimed in claim 7, wherein said crossing location occurs in a range of non-dimensional meridional distance of not less than 0.50.

10. A turbomachine as claimed in claim 9, wherein each said blade is leaned in a circumferential direction so that said blade at said hub precedes said blade at said shroud surface in a rotational direction of said impeller.

11. A turbomachine as claimed in claim 7, wherein said crossing location occurs in a range of non-dimensional meridional distance of 0.55–0.85.

12. A turbomachine as claimed in claim 11, wherein each said blade is leaned in a circumferential direction so that said blade at said hub precedes said blade at said shroud surface in a rotational direction of said impeller.

13. A turbomachine as claimed in claim 1, wherein each said blade is leaned in a circumferential direction, between said location of non-dimensional meridional distance m=0 and said location of non-dimensional distance m=1.0, so that said blade at a hub side thereof precedes said blade at a shroud side thereof in a rotational direction of said impeller and a blade lean angle $\gamma$, defined as an angle between said shroud surface and a blade center line in a cross-sectional view of said flow passage, has a tendency to decrease to such a degree as to suppress effectively the meridional component of secondary flow towards an exit of said impeller.

14. A turbomachine as claimed in claim 13, wherein said blade lean in said circumferential direction is designed such that a blade lean ratio S, which represents overall degree of said blade leans and is defined as $$S=(\theta_{TE,S}-\theta_{TE,H})/(\theta_{TE,M}-\theta_{LE,M}),$$

wherein $\theta_{TE,S}$ represents an angular co-ordinate of said impeller exit at said shroud surface, $\theta_{TE,H}$ that of said impeller exit at said hub, $\theta_{TE,M}$ that of said impeller exit at a middle point between said shroud surface and said hub, $\theta_{LE,M}$ that of an impeller inlet at said middle point between said shroud surface and said hub, is not then than S=0.14.

15. A turbomachine as claimed in claim 13, wherein a blade angle $\alpha_{TE}$ defined as an angle between a blade camber line at said exit and a tangential direction in a plan view of said impeller, viewed from an inlet side of said impeller, decreases from a value of $\alpha_{TE,H}$ at said hub to a value of $\alpha_{TE,S}$ at said shroud surface.

16. A turbomachine as claimed in claim 15, wherein said blade lean in said circumferential direction is designed such that a blade lean ratio S, which represents overall degree of said blade leans and is defined as $$S=(\theta_{TE,S}-\theta_{TE,H})/(\theta_{TE,M}-\theta_{LE,M}),$$

wherein:

$\theta_{TE,S}$ represents an angular co-ordinate of said impeller exit at said shroud surface, $\theta_{TE,H}$ that of said impeller exit at said hub, $\theta_{TE,M}$ that of said impeller exit at a middle point between said shroud surface and said hub, $\theta_{LE,M}$ that of an impeller inlet at said middle point between said shroud surface and said hub, is not then than S=0.14.

17. A turbomachine as claimed in claim 15, wherein a blade angle $\alpha_H$, defined as an angle between a blade camber line and a tangential direction at said hub in a plan view of said impeller, viewed from said inlet side of said impeller, has a maximum or a local maximum value at said exit of said impeller.

18. A turbomachine as claimed in claim 17, wherein said blade lean in said circumferential direction is designed such that a blade lean ratio S, which represents overall degree of said blade leans and is defined as $$S=(\theta_{TE,S}-\theta_{TE,H})/(\theta_{TE,M}-\theta_{LE,M}),$$

wherein:

$\theta_{TE,S}$ represents an angular co-ordinate of said impeller exit at said shroud surface, $\theta_{TE,H}$ that of said impeller exit at said hub, $\theta_{TE,M}$ that of said impeller exit at a middle point between said shroud surface and said hub, $\theta_{LE,M}$ that of an impeller inlet at said middle point between said shroud surface and said hub, is not then than S=0.14.

19. A turbomachine as claimed in claim 17, wherein said maximum or local maximum value of said blade angle $\alpha_H$ occurs at a non-dimensional meridional distance of not less than m=0.7 or at a location of non-dimensional radius ratio of not less than r*=0.6.

20. A turbomachine as claimed in claim 19, wherein said blade lean in said circumferential direction is designed such that a blade lean ratio S, which represents overall degree of said blade leans and is defined as $$S=(\theta_{TE,S}-\theta_{TE,H})/(\theta_{TE,M}-\theta_{LE,M}),$$

wherein:

$\theta_{TE,S}$ represents an angular co-ordinate of said impeller exit at said shroud surface, $\theta_{TE,H}$ that of said impeller exit at said hub, $\theta_{TE,M}$ that of said impeller exit at a middle point between said shroud surface and said hub, $\theta_{LE,M}$ that of an impeller inlet at said middle point between said shroud surface and said hub, is not then than S=0.14.

21. A turbomachine as claimed in claim 1, wherein each said blade is leaned in a circumferential direction between said location of non-dimensional meridional distance m=0 and said location of non-dimensional distance m=1.0 so that said blade at a hub side thereof precedes said blade at a shroud side thereof in a rotational direction of said impeller and a backsweep of said blade at said shroud surface toward an exit of said impeller increases to such a degree as to suppress effectively the meridional component of secondary flow.

22. A turbomachine as claimed in claim 21, wherein said blade lean in said circumferential direction is designed such that a blade lean ratio S, which represents overall degree of said blade leans and is defined as $$S=(\theta_{TE,S}-\theta_{TE,H})/(\theta_{TE,M}-\theta_{LE,M}),$$

wherein:

$\theta_{TE,S}$ represents an angular co-ordinate of said impeller exit at said shroud surface, $\theta_{TE,H}$ that of said impeller exit at said hub, $\theta_{TE,M}$ that of said impeller exit at a middle point between said shroud surface and said hub, $\theta_{LE,M}$ that of an impeller inlet at said middle point between said shroud surface and said hub, is not then than S=0.14.

23. A turbomachine as claimed in claim 1, wherein said impeller is configured such that a distribution of blade angle measured in a circumferential direction is arranged such that a blade angle difference $\beta_H-\beta_S$, between a blade angle $\beta_H$ at said hub and a blade angle $\beta_S$ at said shroud surface, has a tendency to increase from said location of non-dimensional meridional distance m=0 to said location of non-dimensional meridional distance m=1.0 to such a degree as to suppress effectively the meridional component of secondary flow.

24. A turbomachine as claimed in claim 23, wherein said blade angle difference $\beta_H-\beta_S$ has a maximum value or a local maximum value which is not less than 20 degrees.

25. A turbomachine as claimed in claim 24, wherein said maximum value of said blade angle difference $\beta_H-\beta_S$ occurs at a non-dimensional meridional distance of not less than m=0.5.

26. A turbomachine as claimed in claim 24, wherein said maximum value of said blade angle difference $\beta_H-\beta_S$ occurs at a range of non-dimensional meridional distance m=0.7–1.0.

27. A turbomachine as claimed in claim 23, wherein said blade angle difference $\beta_H-\beta_S$ has a maximum value or a local maximum value which is larger than an averaged value of blade angle difference between a location of non-dimensional meridional distance of m=0–0.2 by not less than 10 degrees.

28. A turbomachine as claimed in claim 27, wherein said maximum value of said blade angle difference $\beta_H-\beta_S$ occurs at a non-dimensional meridional distance of not less than m=0.5.

29. A turbomachine as claimed in claim 27, wherein said maximum value of said blade angle difference $\beta_H-\beta_S$ occurs at a range of non-dimensional meridional distance m=0.7–1.0.

30. A turbomachine as claimed in claim 1, wherein said impeller is configured such that a distribution of blade angle measured in a circumferential direction is arranged such that a blade angle difference $\beta_H-\beta_S$, between a blade angle $\beta_H$ at said hub and a blade angle $\beta_S$ at said shroud surface has a tendency to decrease in a part of a non-dimensional distance between said location of non-dimensional meridional distance m=0 and said location of non-dimensional meridional distance m=1.0 followed by a tendency to increase as said non-dimensional meridional distance increases to such a degree as to suppress effectively the meridional component of secondary flow.

31. A turbomachine as claimed in claim 30, wherein said blade angle difference $\beta_H-\beta_S$ has a maximum value or a local maximum value which is not less than 20 degrees.

32. A turbomachine as claimed in claim 31, wherein said maximum value of said blade angle difference $\beta_H-\beta_S$ occurs at a non-dimensional meridional distance of not less than m=0.5.

33. A turbomachine as claimed in claim 31, wherein said maximum value of said blade angle difference $\beta_H - \beta_S$ occurs at a range of non-dimensional meridional distance m=0.7–1.0.

34. A turbomachine as claimed in claim 30, wherein said blade angle difference $\beta_H - \beta_S$ has a maximum value or a local maximum value which is larger than an averaged value of blade angle difference between a location of non-dimensional meridional distance of m=0–0.2 by not less than 10 degrees.

35. A turbomachine as claimed in claim 34, wherein said maximum value of said blade angle difference $\beta_H - \beta_S$ occurs at a non-dimensional meridional distance of not less than m=0.5.

36. A turbomachine as claimed in claim 34, wherein said maximum value of said blade angle difference $\beta_H - \beta_S$ occurs at a range of non-dimensional meridional distance m=0.7–1.0.

* * * * *

UNITED STATES PATENT AND TRADEMARK OFFICE
CERTIFICATE OF CORRECTION

PATENT NO. : 5,685,696
DATED : November 11, 1997
INVENTOR(S) : MEHRDAD ZANGENCH, HIDEOMI HARADA and AKIRA GOTO It is certified that error appears in the above-identified patent and that said Letters Patent is hereby corrected as shown below:

Column 24, in claim 14, the last line, change "then" to --less--.

Column 25, in claim 16, the last line, change "then" to --less--.

Column 25, in claim 18, the last line, change "then" to --less--.

Column 25, in claim 20, the last line, change "then" to --less--.

Column 26, in claim 22, the last line, change "then" to --less--.

Signed and Sealed this

Twenty-sixth Day of May, 1998

Attest:

BRUCE LEHMAN

Attesting Officer    Commissioner of Patents and Trademarks